Figure 4:
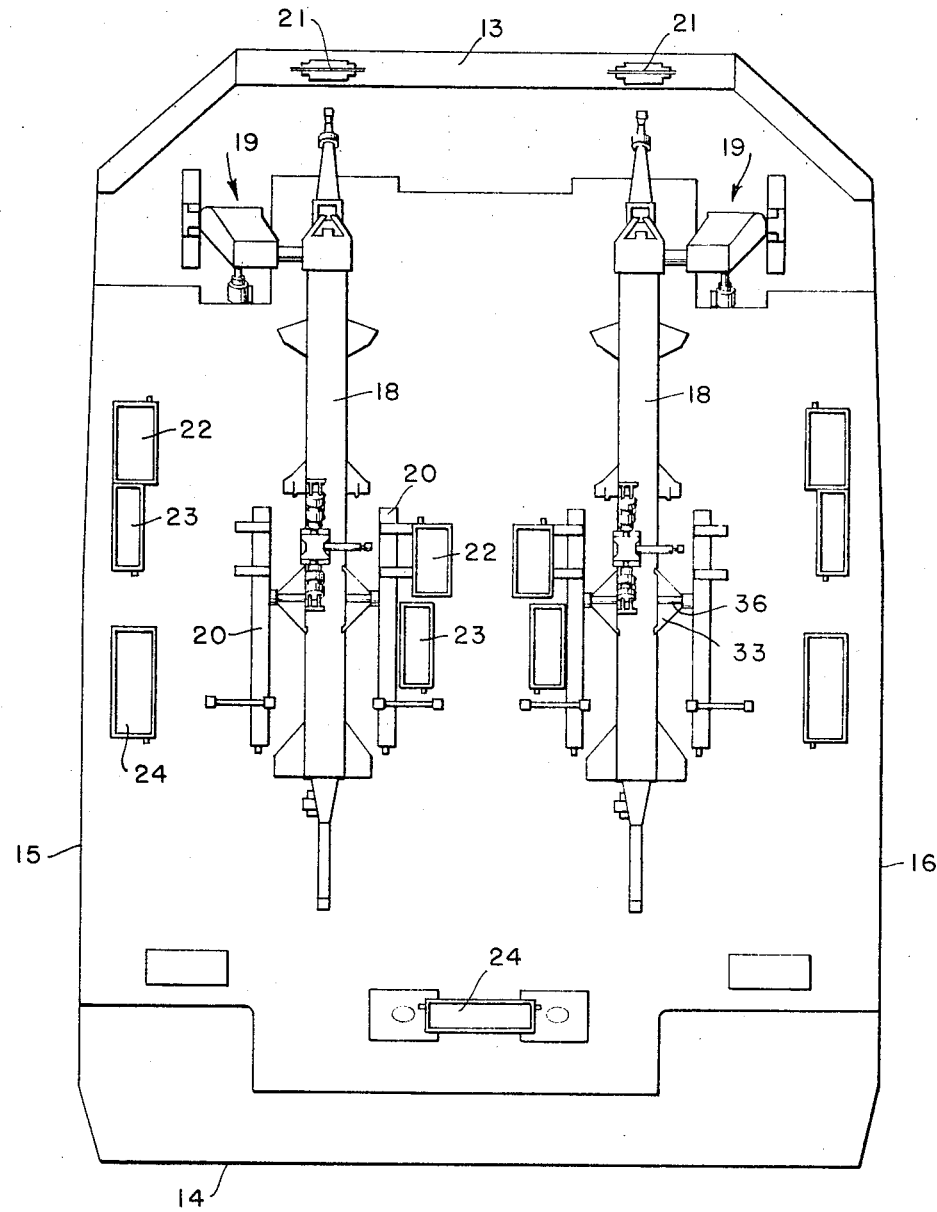

Oct. 25, 1966   R. F. HERETH ETAL   3,280,702
MISSILE LAUNCHER TRANSFER MECHANISM
Filed Aug. 27, 1959   38 Sheets-Sheet 1
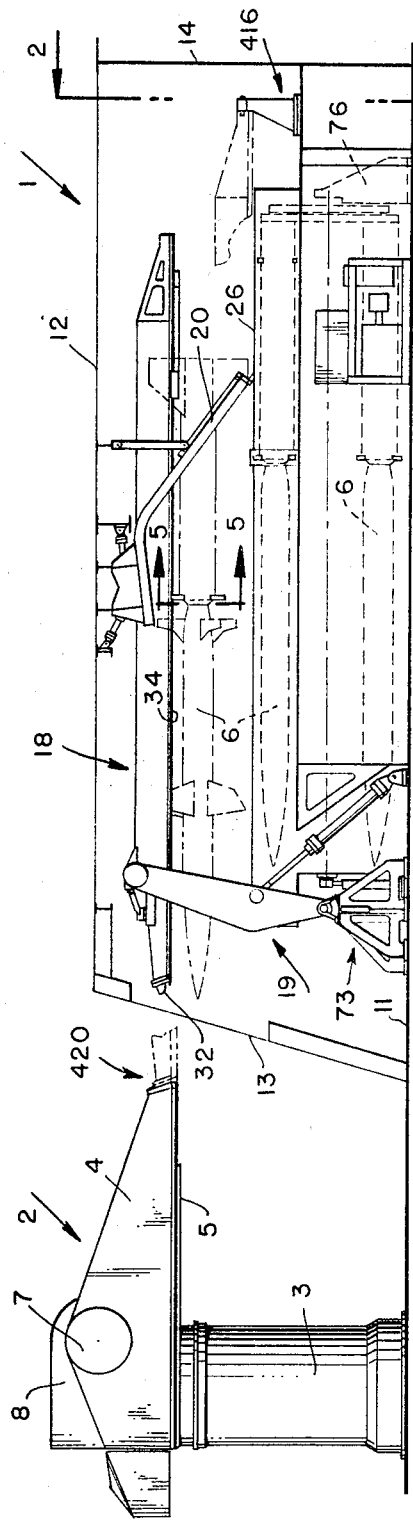
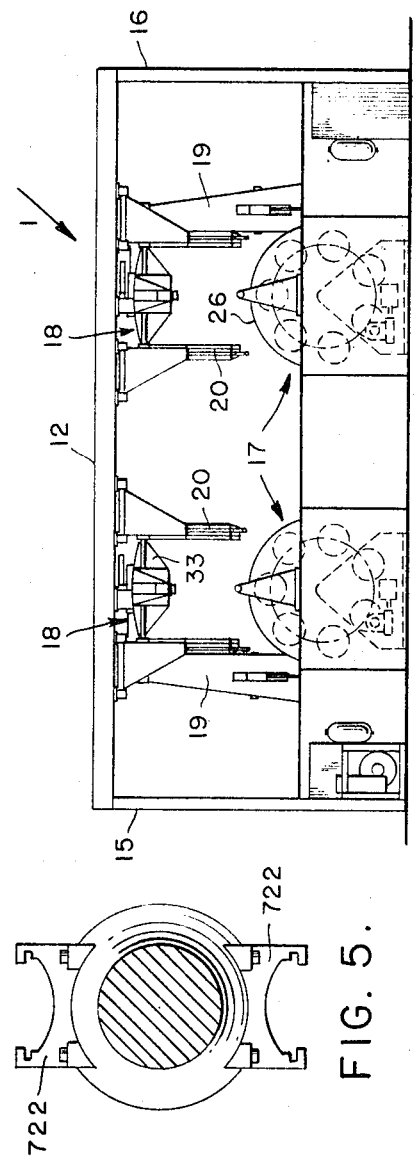
INVENTORS.
RALPH F. HERETH
GEORGE M. SHERMAN
ROBERT K. KIRSCHNER
OMER R. BUTTERFIELD
BY
ATTORNEYS.

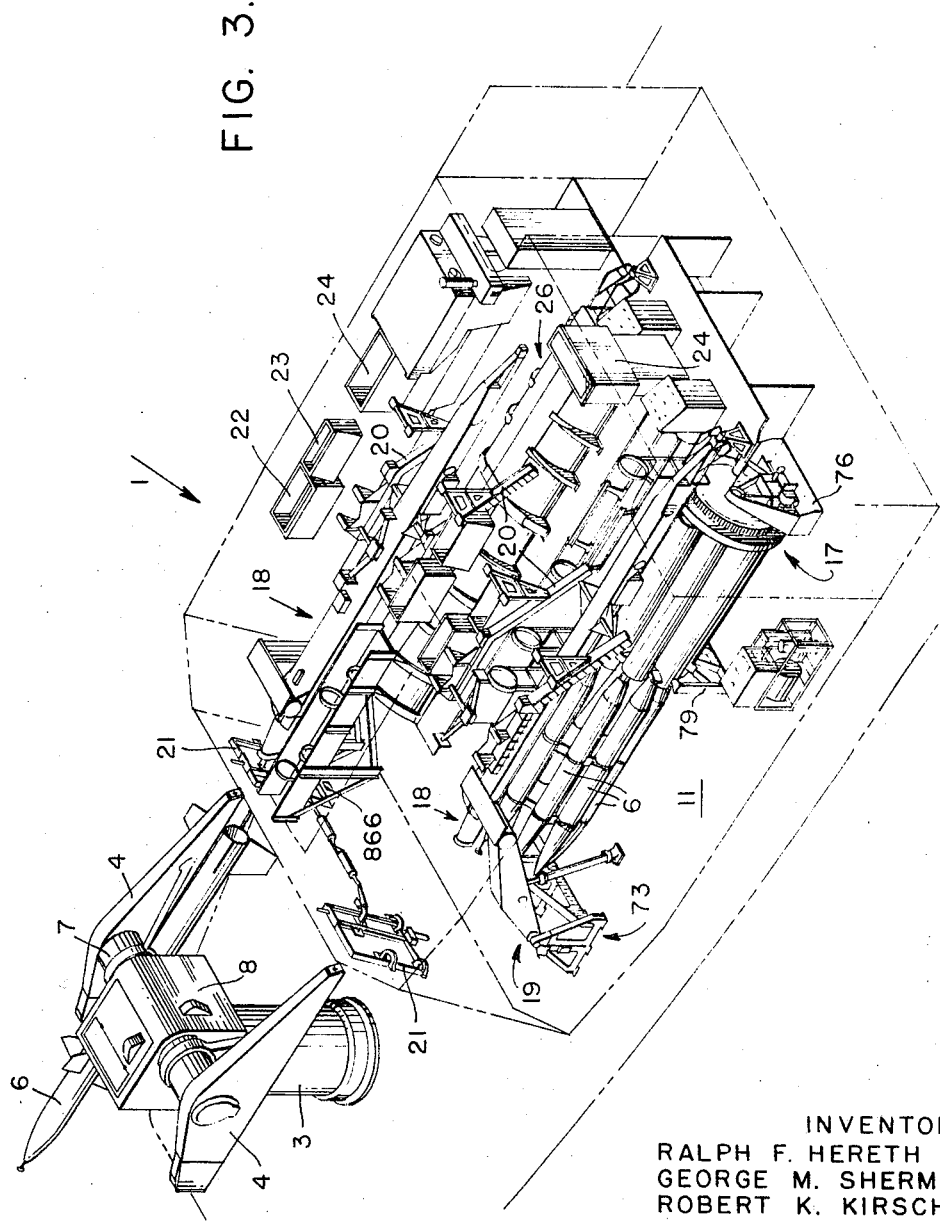

FIRING CYCLE TIMING (IN SECONDS)

Oct. 25, 1966  R. F. HERETH ETAL  3,280,702
MISSILE LAUNCHER TRANSFER MECHANISM
Filed Aug. 27, 1959  38 Sheets-Sheet 6

INVENTORS
RALPH F. HERETH
GEORGE M. SHERMAN
ROBERT K. KIRSCHNER
OMER R. BUTTERFIELD
BY

ATTORNEYS.

Oct. 25, 1966  R. F. HERETH ETAL  3,280,702
MISSILE LAUNCHER TRANSFER MECHANISM
Filed Aug. 27, 1959  38 Sheets-Sheet 7

INVENTORS.
RALPH F. HERETH
GEORGE M. SHERMAN
ROBERT K. KIRSCHNER
OMER R. BUTTERFIELD
BY

ATTORNEYS.

INVENTORS.
RALPH F. HERETH
GEORGE M. SHERMAN
ROBERT K. KIRSCHNER
OMER R. BUTTERFIELD
BY

ATTORNEYS.

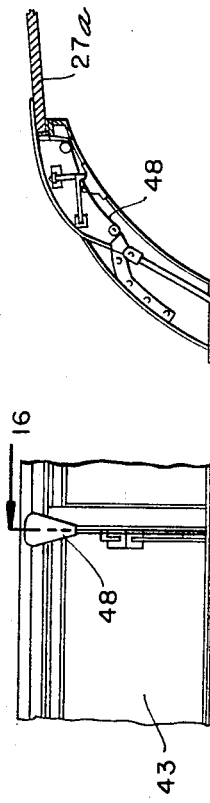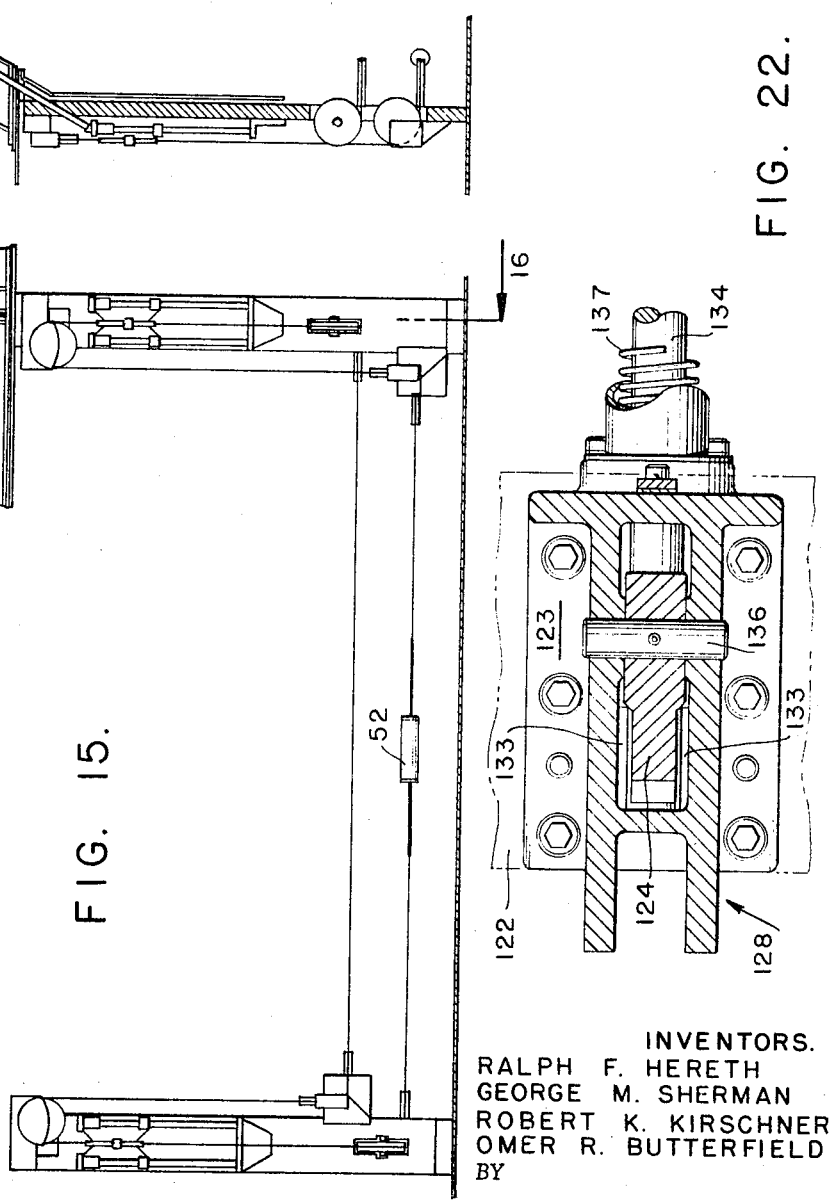

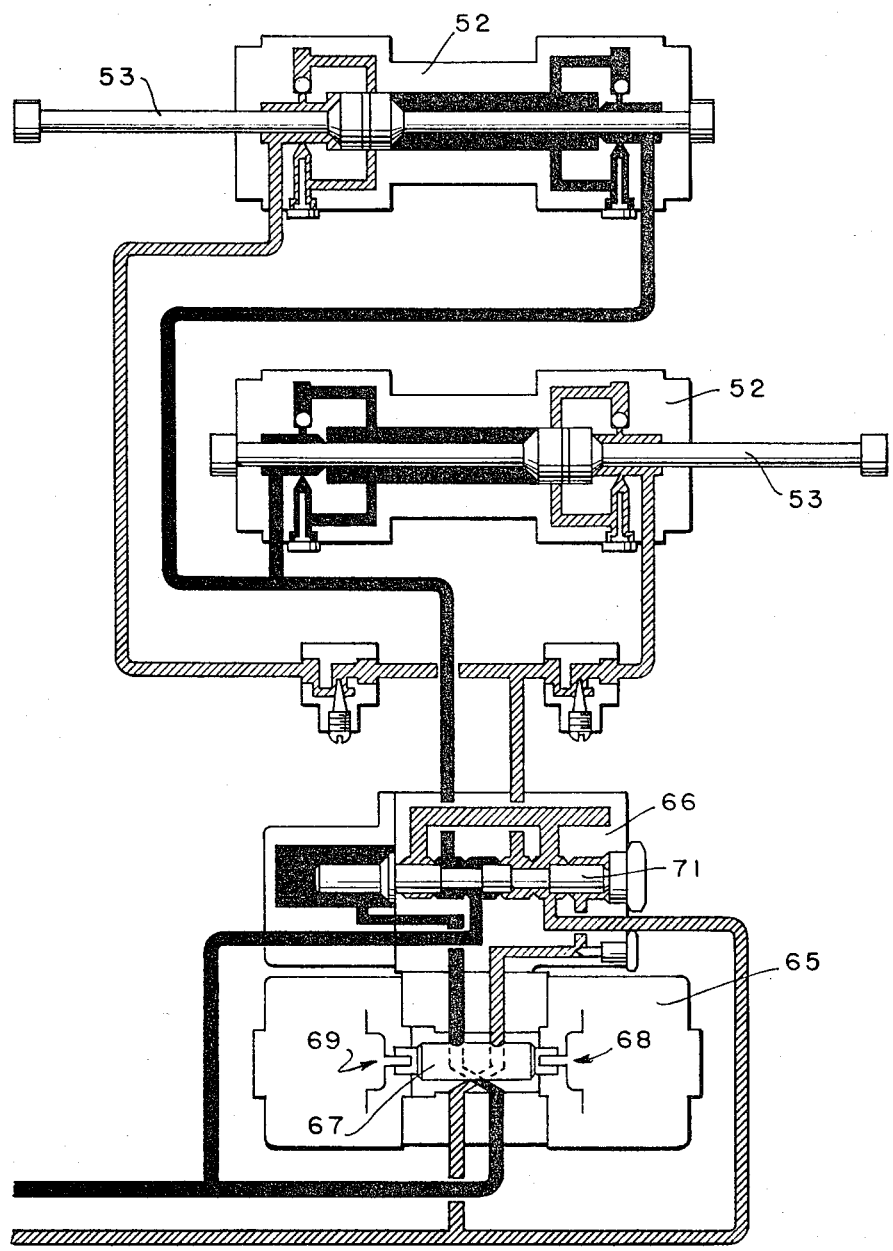

Oct. 25, 1966  R. F. HERETH ETAL  3,280,702
MISSILE LAUNCHER TRANSFER MECHANISM
Filed Aug. 27, 1959  38 Sheets-Sheet 11
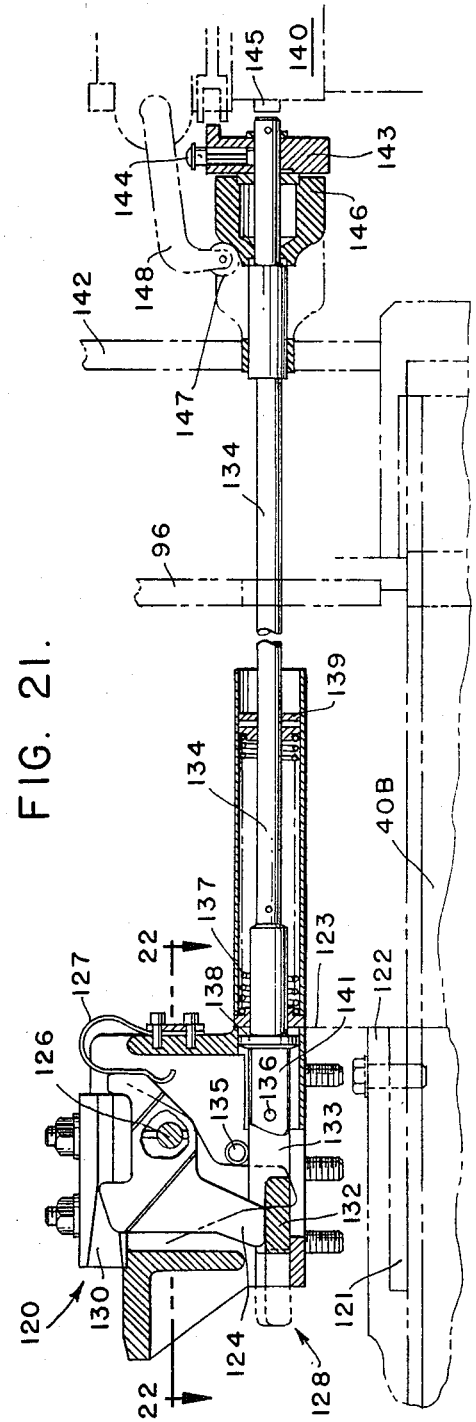
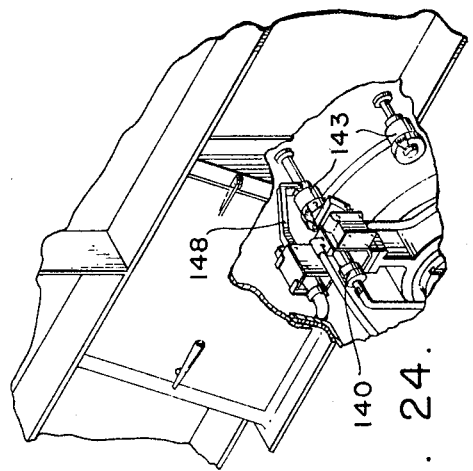
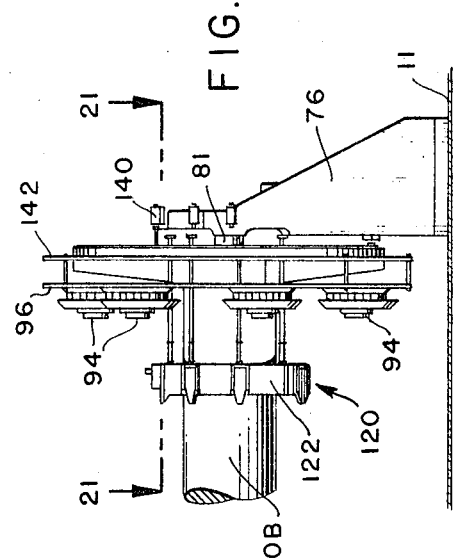
INVENTORS.
RALPH F. HERETH
GEORGE M. SHERMAN
ROBERT K. KIRSCHNER
OMER R. BUTTERFIELD
BY
ATTORNEYS.

Oct. 25, 1966    R. F. HERETH ETAL    3,280,702
MISSILE LAUNCHER TRANSFER MECHANISM

Filed Aug. 27, 1959    38 Sheets-Sheet 12

INVENTORS.
RALPH F. HERETH
GEORGE M. SHERMAN
ROBERT K. KIRSCHNER
OMER R. BUTTERFIELD
BY

ATTORNEYS.

Oct. 25, 1966 R. F. HERETH ETAL 3,280,702
MISSILE LAUNCHER TRANSFER MECHANISM
Filed Aug. 27, 1959 38 Sheets-Sheet 13

INVENTORS.
RALPH F. HERETH
GEORGE M. SHERMAN
ROBERT K. KIRSCHNER
OMER R. BUTTERFIELD
BY

*Paul L. Gritchlow*
ATTORNEYS.

Oct. 25, 1966

R. F. HERETH ETAL 3,280,702

MISSILE LAUNCHER TRANSFER MECHANISM

Filed Aug. 27, 1959

38 Sheets-Sheet 14

INVENTORS.
RALPH F. HERETH
GEORGE M. SHERMAN
ROBERT K. KIRSCHNER
OMER R. BUTTERFIELD
BY

ATTORNEYS.

INVENTORS.
RALPH F. HERETH
GEORGE M. SHERMAN
ROBERT K. KIRSCHNER
OMER R. BUTTERFIELD
BY

ATTORNEYS.

▨ TANK
■ PRESSURE
▦ BLOCKED FLUID

INVENTORS.
RALPH F. HERETH
GEORGE M. SHERMAN
ROBERT K. KIRSCHNER
OMER R. BUTTERFIELD
BY

ATTORNEYS.

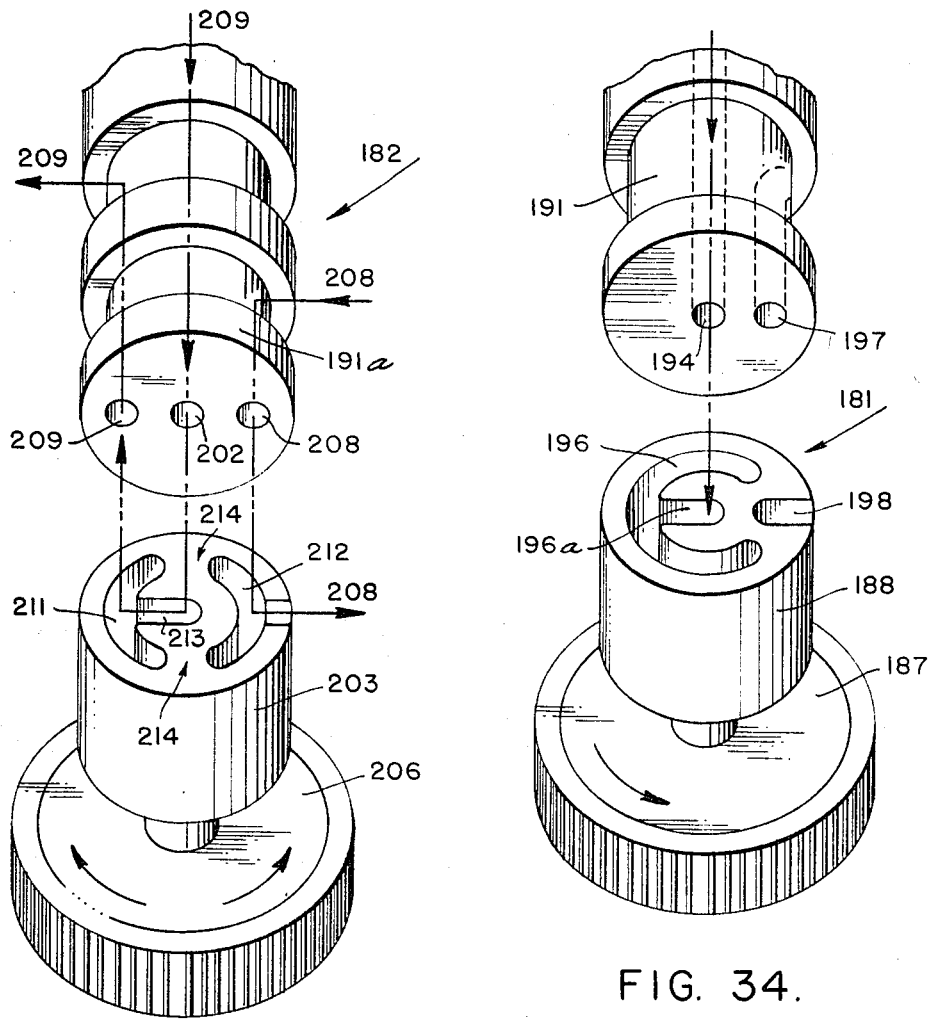

Oct. 25, 1966 R. F. HERETH ETAL 3,280,702
MISSILE LAUNCHER TRANSFER MECHANISM
Filed Aug. 27, 1959 38 Sheets-Sheet 19

INVENTORS.
RALPH F. HERETH
GEORGE M. SHERMAN
ROBERT K. KIRSCHNER
OMER R. BUTTERFIELD
BY

ATTORNEYS.

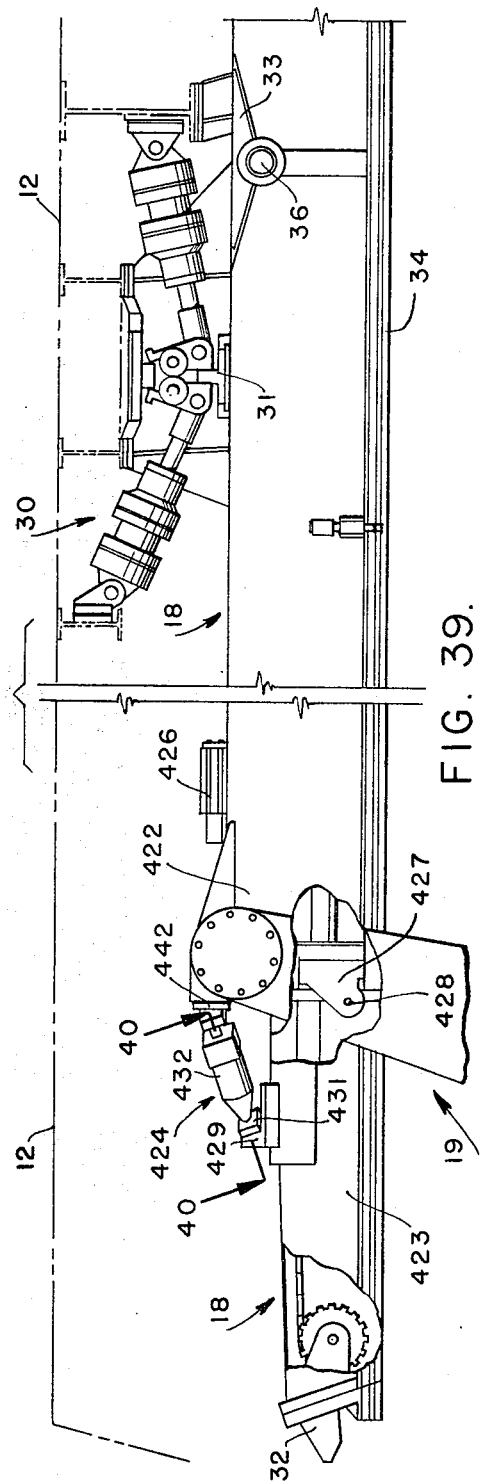
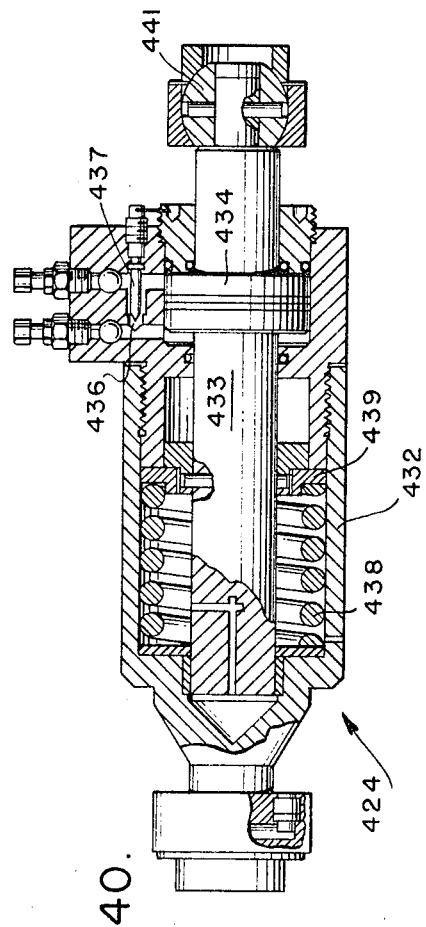
FIG. 39.
FIG. 40.
INVENTORS.
RALPH F. HERETH
GEORGE M. SHERMAN
ROBERT K. KIRSCHNER
OMER R. BUTTERFIELD
BY
ATTORNEYS.

Oct. 25, 1966  R. F. HERETH ETAL  3,280,702
MISSILE LAUNCHER TRANSFER MECHANISM
Filed Aug. 27, 1959  38 Sheets-Sheet 22

INVENTORS.
RALPH F. HERETH
GEORGE M. SHERMAN
ROBERT K. KIRSCHNER
OMER R. BUTTERFIELD
BY

ATTORNEYS.

////// TANK
■■■ PRESSURE
▒▒▒ BLOCKED FLUID

INVENTORS.
RALPH F. HERETH
GEORGE M. SHERMAN
ROBERT K. KIRSCHNER
OMER R. BUTTERFIELD
BY

ATTORNEYS.

INVENTORS.
RALPH F. HERETH
GEORGE M. SHERMAN
ROBERT K. KIRSCHNER
OMER R. BUTTERFIELD
BY

ATTORNEYS.

Oct. 25, 1966   R. F. HERETH ETAL   3,280,702
MISSILE LAUNCHER TRANSFER MECHANISM
Filed Aug. 27, 1959                   38 Sheets-Sheet 27

INVENTORS.
RALPH F. HERETH
GEORGE M. SHERMAN
ROBERT K. KIRSCHNER
OMER R. BUTTERFIELD
BY

ATTORNEYS.

Oct. 25, 1966   R. F. HERETH ETAL   3,280,702
MISSILE LAUNCHER TRANSFER MECHANISM
Filed Aug. 27, 1959   38 Sheets-Sheet 28
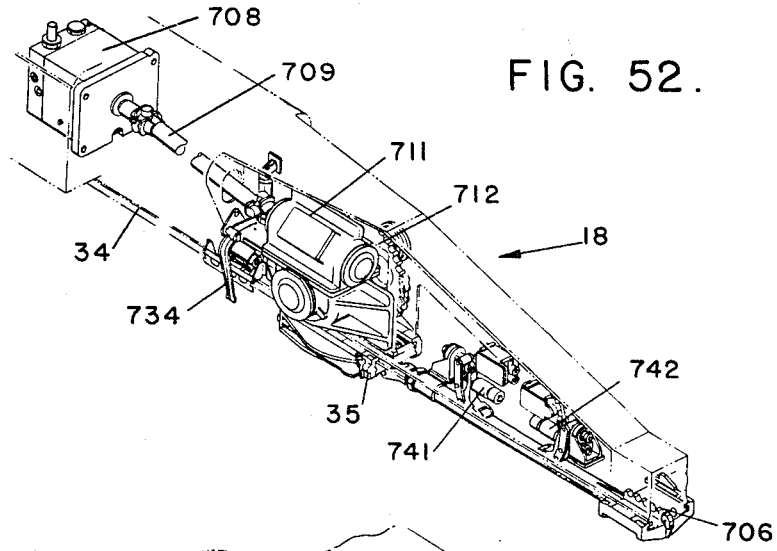
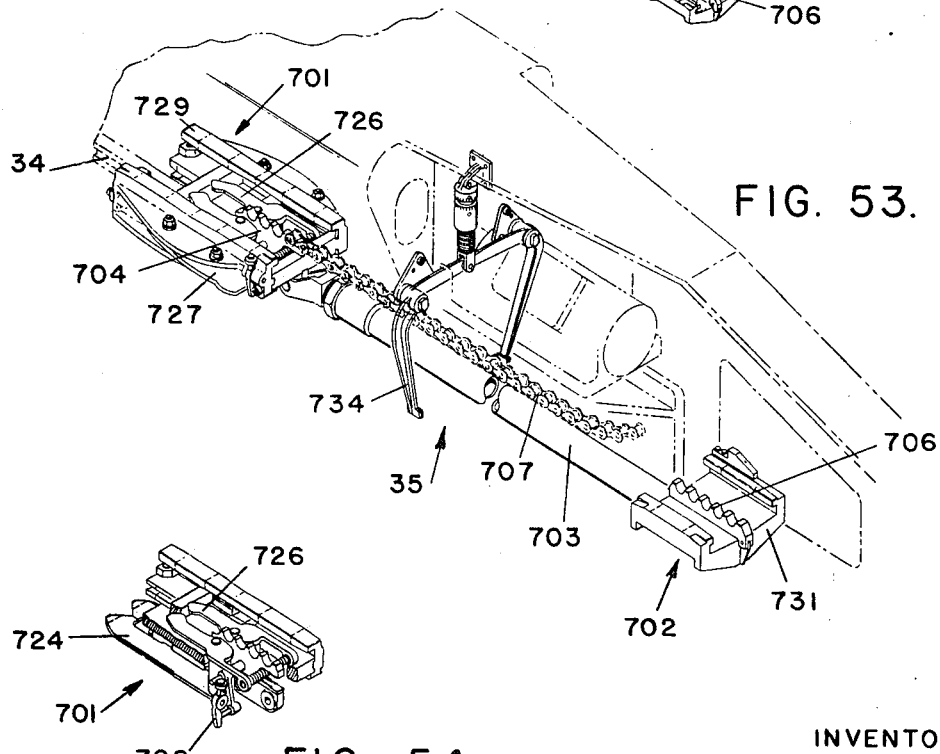
INVENTORS.
RALPH F. HERETH
GEORGE M. SHERMAN
ROBERT K. KIRSCHNER
OMER R. BUTTERFIELD
BY
ATTORNEYS.

INVENTORS.
RALPH F. HERETH
GEORGE M. SHERMAN
ROBERT K. KIRSCHNER
OMER R. BUTTERFIELD
BY

ATTORNEYS.

Oct. 25, 1966 R. F. HERETH ETAL 3,280,702
MISSILE LAUNCHER TRANSFER MECHANISM

Filed Aug. 27, 1959 38 Sheets-Sheet 30

INVENTORS.
RALPH F. HERETH
GEORGE M. SHERMAN
ROBERT K. KIRSCHNER
OMER R. BUTTERFIELD
BY

ATTORNEYS.

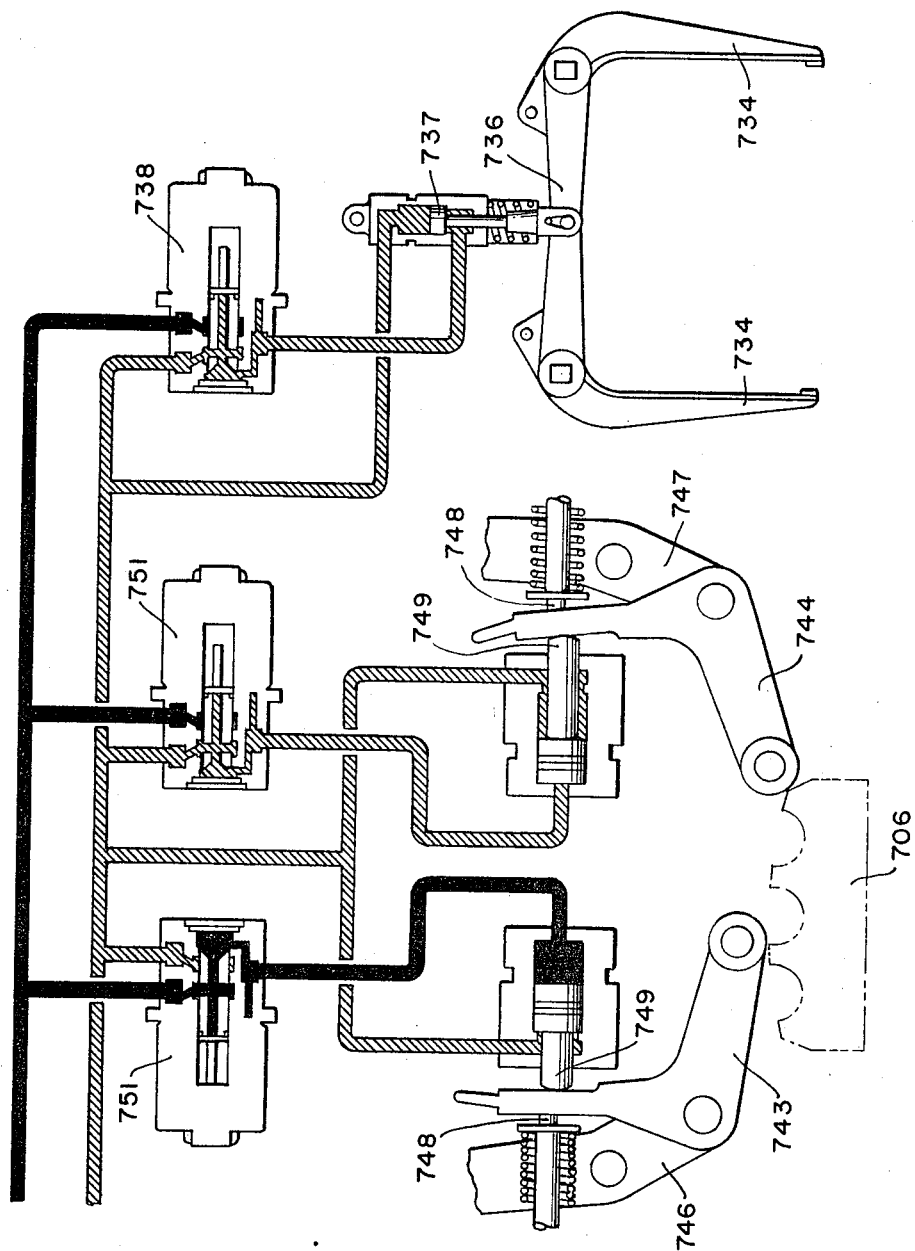

INVENTORS.
RALPH F. HERETH
GEORGE M. SHERMAN
ROBERT K. KIRSCHNER
OMER R. BUTTERFIELD
BY

ATTORNEYS.

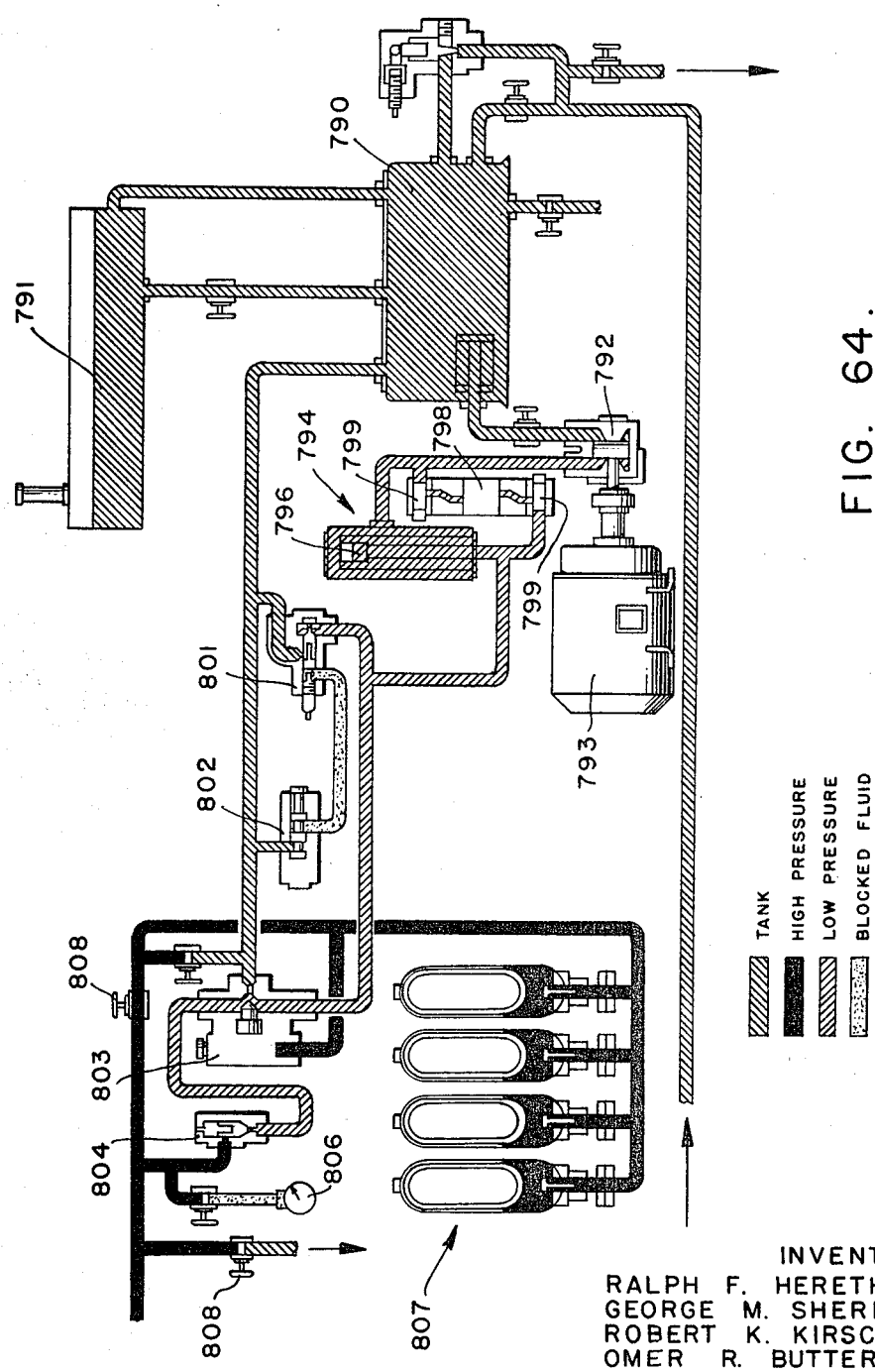

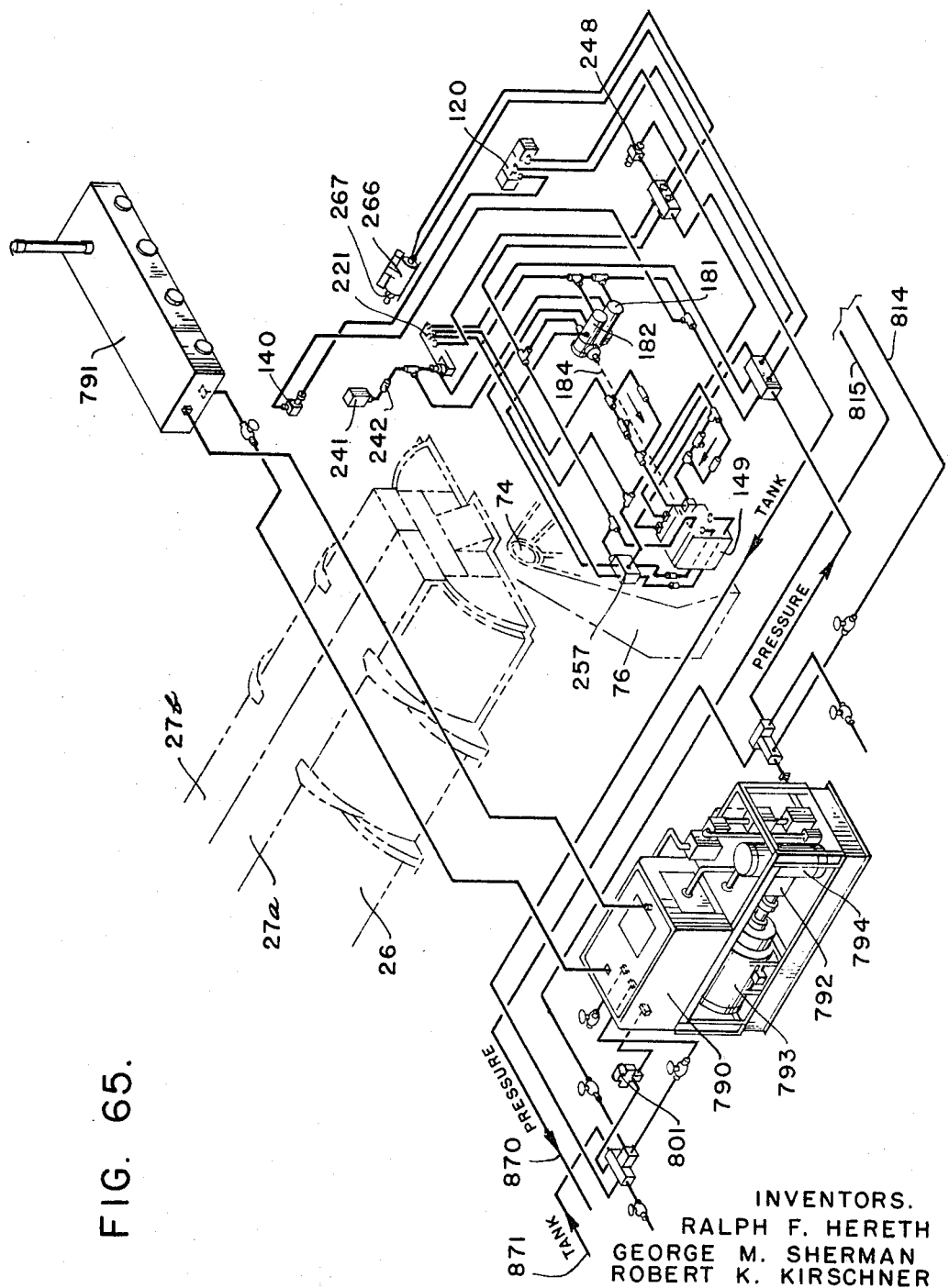

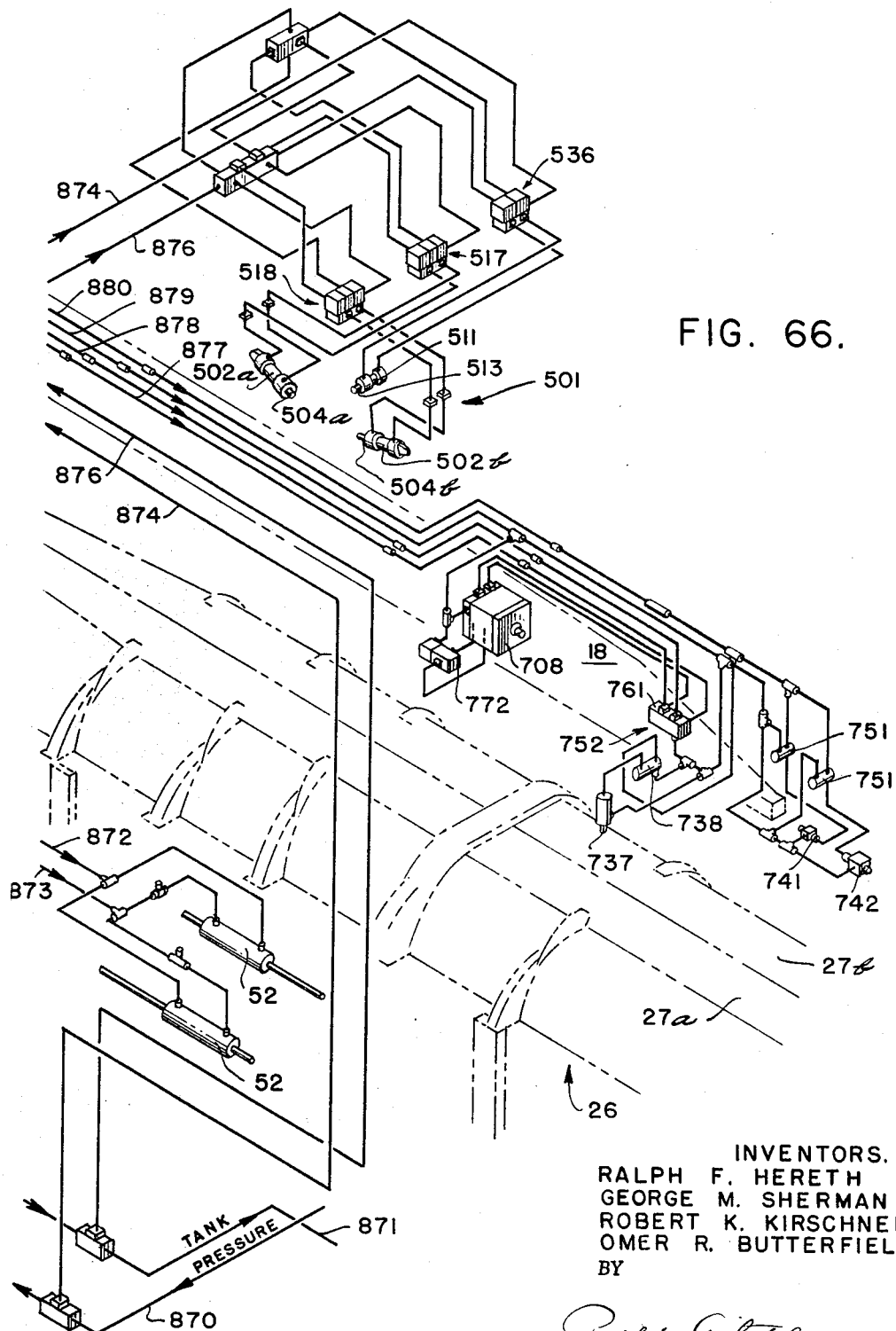

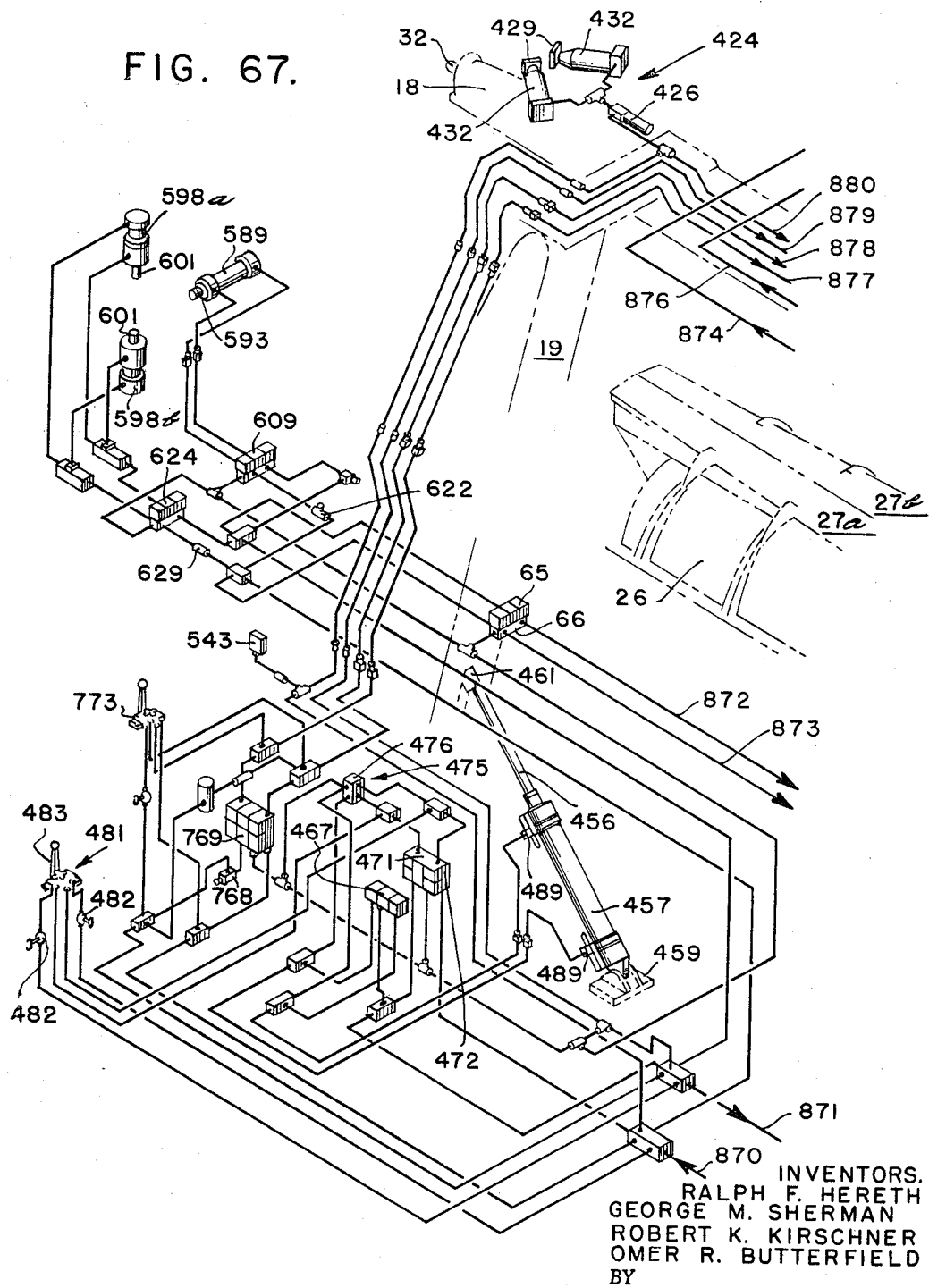

United States Patent Office 3,280,702
Patented Oct. 25, 1966

3,280,702
MISSILE LAUNCHER TRANSFER MECHANISM
Ralph F. Hereth, Port Orchard, George M. Sherman and Omer R. Butterfield, Bremerton, and Robert K. Kirschner, Seattle, Wash., assignors to the United States of America as represented by the Secretary of the Navy
Filed Aug. 27, 1959, Ser. No. 836,555
6 Claims. (Cl. 89—1.805)

The invention described herein may be manufactured and used by or for the Government of the United States of America for governmental purposes without the payment of any royalties thereon or therefor.

The present invention relates to missile launchers and, more particularly, to the remotely-controlled, semi-automatic type of launcher adapted for shipboard use.

As readily will be appreciated launchers of the type under consideration involve a wide variety of relatively complex and intricately-controlled structural arrangements which, in a broad functional sense, serve the purpose of moving missiles from a stowed disposition onto a launcher arm from which the missiles are fired. The missiles themselves usually are quite large and heavy objects, particularly when considered in conjunction with their booster components, and they require extremely delicate handling not only in the loading and firing operation but also in their storage as well as in other operations such as missile check-out, unloading, underway exercising or strike down. Safe handling becomes critical when the missiles are transferred from one component or station to the next, and the handling further is complicated by the fact that any shipboard installation must anticipate heavy shocks or the frequently rough pitch and roll of the ship.

Most launchers are characterized by their use of three such stations or components, the first being a stowage mechanism which in many instances is in the form of a magazine capable of supporting the stowed missiles, and, as occasion demands, selectively presenting a missile to the second component which will be referred to as a loader mechanism. The third component is the launcher arm itself from which the missile is fired, and the launcher loader mechanism usually moves the missile onto the launcher arm either by a pushing, pulling or carrying force. Transfer of the missile from one of these components to the next requires a high degree of precision movement as well as stability and reliability. Many other similar needs for precision disposition occur during other phases of the loading and firing.

Automatic or semi-automatic operation is itself a very desirable but complex achievement. Usually, such operation entails a power system for effecting the various complicated mechanical movements, and, as might be expected, the power system is electrically-controlled from one or more control stations at which are provided the necessary switches and indicating devices. Other considerations affecting the over-all arrangements, particularly of shipboard launchers, involve space requirements, the need for rapid firing, safety both of personnel and equipment, and the protection of the missile, as well as the launcher components, from the deteriorating effect of sea water and moist atmosphere. Of course, the problems confronting each installation will vary considerably in accordance with many considerations, such as the type of ship in question, the allotted space, the type and size of missile, its operational capabilities and the manner in which the launcher arm itself is controlled through train and elevations.

The more generalized objects of the present invention will be somewhat apparent from the above discussion. For example, in one of its aspects, it is concerned with providing a shipboard type of launcher capable of semi-automatic operation to the extent that its loading and firing phases can be remotely controlled from a central station.

Another object is to provide a missile launcher capable of being installed aboard ship in a minimum amount of space and, more specifically, to provide a launcher in which each of the components, such as the stowage magazine, the loader and the launcher, individually occupy a relatively small area and, in overall arrangement, are capable of being mutually disposed in a compact, space-saving disposition. In general, this object, as well as others, is achieved by a novel arrangement and a mode of operation in which the loader arm is arcuately swung in its movement between the magazine and the launcher.

A further important object is to provide a rapid firing launcher which contemplates the maximum safety of its operating personnel.

Yet another object contemplates the protection of the launcher apparatus itself from the deteriorating effects of weather and ocean atmosphere.

A further object is the provision of a shipboard type of launcher employing a mechanism for storing missiles, a remotely controlled launcher arm, and loading means for engaging a stowed missile and transporting it to its launching position on the launcher arm.

An object related to the last-mentioned object is the provision of a magazine capable of storing a maximum number of missiles in a minimum amount of space, and, of equal but separate significance, one that also is capable of automatically selecting a "ready" missile and presenting it to the loader arm.

One of the more specific objects is that of providing a launcher capable of stowing, loading and firing missiles designed to carry both wings and fins. In this regard, a feature is to stow the missiles without their wings and fins removed, such a storage permitting the use of a relatively small magazine which, in turn, occupies a minimum amount of space. A related object and feature is that of providing a wing and fin assembly station and suitable means for securely arresting the movement of the missile loader at that station for the final assemblage of the wings and fins.

A further, somewhat generalized object contemplates the stowage of the missiles at one particular elevational level of the ship and the subsequent transportation of these missiles from this elevation to a higher elevation at which is disposed the launcher arm. The arcuate or swinging movement of the loader arm is well adapted for the accomplishment of this object.

Another closely related object is that of providing means for supplementing the movement of the missile loader so as to permit the missile to be moved from the loader onto the launcher arm. A rammer car which will be described is employed for this purpose as well as others.

The invention also contemplates all phases or modes of launcher operation including, in addition to the loading and firing phase, those of unloading, underway exercising and strike down. For example, the automatic controls are such that underway exercising can be carried out without the actual use of missiles, although all parts of the apparatus can be driven to train the operating personnel. Also, missiles can be unloaded from the launcher arm in the event they are not fired and, of course, this phase of the operation is remotely and automatically controlled.

Other objects involve numerous inter-related hydraulic and electric details, as well as many safety features, such as latches, latch release mechanisms and additional features enabling greater reliability and firing efficiency. These objects, as well as many others which form important parts of the invention, will be more readily ascertainable in the detailed description which is to follow.

A preferred embodiment of the invention is illustrated in the accompanying drawings of which:

FIG. 1 is a side elevation of the launcher and its deckhouse, a side wall of the deckhouse being removed for illustrative purposes.

Figure 6:
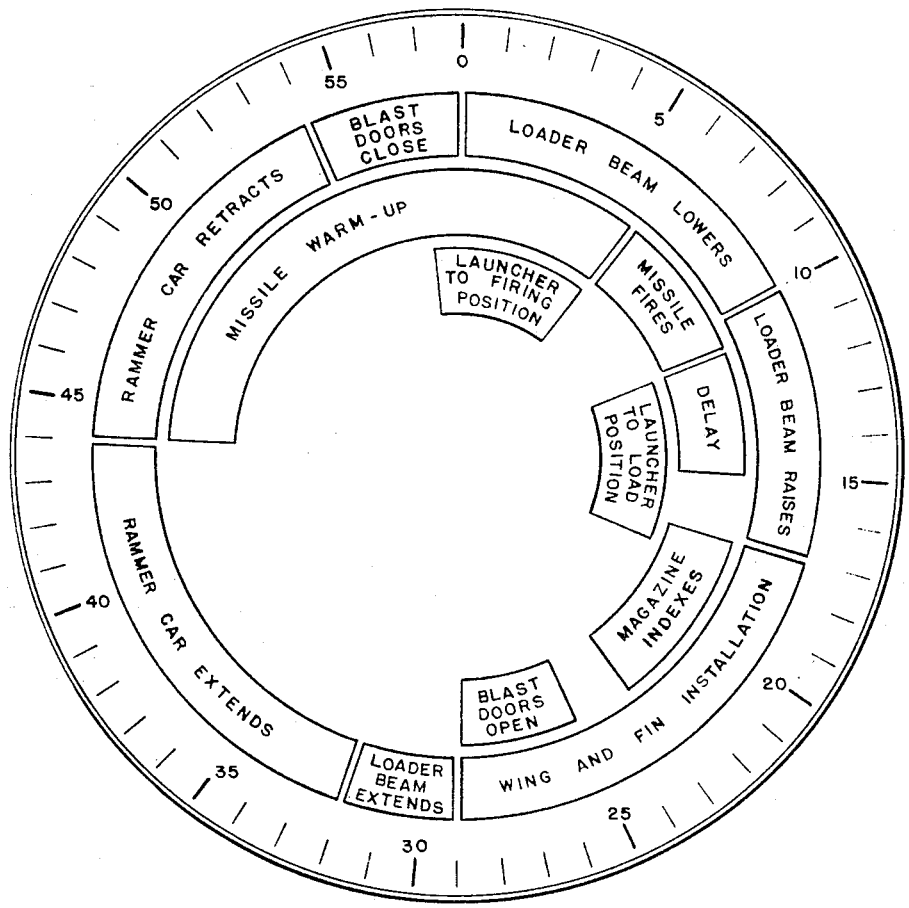
Figure 9:
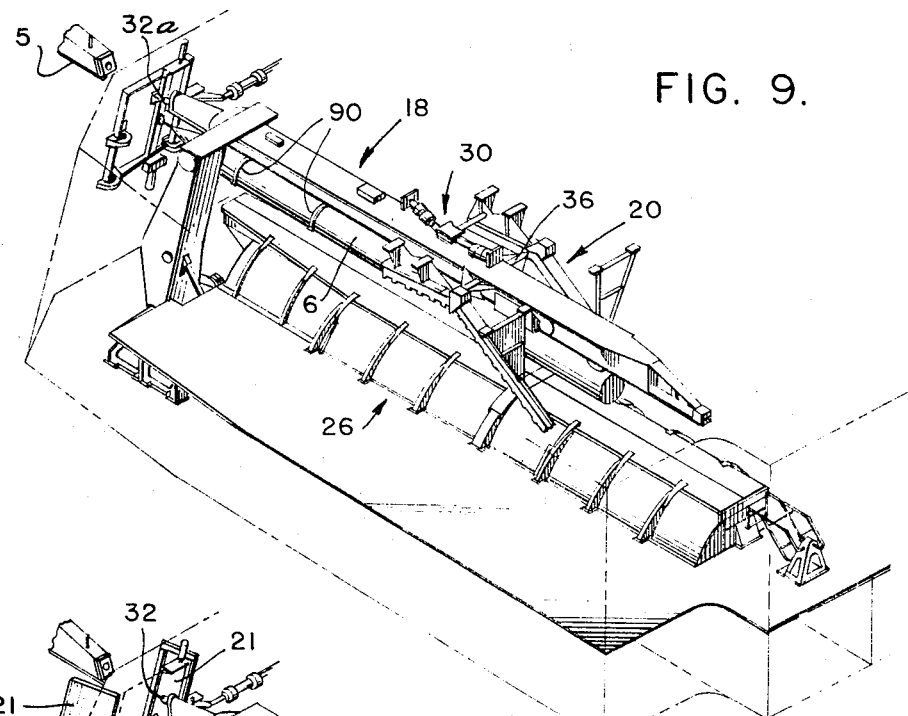
Figure 10:
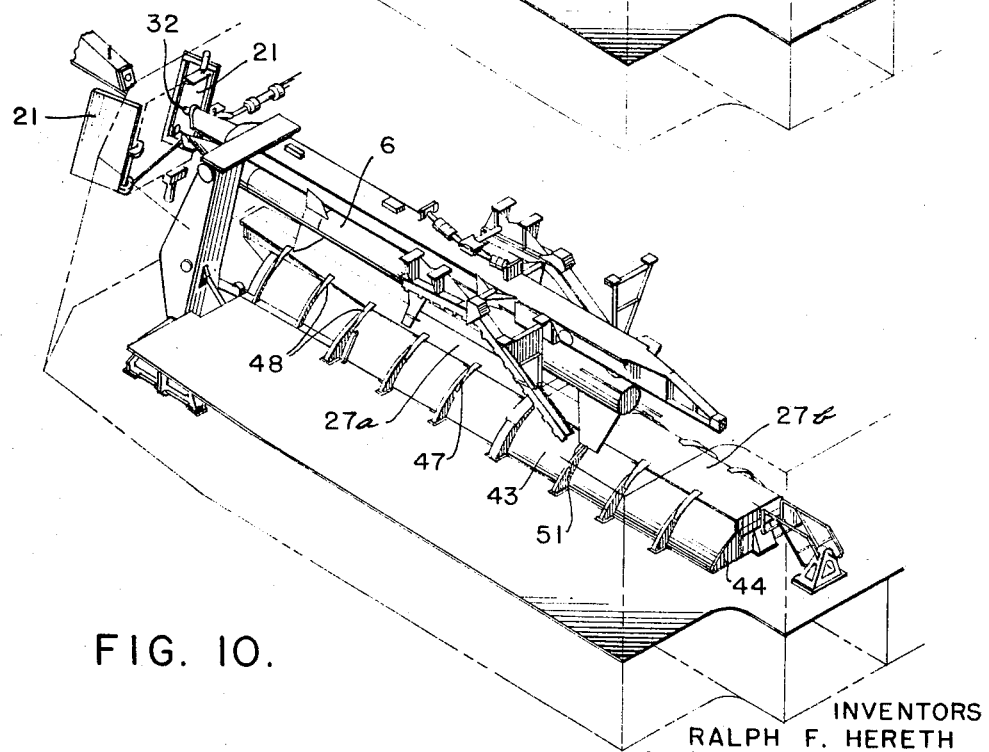
Figure 11:
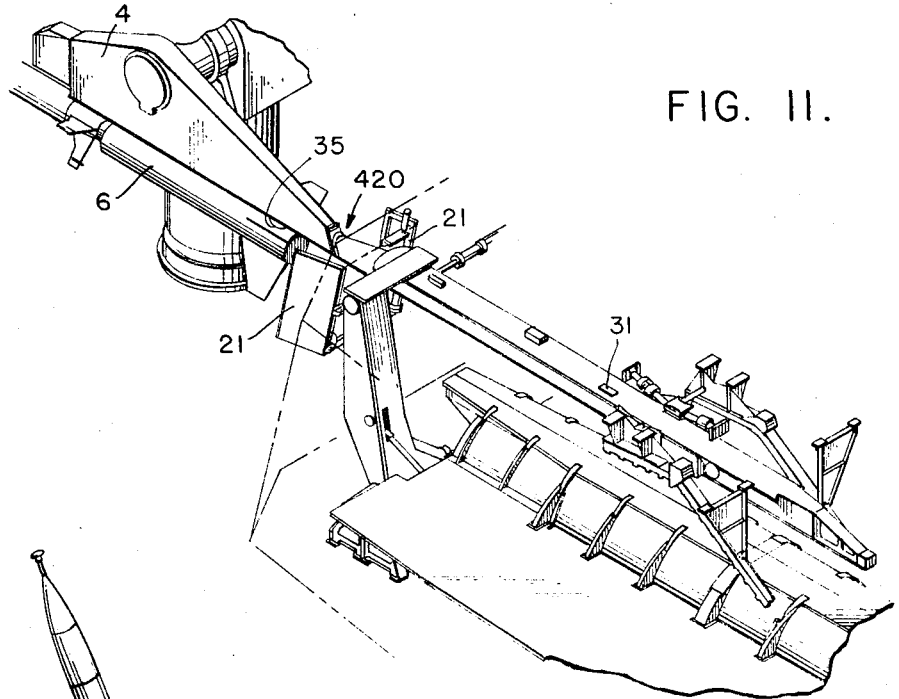
Figure 12:
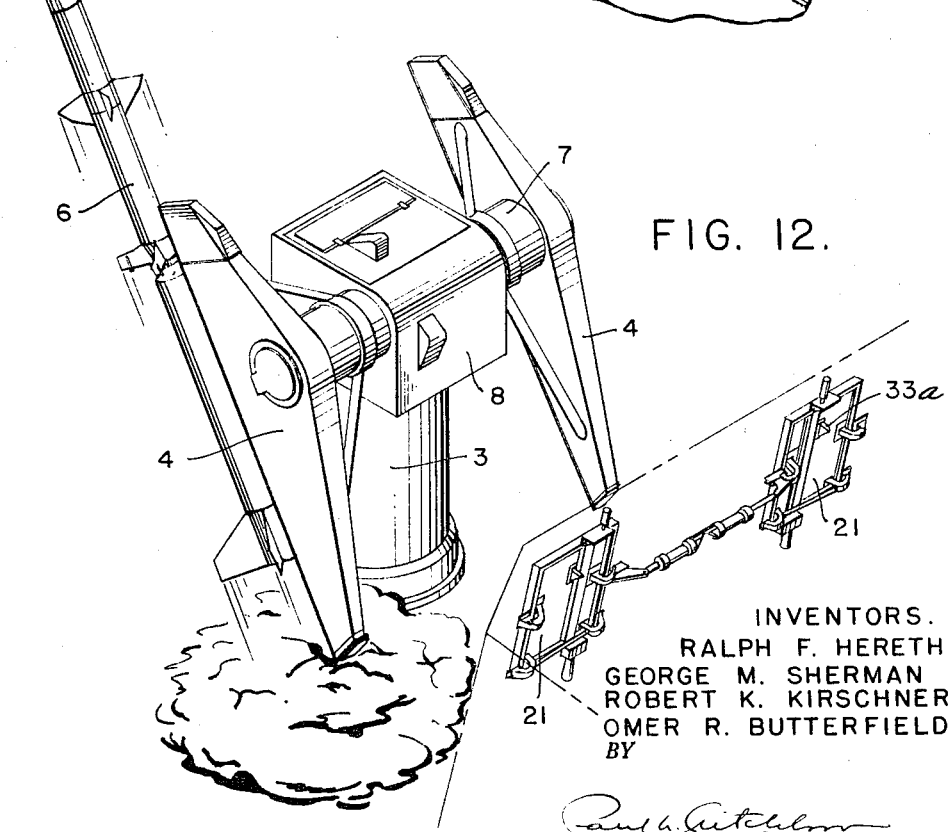
Figure 14:
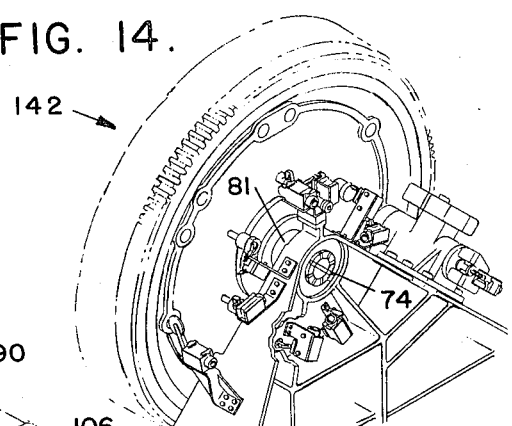
Figure 13:
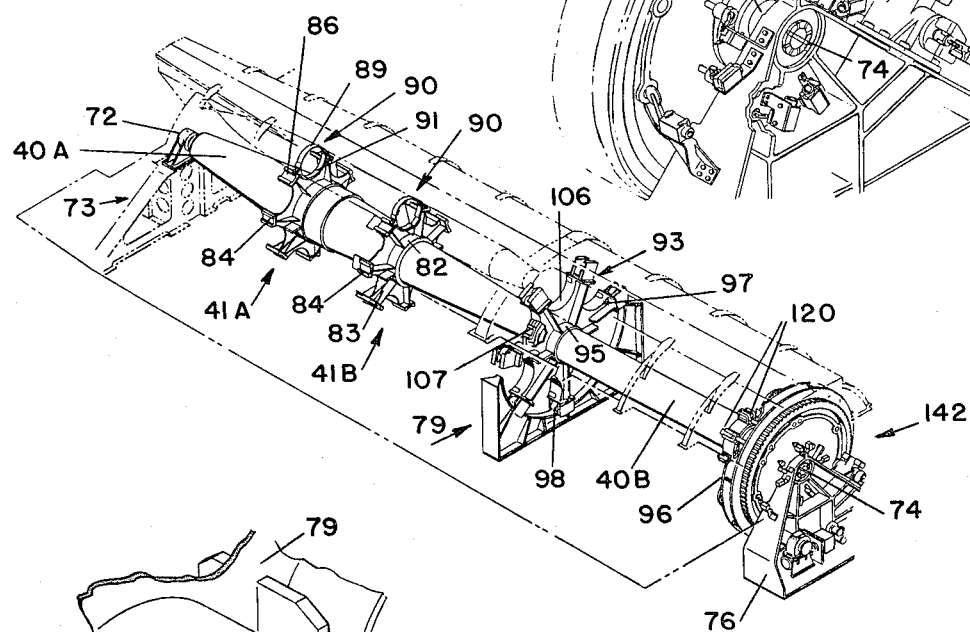
Figures 19, 23:
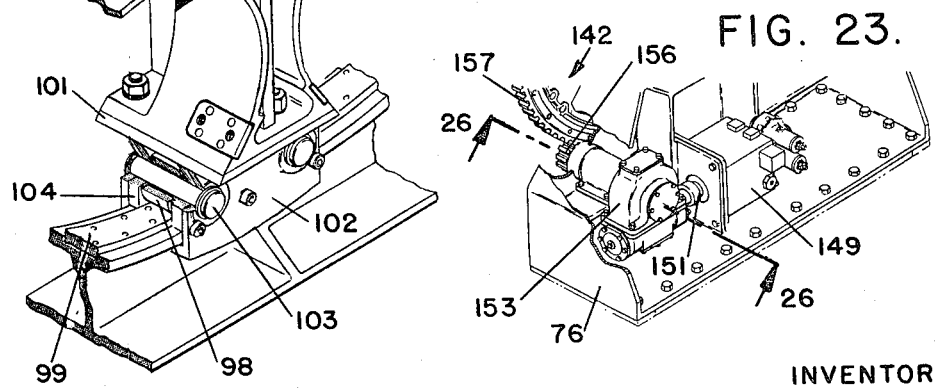
Figure 25:
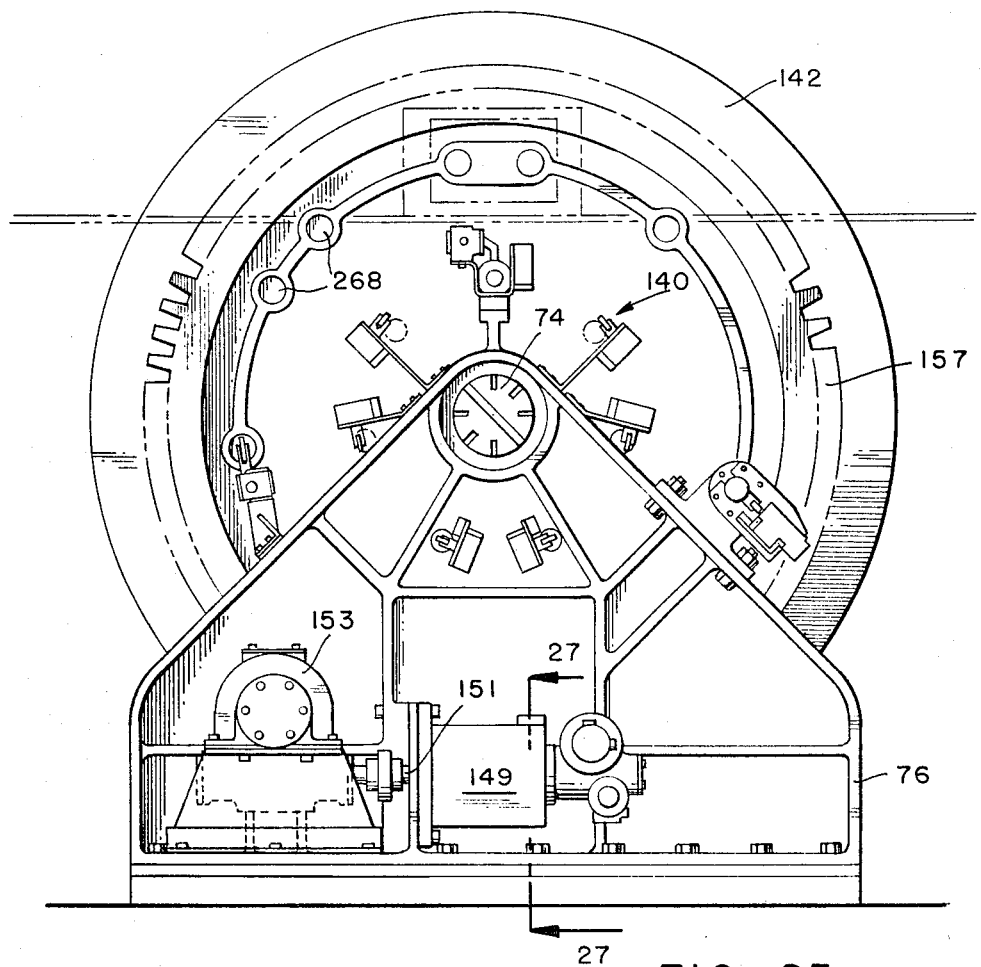
Figure 20:
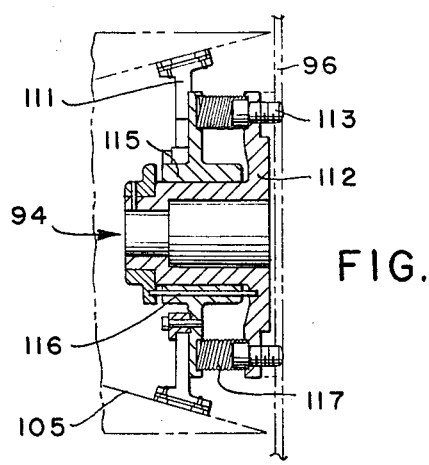
Figure 26:
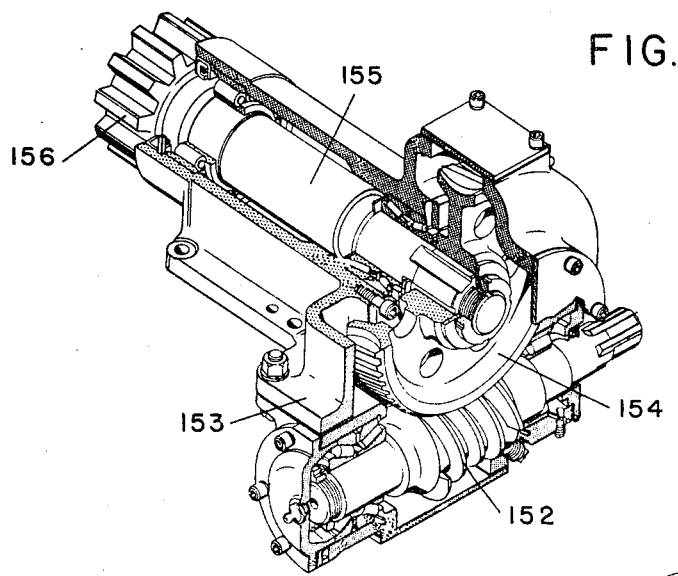
Figure 33:
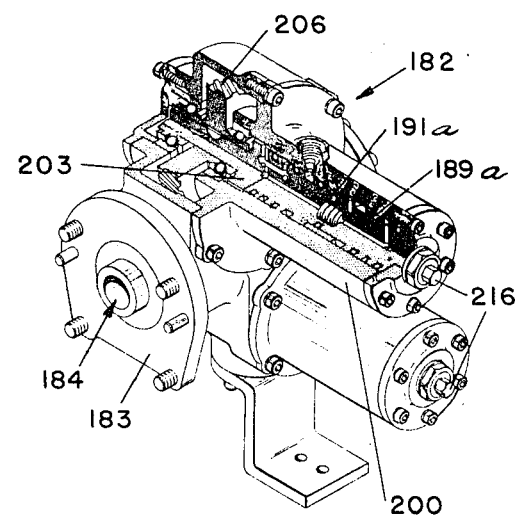
Figure 32:
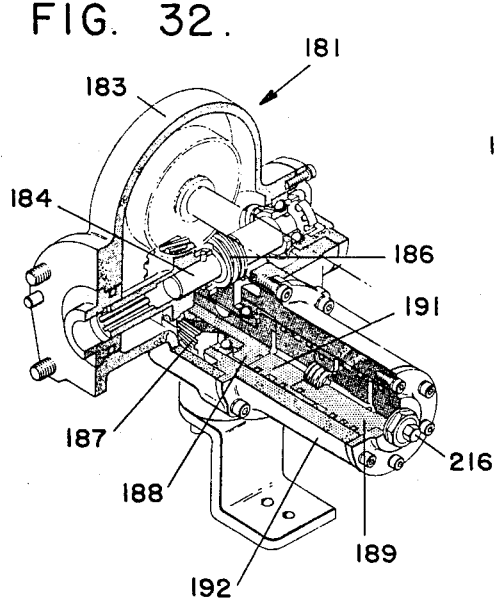
Figure 27:
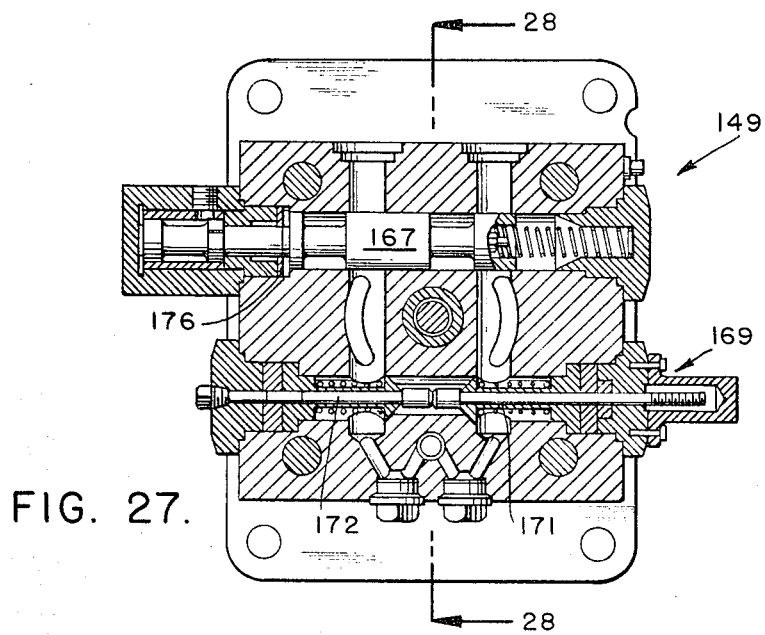
Figure 28:
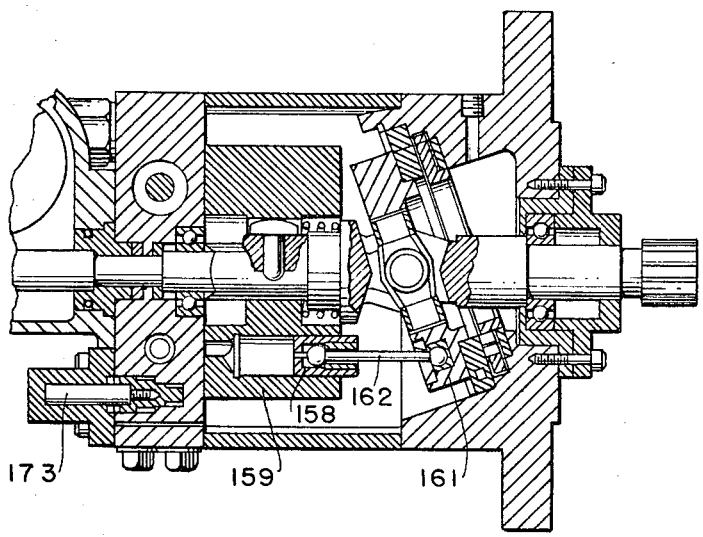
Figure 29:
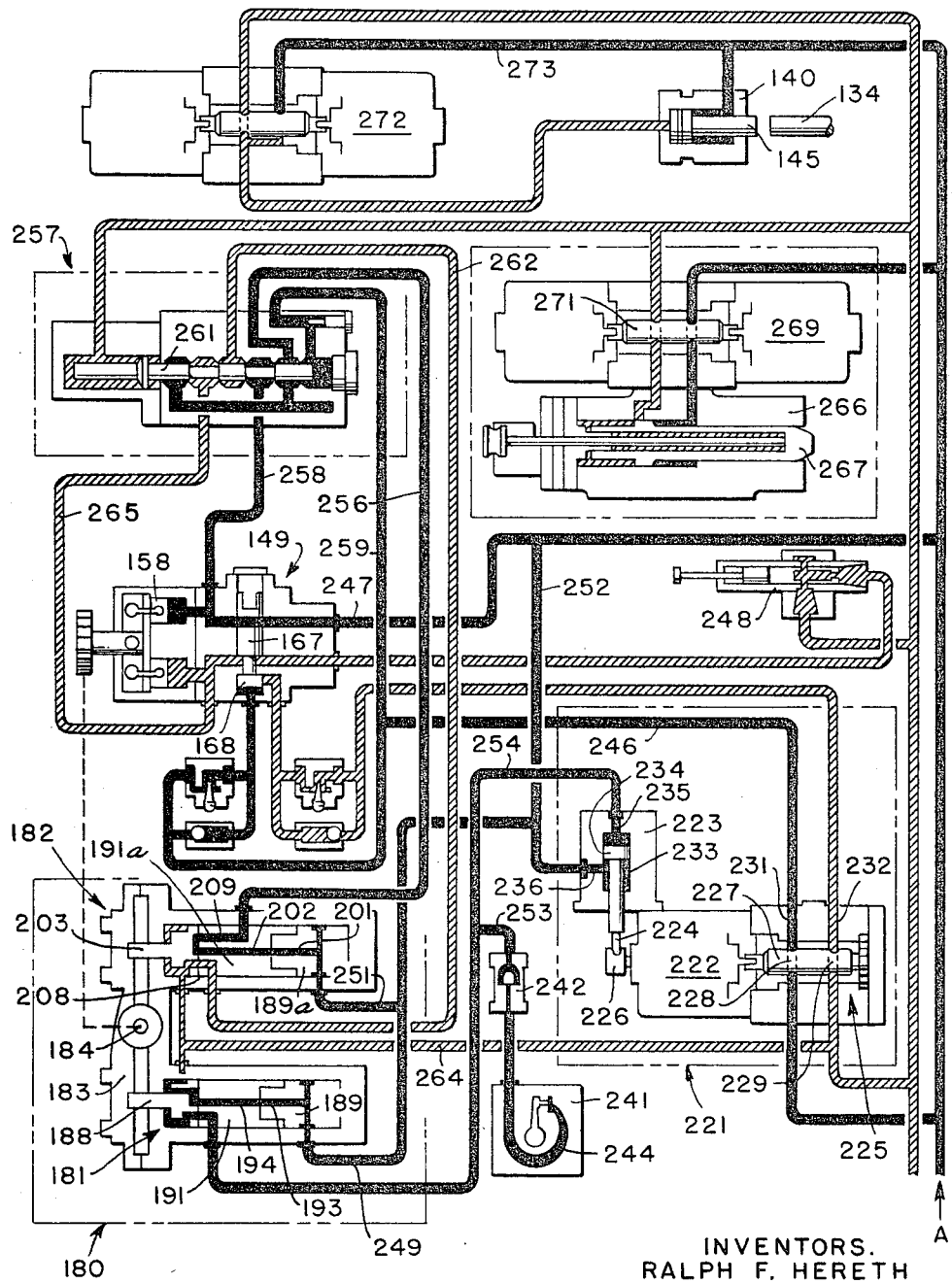
Figure 30:
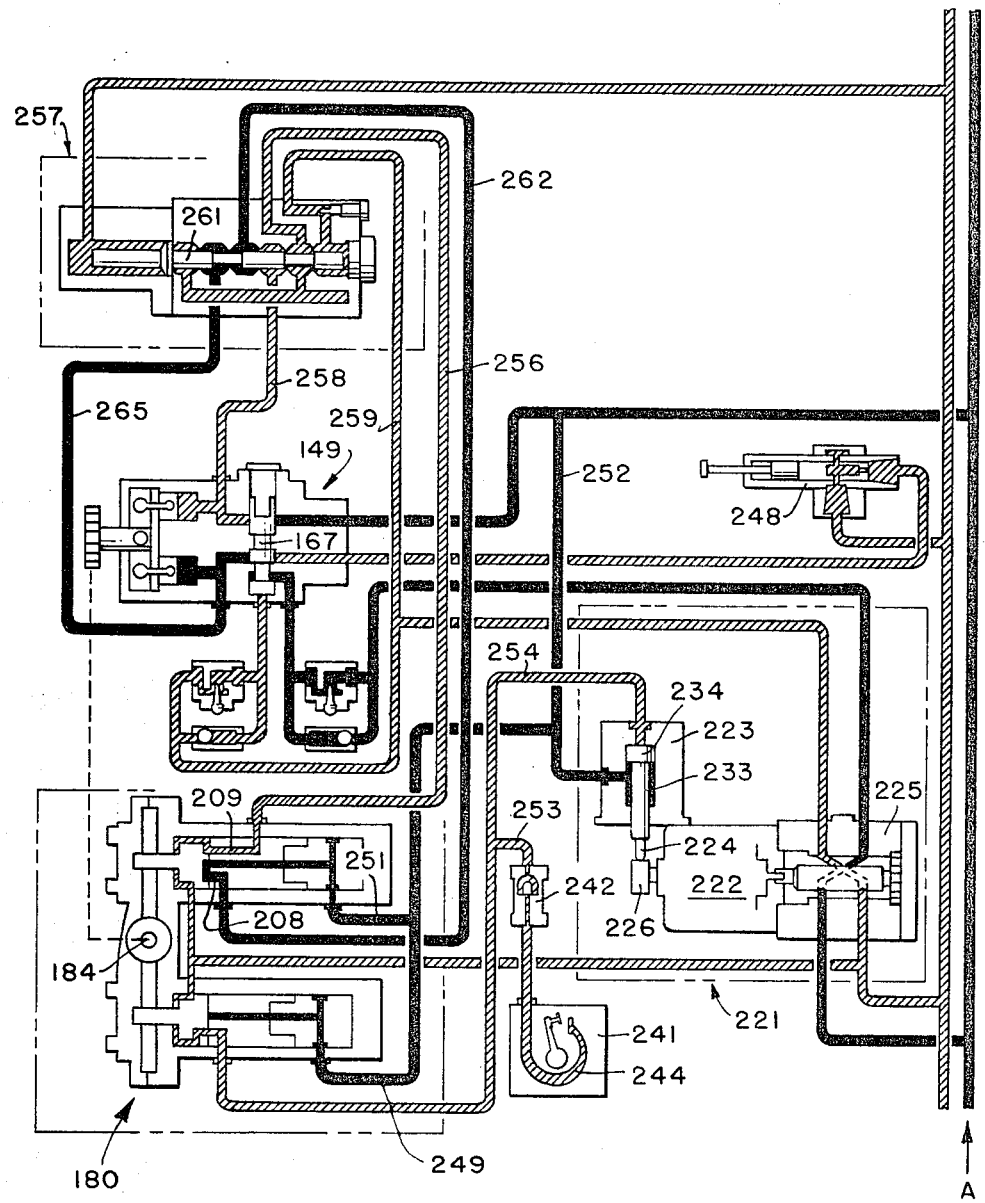
Figure 31:
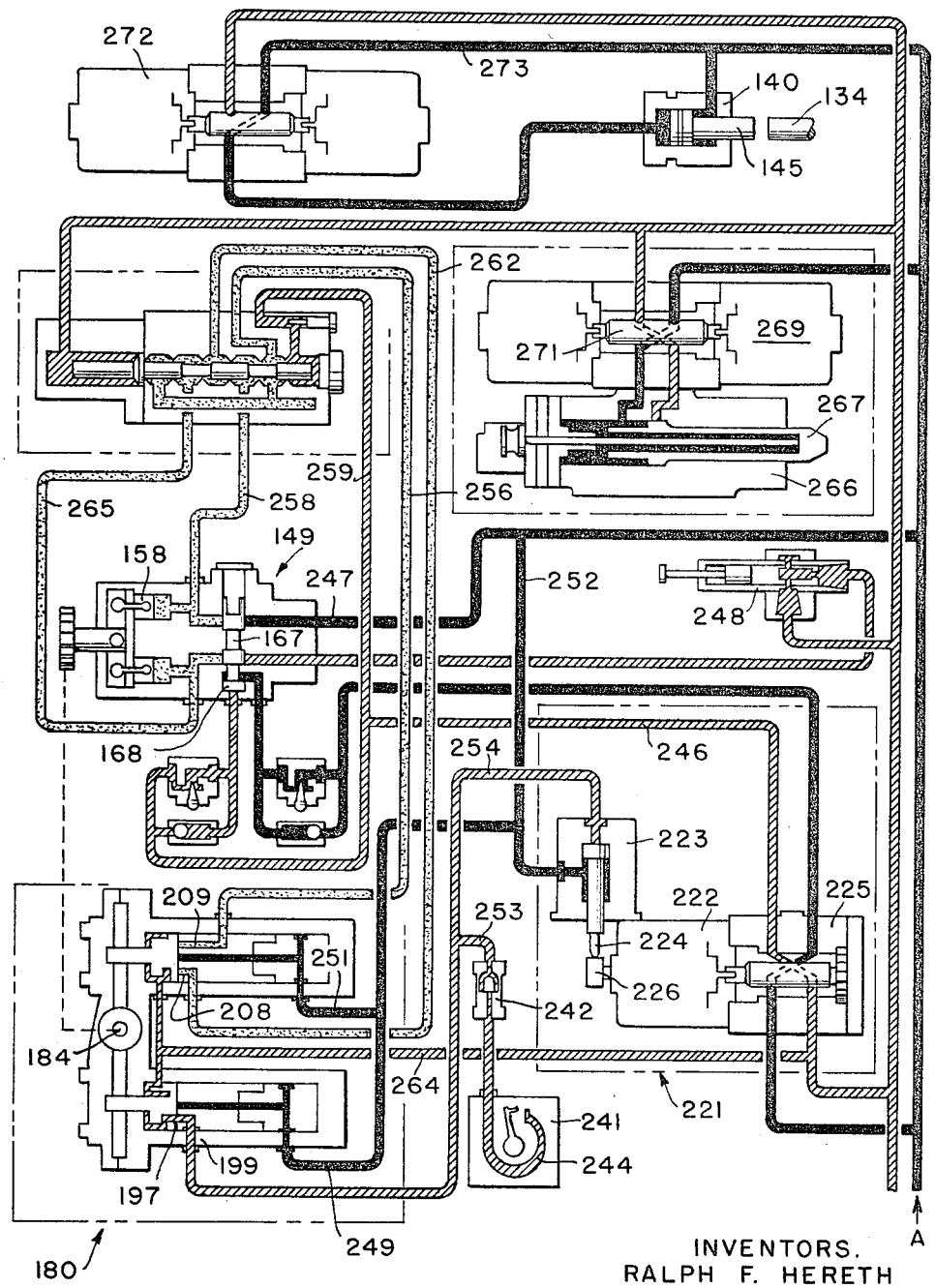
Figure 36:
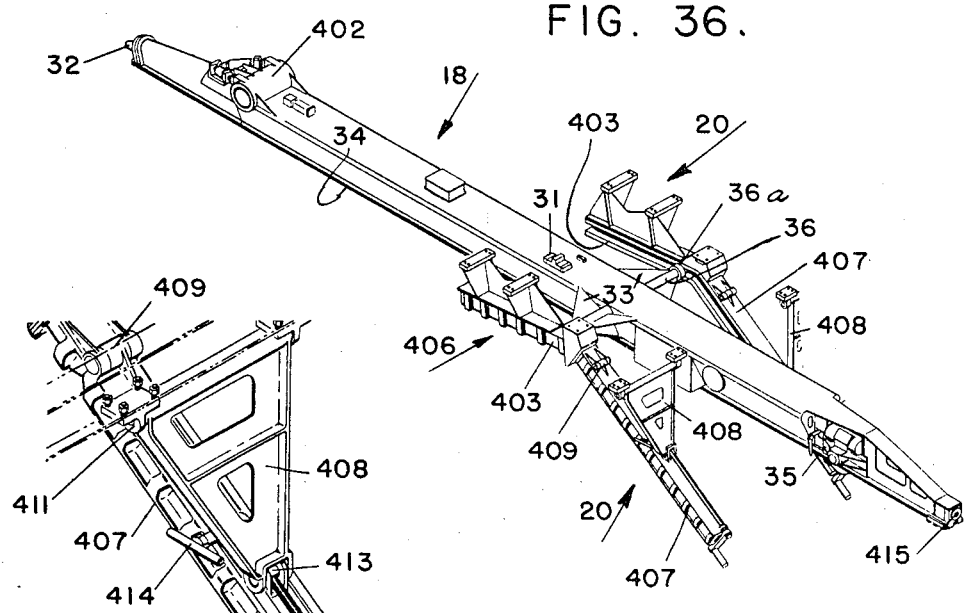
Figure 37:
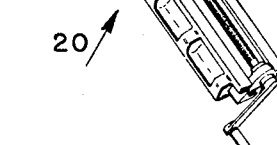
Figure 38:
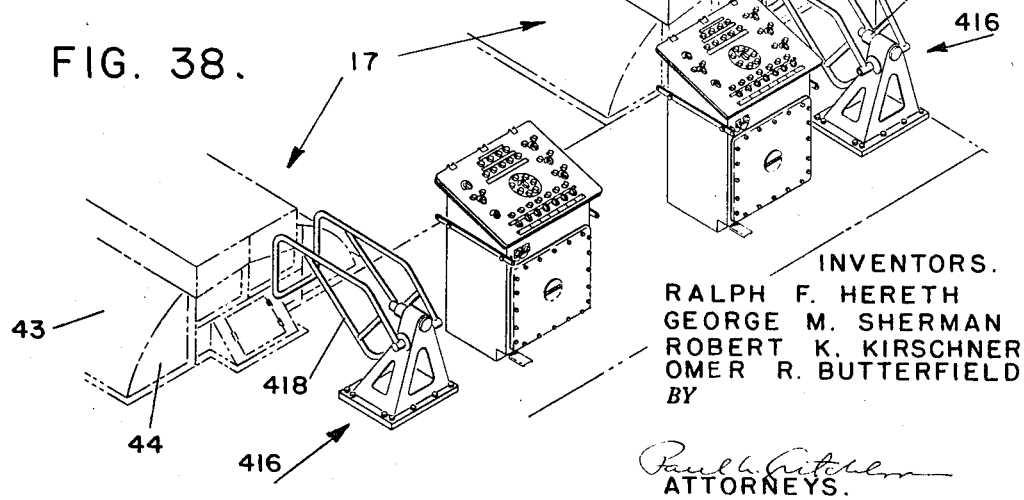
Figure 47:
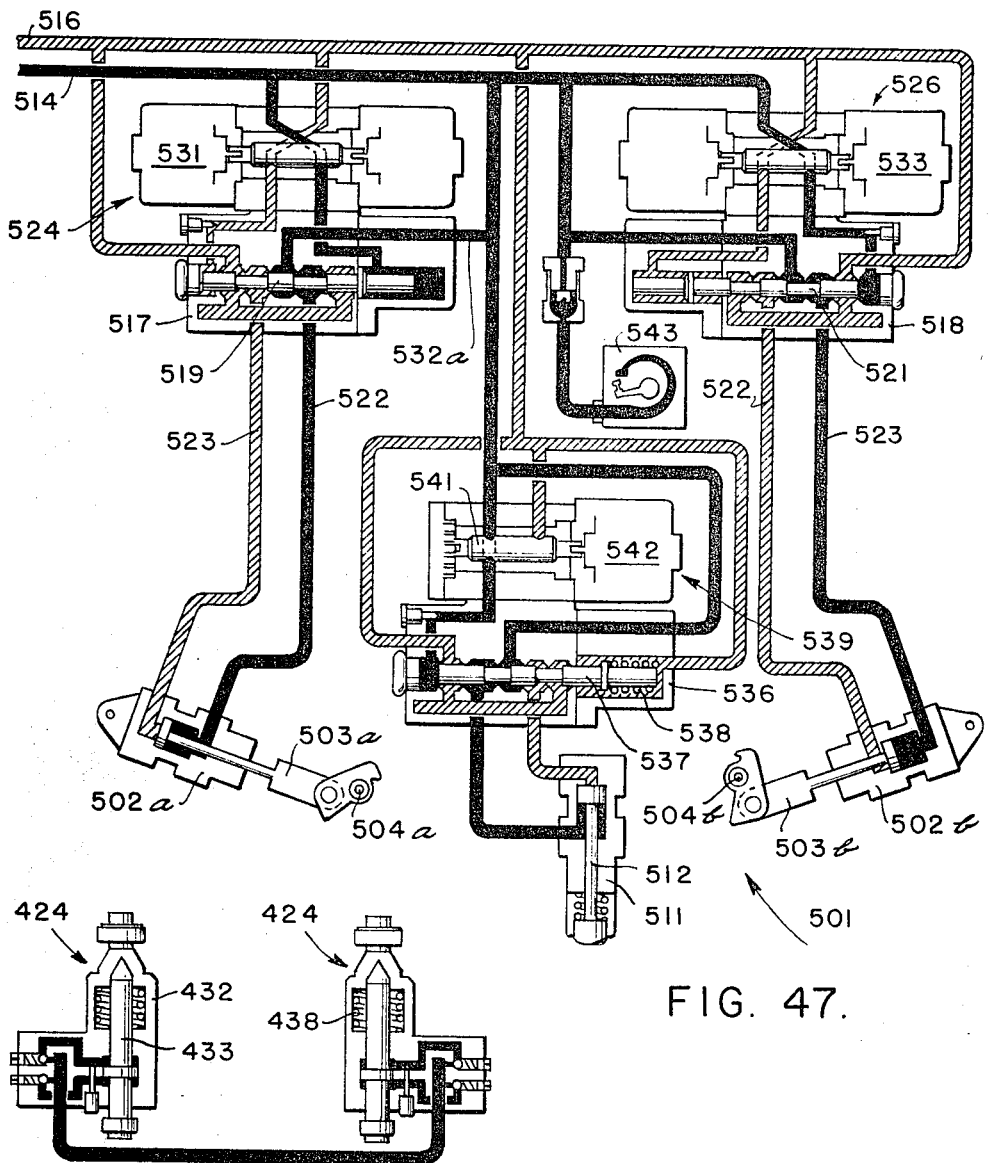
Figure 41:
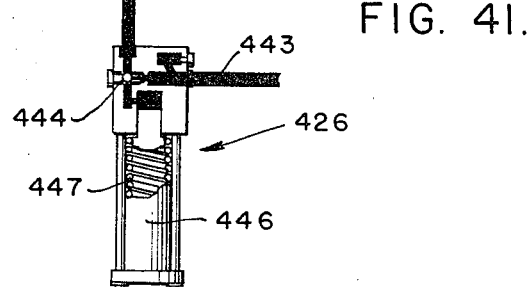
Figure 42:
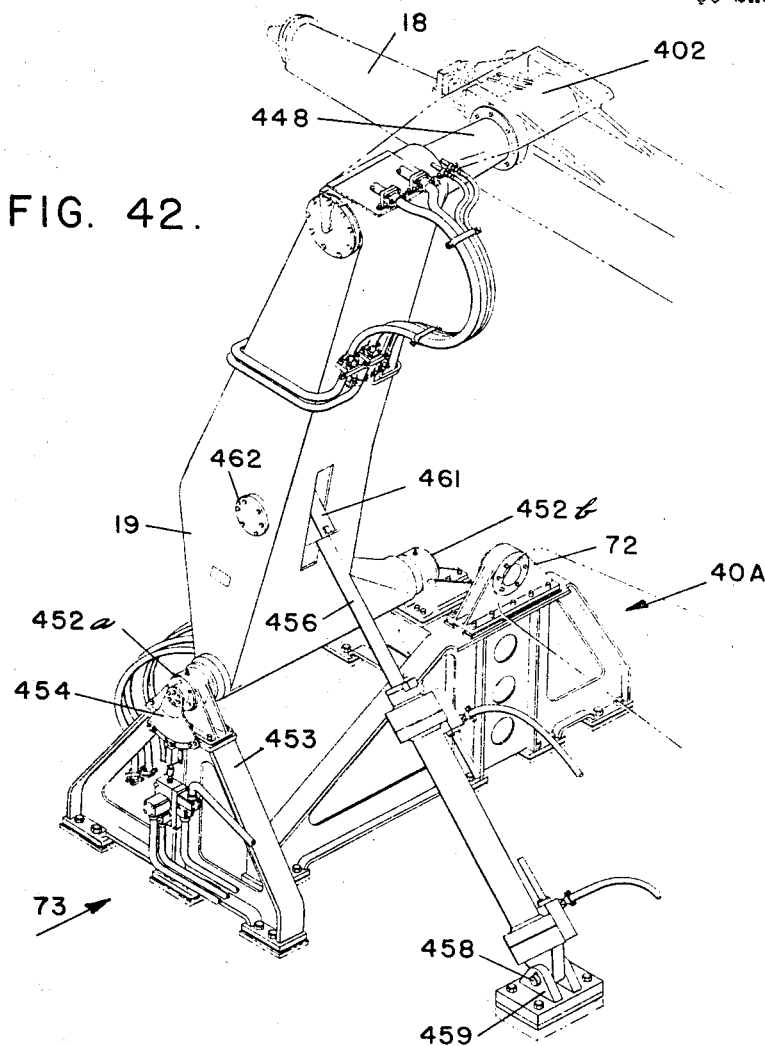
Figure 43:
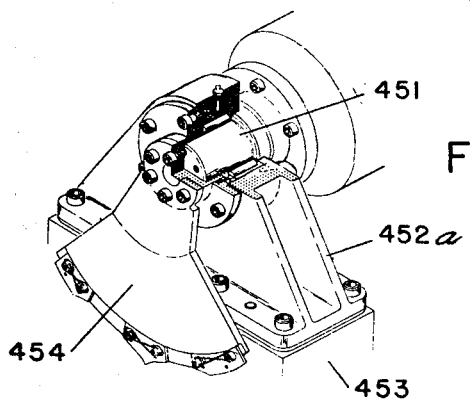
Figure 44:
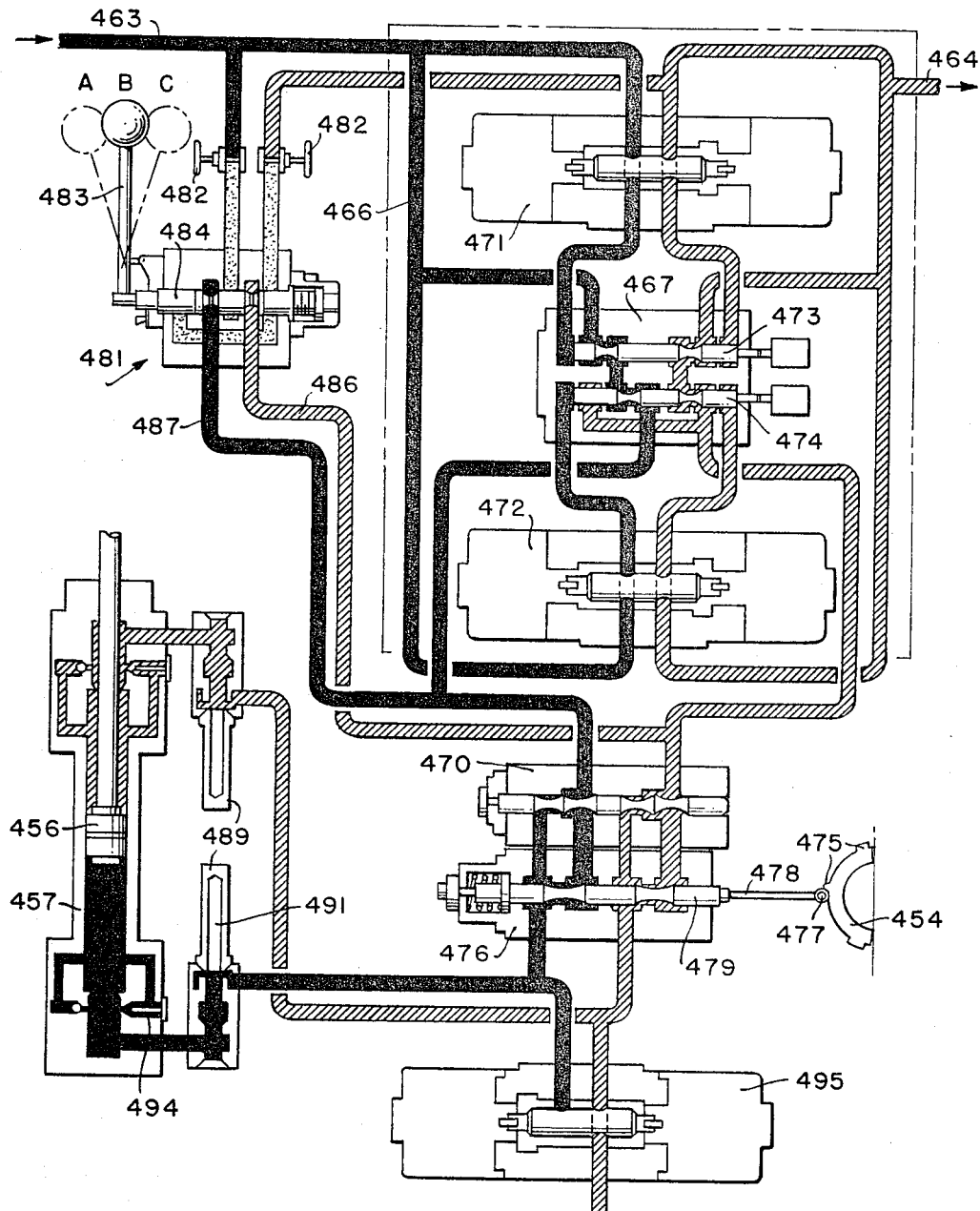
Figure 45:
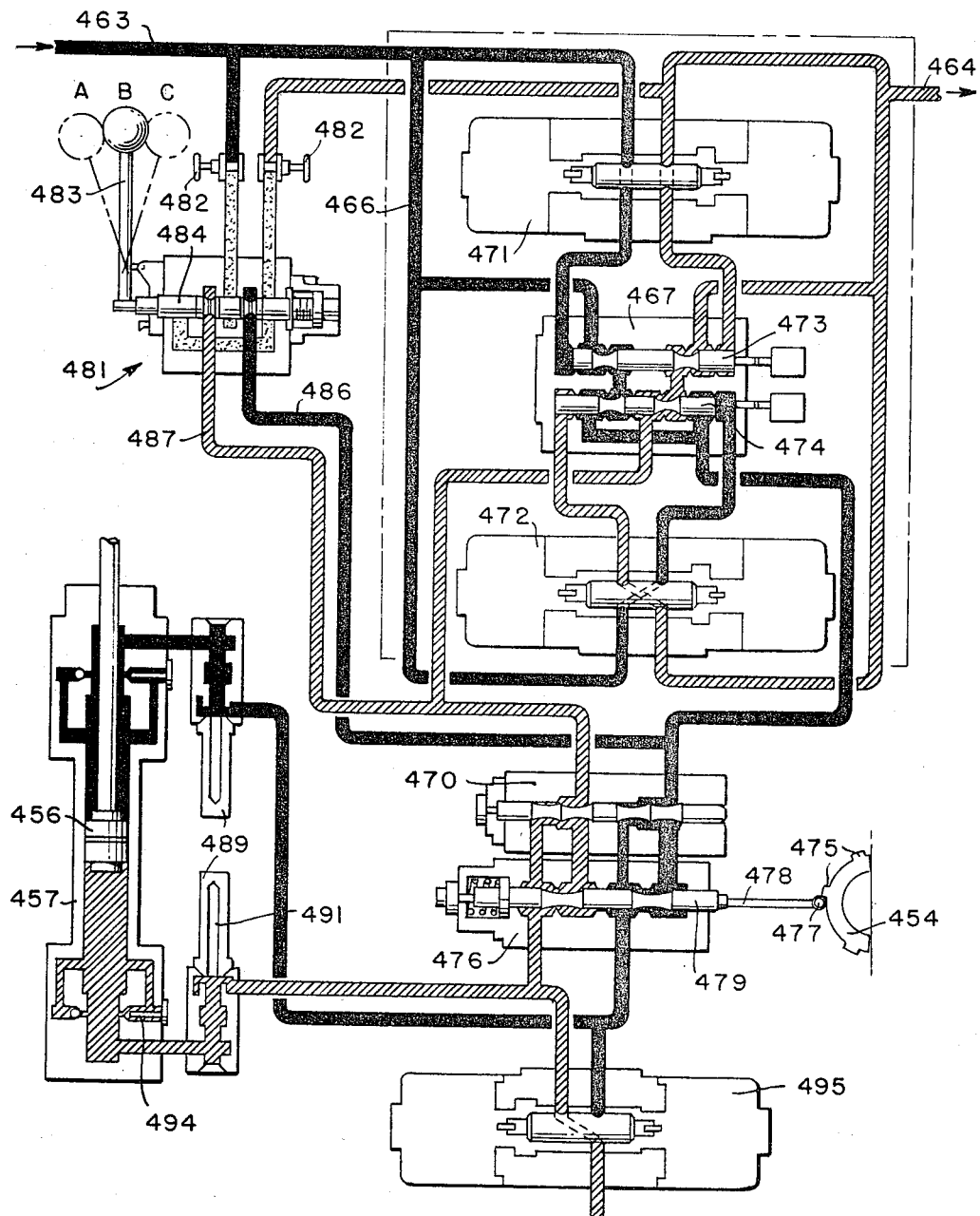
Figure 46:
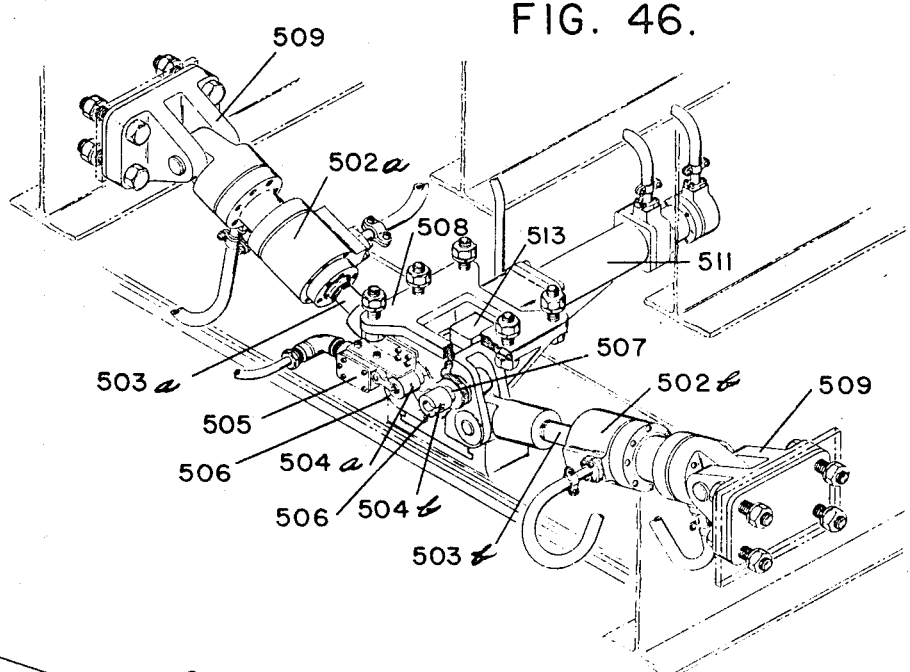
Figure 48:
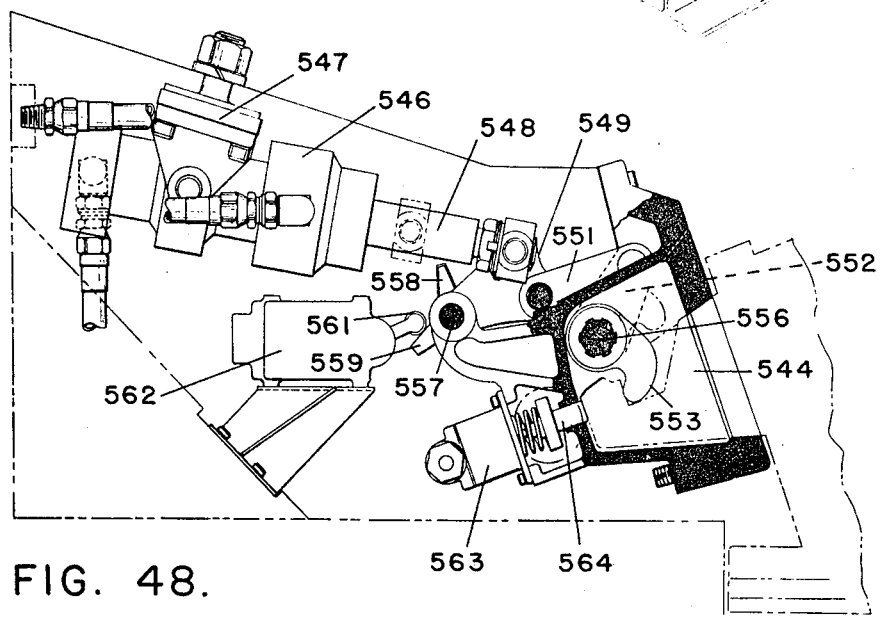
Figure 49:
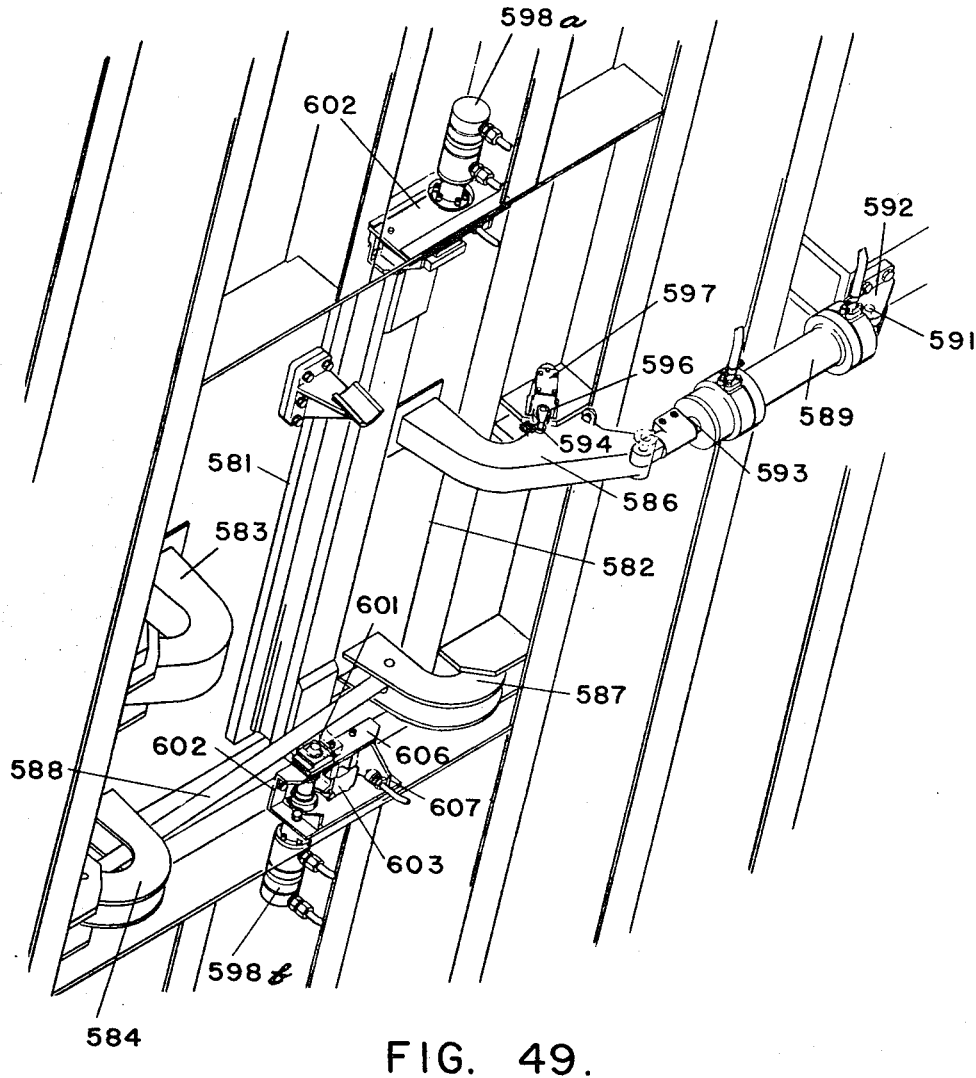
Figure 50:
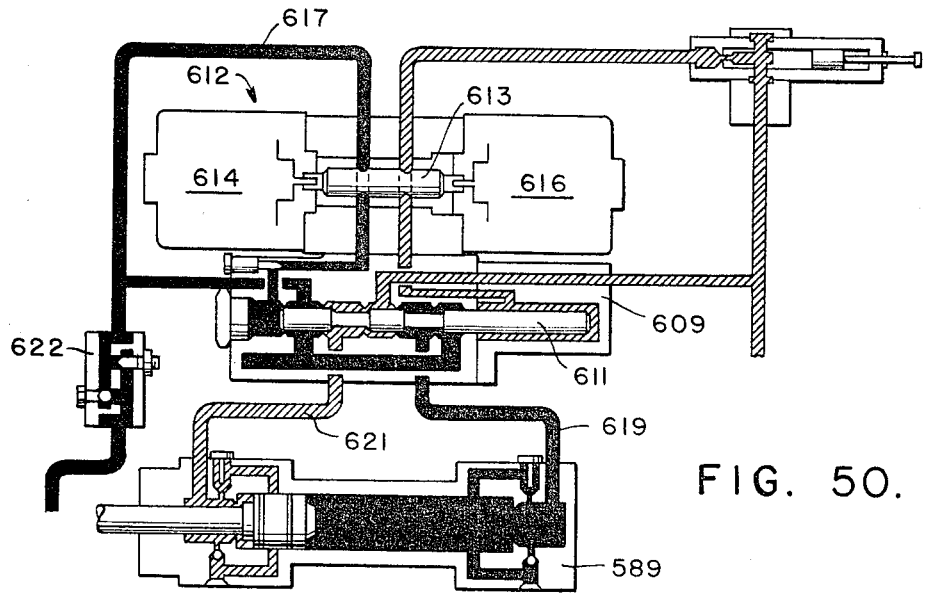
Figure 51:
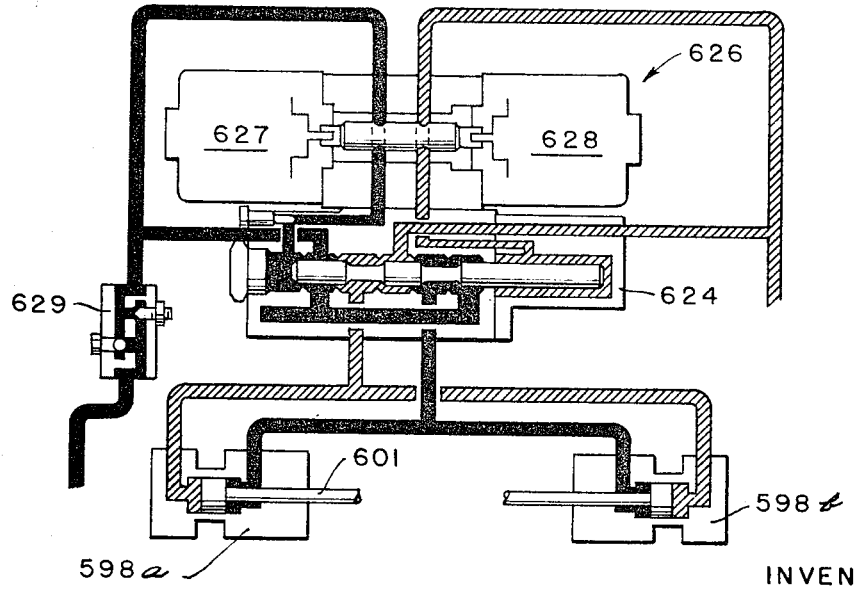
Figure 55:
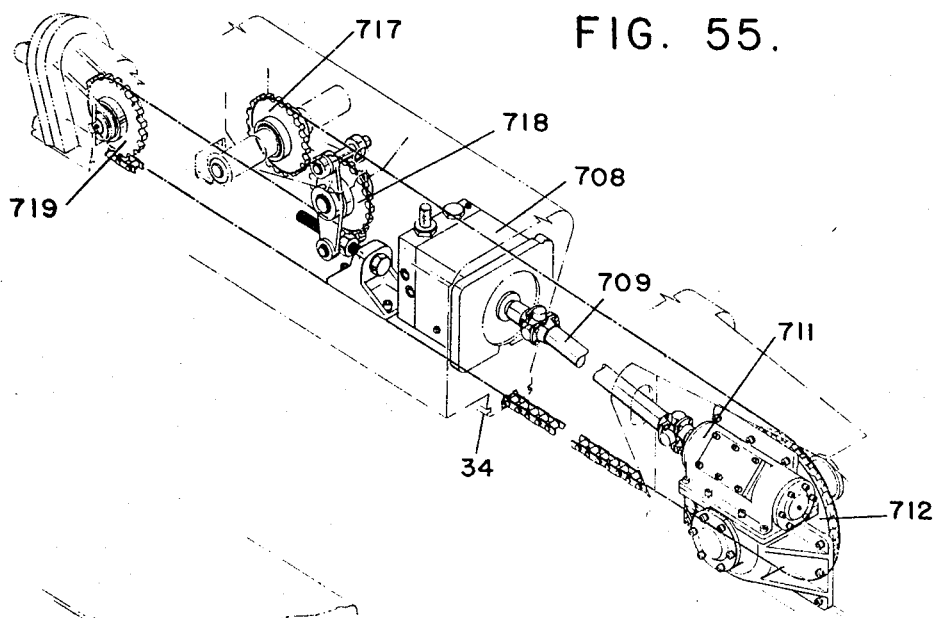
Figure 56:
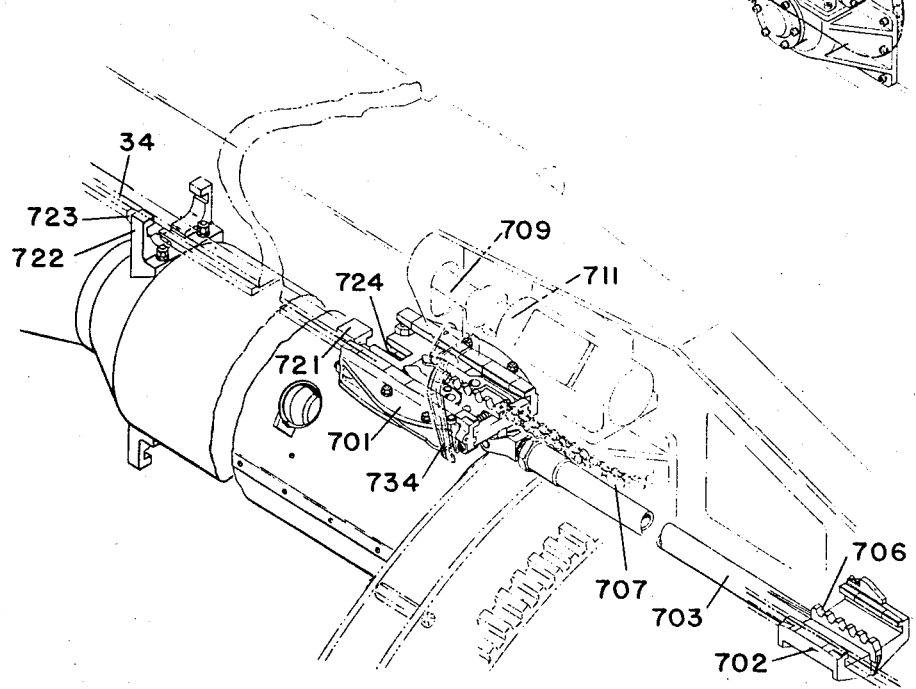
Figure 58:
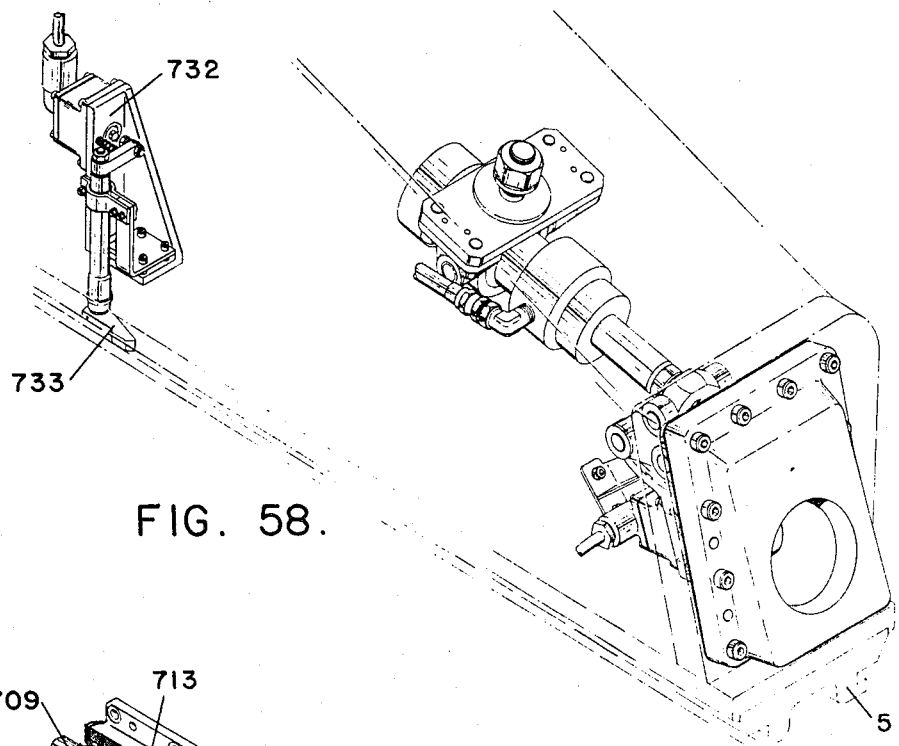
Figure 57:
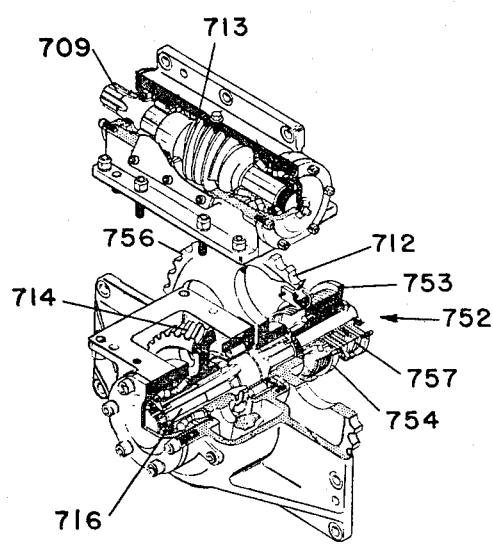
Figure 60:
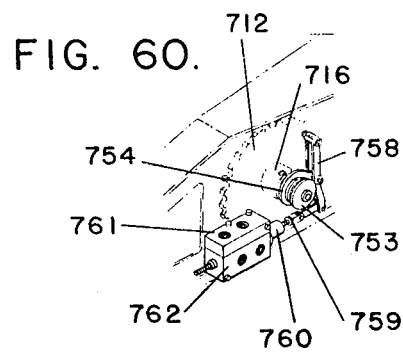
Figure 61:
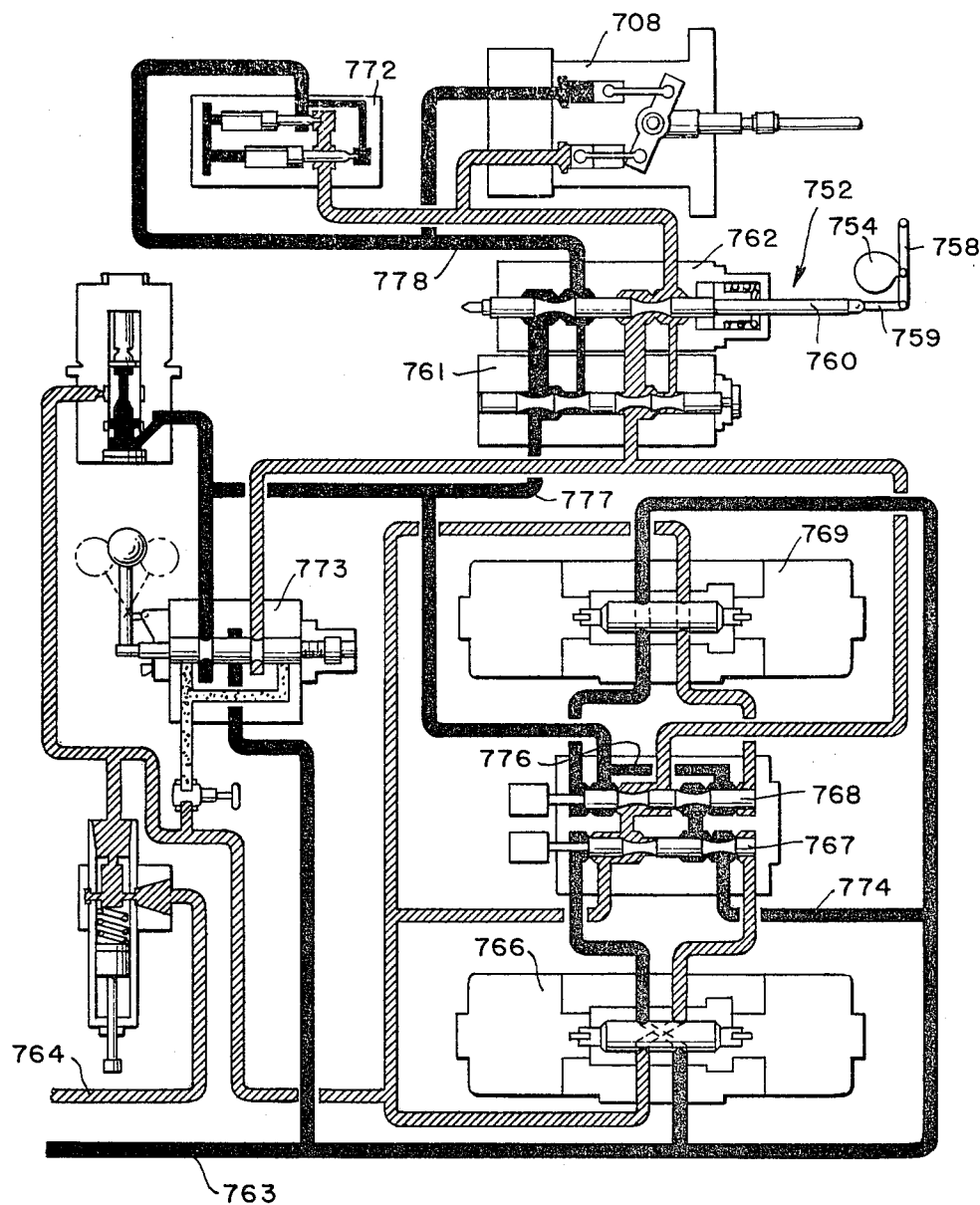
Figure 62:
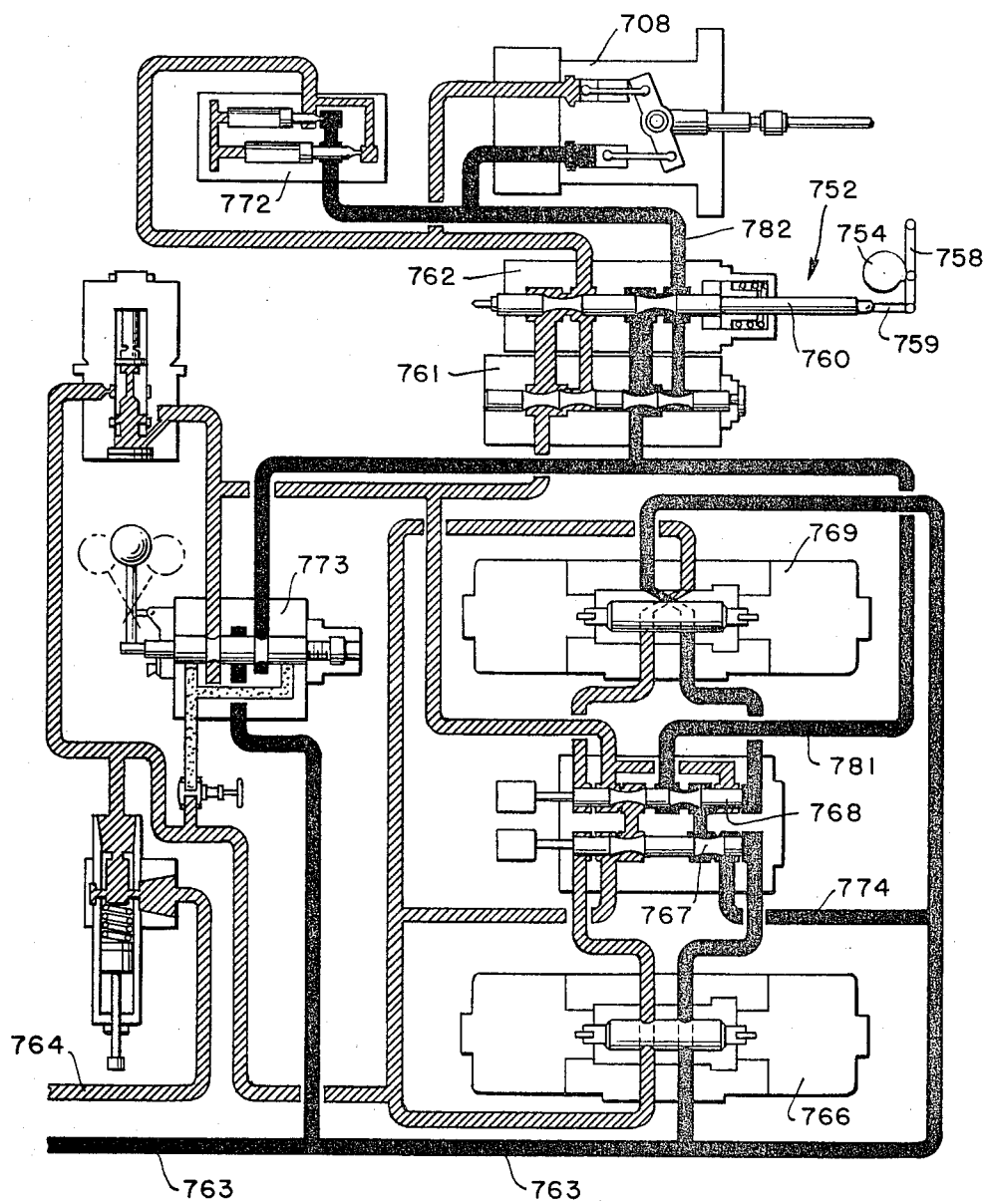
Figure 63:
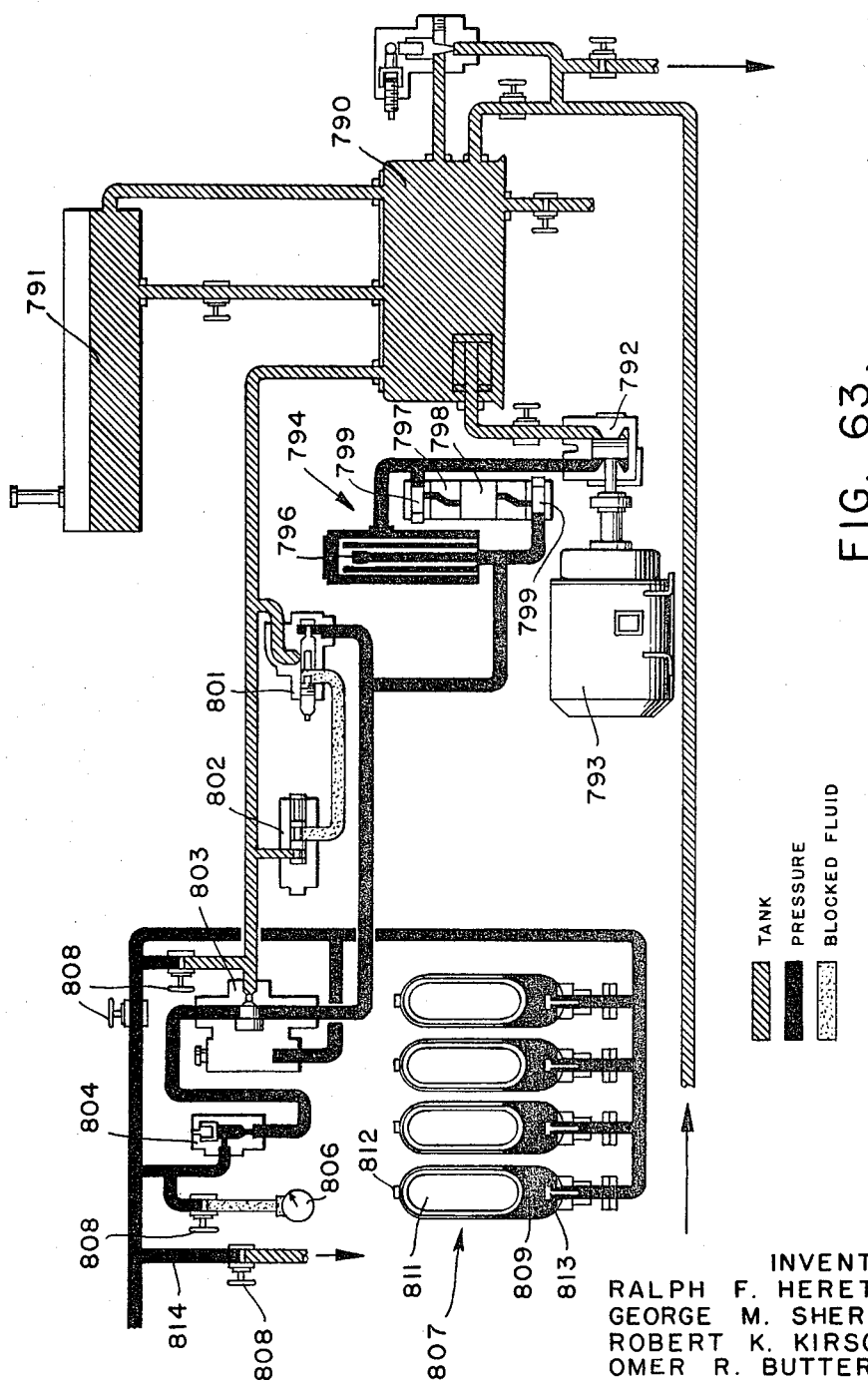

FIG. 2, an end view taken along lines 2—2 of FIG. 1;

FIG. 3, a top perspective with the deckhouse shown in phantom;

FIG. 4, a plan with the top wall of the deckhouse removed;

FIG. 5, a section along line 5—5 of FIG. 1;

FIG. 6, a schematic clock-like illustration of a firing cycle showing the timing of the various launcher operations;

FIGS. 7–10, perspectives of several important dispositions of the loader beam as it is moved between the magazine and the launcher arm, other associated components also being illustrated in their various positions appropriate to the action taking place;

FIG. 11, a view similar to the perspectives of FIGS. 7–10 but showing more of the launcher arm and the manner in which it receives and carries the missile-booster;

FIG. 12, a perspective illustrating the firing of a trained and elevated missile-booster;

FIG. 13, a perspective illustrating principally the magazine drive shaft; the surrounding components and parts as well as the missile-booster being shown in phantom for purposes of orientation;

FIG. 14, an enlargement of the rear portion of the magazine drive shaft showing the shaft support, a portion of its drive, and various control latches;

FIG. 15, a somewhat diagrammatic front elevation of a magazine door driving mechanism;

FIG. 16, a side elevation of the door-operating mechanism taken along lines 16—16 of FIG. 15;

FIG. 17, a hydraulic flow diagram schematically illustrating the magazine door control valve and its mode of operation;

FIG. 18, a side elevation of the rear section of the magazine rear support frame showing primarily an arrangement of booster rear-support members;

FIG. 19, a much enlarged broken-away perspective of a portion of the booster-supporting spiders;

FIG. 20, an enlarged sectional view of one of the booster rear supports of FIG. 18;

FIG. 21, a section taken along line 21—21 of FIG. 20 and showing a special booster latch for locking the booster in the magazine;

FIG. 22, a section taken along line 22—22 of FIG. 21;

FIG. 23, another perspective view of a portion of the magazine rear support frame, this view having portions of the frame broken away to show the gear drive of the magazine shaft;

FIG. 24, an enlarged perspective of the booster latch release mechanism viewed from the rear of the magazine rear support frame and having sections of the frame cut away to show underlying parts;

FIG. 25, an enlarged rear end elevation of the magazine rear support frame;

FIG. 26, an enlarged perspective of the gear box of the magazine shaft drive, the casing of the box being fragmentarily shown to expose its interior;

FIG. 27, a vertical cross-section of a B-end motor used for driving the magazine shaft;

FIG. 28, a section along line 28—28 of FIG. 27;

FIG. 29, a hydraulic flow diagram illustrating schematically the various valves operable to control the magazine rotation or indexing, this particular view showing the valve positions and hydraulic flow applying when the magazine rotates at its full speed;

FIG. 30, a view similar to FIG. 29 but showing the valve positions and hydraulic flow at a reduced or decelerated speed appropriate for approaching a load or stop position;

FIG. 31, a view similar to either FIGS. 29 or 30 but showing the valve disposition and flow when the magazine rotation is at load or stop position;

FIG. 32, a perspective of a portion of a magazine indexing valve employed to control rotational drive speed, the portion shown being a so-called 7-speed valve and the mechanism for operating it;

FIG. 33, another perspective of the same magazine indexing valve, this view however showing principally a 42-speed valve operative for effecting the reduced rotational speed of FIG. 30;

FIG. 34, a schematic exploded perspective of the 7-speed valve of FIG. 32, this view being intended primarily to clarify its functioning;

FIG. 35, a schematic view similar to that of FIG. 34 but illustrating the action of the 42-speed valve of FIG. 33;

FIG. 36, a perspective of one of the loader beams and, in particular, the beam guides which slidably support its rearward portion;

FIG. 37, an enlarged perspective showing particular details of one of the loader beam guides;

FIG. 38, a perspective of a loader control platform disposed rearwardly of the magazines and mounting rear supports for the beams;

FIG. 39, an enlarged side elevation of a front portion of a loader beam illustrating a two-part hinged beam construction and a beam latch;

FIG. 40, a central longitudinal section through a greatly enlarged buffer cylinder employed to cushion loader beam impacts;

FIG. 41, a hydraulic flow diagram illustrating the beam buffer action;

FIG. 42, a perspective of a loader arm assembly for swingably moving a loader beam;

FIG. 43, an enlarged, cut-away view of a loader arm shaft support and a loader arm drive-deceleration unit carried by the shaft;

FIG. 44, hydraulic flow diagrams illustrating valve dispositions and flow conditions applying when the loader arm is being swung upwardly away from the magazine;

FIG. 45, a flow diagram similar to FIG. 44 but illustrating the downward drive of the loader arm;

FIG. 46, an enlarged perspective of a loader beam latch for securing the loader beam in stowed or in wing-and-fin assembly position;

FIG. 47, a hydraulic flow diagram illustrating the action of the latch of FIG. 46;

FIG. 48, an enlarged partially-sectioned side elevation of a loader beam latch;

FIG. 49, a perspective of deckhouse blast doors and their hydraulic operative mechanisms;

FIG. 50, a hydraulic flow diagram illustrating the operation of the blast-door operating cylinders;

FIG. 51, another hydraulic flow diagram illustrating the operation of blast-door latching cylinders;

FIG. 52, a perspective of the rearward portion of the loader beam in which the beam is indicated in phantom to display the rammer car along with its drive and important latches;

FIG. 53, an enlarged perspective similar in orientation to FIG. 52 but showing principally the rammer car;

FIG. 54, a perspective of the front unit of the rammer car in which a left-hand guide and a hook release lever of FIG. 53 have been removed to display a lower hook assembly;

FIG. 55, another orientation similar to FIG. 52 but showing the entire loader beam in phantom and the rammer car chain drive in full line;

FIG. 56, a perspective in which a missile-booster is shown positioned in the magazine and the loader beam is disposed in a lowered position preparatory to engaging and carrying the missile-booster to the launcher; the beam being shown in phantom except for the rammer car and other related parts which are functional at this phase of the operation;

FIG. 57, an exploded and cut-away perspective showing the interior of the gear box of the rammer car drive;

FIG. 58, a perspective of the front portion of the launcher arm, the outlines of the arm being in phantom to permit the showing of particular latching and switching mechanism;

FIG. 59, a hydraulic flow diagram illustrating the actuation of rammer car latching and hook-release mechanisms;

FIG. 60, a perspective illustrating the mechanical connections of a rammer drive speed control mechanism carried by the loader beam in closely associated relationship with the rammer car gear box;

FIG. 61, a hydraulic flow diagram of the rammer car drive illustrating a forward driving direction;

FIG. 62, a diagram similar to that of FIG. 61 but illustrating a reverse or rearward driving direction;

FIG. 63, a hydraulic flow diagram illustrating the loader power drive in a condition of full pump pressure;

FIG. 64, a view similar to FIG. 63 but illustrating a condition of idling pump pressure; and FIGS. 65, 66, and 67, a series of three views capable of being laid side-by-side for cumulatively providing an illustration of the complete hydraulic circuitry and its principal operative components.

GENERALIZED DESCRIPTION

Before considering the details of the particular components, it may be helpful to present an overall picture in which the major parts can be oriented and the launcher operation understood at least in a general way. Thus, referring to FIGS. 1, 2, 3 and 4, it is seen that the launcher as a whole includes a number of components enclosed in a protective deckhouse 1. Outside of the deckhouse is located a launcher arm mount 2 which is formed of a central column or support shaft 3 on which is supported a pair of twin launcher arms 4 provided along their lower surfaces with suitable rails 5 (FIG. 1) on which a missile-booster combination 6 may be carried.

Digressing for a moment, it should be pointed out that in an actual shipboard installation, the launcher is intended to be located on the aft portion, so that, as seen in FIG. 1, the launcher arms would be pointed to the rear. However, because in the drawings the launcher arms appear to be oriented in a forward direction, it is believed that description will be facilitated by considering their orientation as in fact being forward rather than rearward. Consequently, it can be said that launcher arm mount 2 (FIG. 1) is disposed forwardly of deckhouse 1, and the same orientation subsequently will be applied to the other elements to be described.

Again considering the illustrated structure, it will be apparent that twin launcher arms 4 must be trained and elevated before the missile can be launched, and to permit these movements, each arm 4 is mounted on an end portion of a horizontal shaft 7 carried by a central support 8 which, in turn, rotates or trains about column 3. Firing elevation of the launcher arms is achieved by rotating the arms about the horizontal axis of shaft 7, suitable power drives preferably being provided both for elevation and train movements. These drives, in turn, most suitably are remotely controlled from a Combat Intelligence Center of the ship, although as will become apparent, most of the automatic and semi-automatic movements of the other components are under the control of a Loader Captain located at another control station.

Within deckhouse 1 are several functionally important components which take the form of right and left paired installations so as to feed both the right and left hand launcher arms 4. However, except for their right and left hand orientation, the paired members essentially are identical and like reference characters can be used to identify like parts. To serve in locating these components the deckhouse can be considered as having a deck or floor 11, an overhead or top 12, front wall 13, rear wall 14, a left-hand side wall 15 and a right hand side wall 16.

The deckhouse components generally include a pair of rotatable magazines 17 (FIG. 2) for stowing and indexing the missile-booster combinations, a pair of horizontally-disposed loader beams 18, a pair of swingable loader beam support arms 19, and a pair of loader beam guide members 20. Also, mounted in deckhouse front wall 13 is a pair of power-driven blast doors 21 (FIG. 3), while disposed adjacent to a particular station known as an intermediate wing and fin assembly station, are appropriately sized racks 22, 23, and 24. Racks 22 are missile wing and fin racks, while racks 23 are missile tail fin racks, these racks being carried by the deckhouse structure in a convenient side-by-side adjacency. Racks 24 are similar to the other racks except that they carry the booster fins.

Briefly considering the operation of each of these components, it can be noted (FIG. 2) that each rotatable magazine 17 carries seven missile-booster combinations in a closely-compacted disposition made possible by the fact that they are minus their usual wings and fins which, as has been indicated, are mounted later at the so-called wing and fin assembly stations. Also, each magazine is encased in a housing or envelope 26 provided at its top portion with a pair of slidably-opening magazine doors 27a and 27b (FIG. 7), the magazines each being rotatably driven to precisely locate any selected missile-booster combination directly beneath its door and in position for engagement by its horizontal loader beam 18.

Each beam 18 is swingably moved from a fully lowered load position (FIG. 8) through its intermediate wing and fin assembly position (FIG. 9) and into a launcher-loader position (FIG. 10). However, operationally considered, the sequence of the beam movement should be considered as commencing at the position illustrated in FIG. 7 since, although this is a position identical with that previously described as the wing and fin assembly position, it also is the normal position of the beam in which it is stowed when not in use. Thus, as may be noted, the arm of FIG. 7 is not supporting a missile-booster combination.

In this normal or stowed position, loader beam 18 is secured and supported by its swingable loader arm 19 which engages the front end of the beam, and by a special hydraulically-operated latch mechanism 30 engaging a special lug 31 (FIG. 8) carried on the top surface of the beam. Also, the extreme front end of the beam carries a projecting portion 32 adapted to be received in a grooved support 32a carried by the interior surface of a blast door, the purpose of this arrangement being to center the beam.

Figure 8:
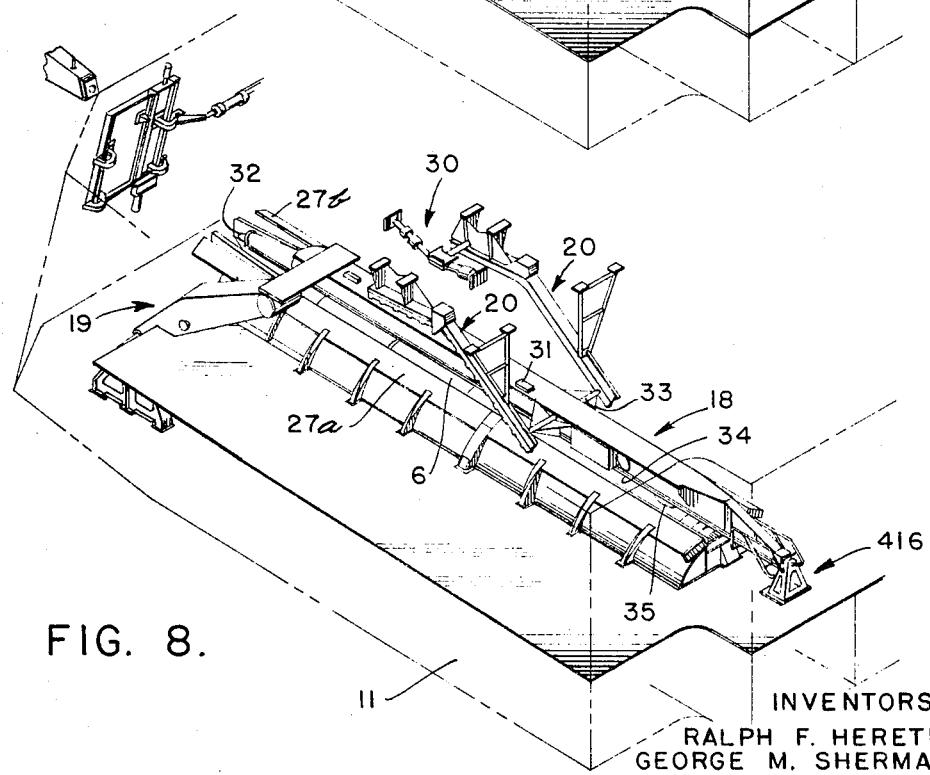

Referring particularly to FIG. 8, it further is to be noted that slightly to the rear of the longitudinal center of each beam 18 are reinforced, rib-strengthened laterally-projecting shafts 33, the ends of which are slidably engaged in previously-identified beam guide members 20. Preferably, these beam guides are formed with inclined tracks while lateral shafts 33 mount rollers riding in the tracks.

Figure 7:
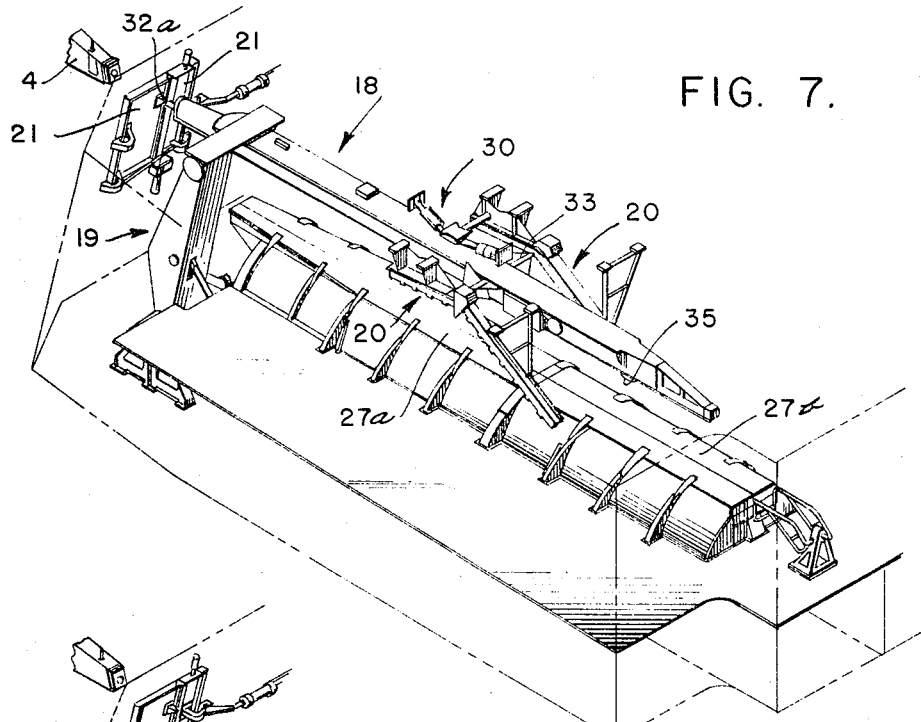

Upon release of latch 30 and application of power to swinging beam arm 19, the beam is swung downwardly from its FIG. 7 to its FIG. 8 position where it engages a missile-booster that has been indexed into a beam loading position. Magazine doors 27a and 27b open to permit the engagement and, when one or the other of the beams has been fully lowered it projects downwardly into the magazine so as to align a rail 34 carried on its lower surface with special lugs provided on the upper surface of each missile-booster; these details being amplified in subsequent description.

With the rail and lug so aligned, a rammer car 35 reciprocably carried by the beam is operable for effecting a transfer of the missile-booster from the magazine onto the loader beam. This rammer car is an important feature of the invention, although for the present it will suffice to say that, in its initial forward movement, it grasps the missile-booster and moves it forwardly onto beam rail 34 which then serves as the sole support for the missile-booster combination until the combination is transferred from the beam rail onto rail 5 which, as stated earlier, is carried by launcher arm 4.

With the missile-booster combination engaged by the beam rail in the manner just described, the beam again is powered to swingably carry the combination forwardly and upwardly to the intermediate wing and fin assembly position shown in FIG. 9. During this movement, the rammer car usually is in a fixed or stationary position and it is provided with means for positively engaging the missile-booster and preventing any accidental forward or rearward sliding of the missile-booster on the beam tracks.

Upon reaching its wing and fin assembly position, the beam is engaged and secured by special latch mechanism 30 and it is steadied in this position by its front end engagement with blast door centering support 32a, as well as its rearward engagement with inclined guide 20. The final assembly of the wings and fins then is accomplished manually by a team of service personnel. Also, while in this position, the team manually removes certain missile front and rear supports which are elements that will be later described.

This operation completed, blast doors 21 first are opened as shown in FIG. 10 and latch 30 is remotely controlled to release the beam and permit its forwardly swinging movement to the launcher arm loading position (FIG. 11). In this position, the front end of the beam is centered in and latched to the rear end of launcher arm 4 so as to align its rail track 34 with launcher arm rail 5. The purpose in aligning these tracks, of course, is to permit the missile-booster to be moved or transferred from the loader beam onto the launcher arm and this transfer, in turn, is achieved by driving rammer car 35 in a forward direction relative to the beam. As already has been explained, rammer car 35 positively engages the missile-booster combination so that its forward movement pushes this combination forwardly onto the launcher arm.

A particular feature of the rammer car is the fact that it is capable of extending outwardly beyond the front end of loader beam 18 so as to maintain its positive engagement with the missile-booster until certain means provided on the launcher arm have taken over. A further feature of the rammer car is that it is capable of retracting either with or without the missile, and this becomes important during a mode of operation known as unloading.

After the missile-booster combination has been securely positioned on its launcher arm, the rammer car first is retracted and then the beam is swung rearwardly into its stowed position. Blast doors 21 of the deckhouse close and the launcher arms can be trained and elevated into the firing position shown in FIG. 12.

As will be apparent in the ensuing description, the various movements are semi-automatic in the sense that they can be remotely controlled by the operation of suitable switches. In addition, the right and left components have independent controls and drives to the extent that the launching may be either singly or in salvo. Also, in the event of any power failure of one of the independent drives, the other can be cut-in to furnish the needed power.

In the above description many, although not all, of the principal features of the invention have been described and the operation of the launcher as a whole has been indicated. However, no attempt has been made to broadly state only the essential features of the invention, and, of course, a number of the recited features could be materially modified or even omitted.

THE MAGAZINE

As has been indicated, launcher magazine 17 is provided for the purpose of supporting a plurality of missile-booster combinations in an orderly arrangement such as permits the selective presentation of any particular missile to loader beam 18 which then picks up the missile and transports it to the launcher arm. As shown in FIG. 13, the present magazine is formed with a rotatably driven central magazine shaft 40 on which is mounted a plurality of longitudinally spaced spiders 41 adapted, in a particular manner to be described, to support seven missile-booster combinations. Generally considered, magazine shaft 40 can be rotatably indexed to dispose any selected missile-booster combination in the upper position illustrated in FIG. 13, and, because loader beam 18 picks up the missile from this upper position, it can be referred to as the "loading position."

As has been noted, magazine shaft 40, along with its drive and the missile-booster supported by it, are enclosed in a magazine envelope 26 formed of side walls 43 (FIG. 10), front and rear end walls 44, as well as magazine doors 27a, 27b which form the top wall of the envelope. Preferably, most of the envelope is sheet aluminum, the sheets of which may be riveted to support frames 47. However, doors 27a and 27b are specially formed of an aluminum sheet that is covered with a heat-resistant fabric, the aluminum sheet being in the form of a frame-work filled with a honeycomb type of aluminum foil.

Doors 27a and 27b slidably open and close and, to permit this action, each door, such as door 27a, has its laterally-outward marginal portion secured to a plurality of spaced door supports 48, these supports, in turn, each mounting at its lower end a suitable roller engaged in a curved track 51 provided in its adjacent door support frame. Consequently, any pressure exerted on door supports 48 is capable of slidably moving the doors in the curved path defined by tracks 51 and such a movement results in the doors being swung laterally away from each other to open magazine envelope 26, or being swung toward one another to close the envelope.

The drive for swingably moving the doors is provided by a magazine door operating cylinder 52 (FIG. 15) which, as seen in FIG. 17, mounts a reciprocating piston 53 connected at each end to door supports 48. The connections are by means of an appropriate cable and tie rod arrangement such as that shown in FIGS. 15 and 16.

Referring again to FIG. 17, the operation of magazine door operating cylinder 52 is under the control of a conventional solenoid-operated pilot valve 65 and a conventional four-way directional valve 66, the solenoid valve having a fluid directing rotor 67 driven by one or the other of its solenoids 68 or 69 to position a sliding piston 71 of four-way directional valve 66. As would be expected, solenoids 68 and 69 may be energized remotely by means of a switch located at a remote control center and energization of one or the other of the solenoids acts to position sliding piston 71 so as to direct fluid pressure to one side or the other of magazine door operating cylinder 52. As further may be noted, the magazine door operating cylinder 52, as well as its control valves, are influenced by suitable needle valves which are adjustable for the purpose of metering fluid flow.

Magazine shaft 40, which mounts missile-booster carrying spiders 41, is a two-part unit extending substantially the entire length of magazine envelope 26, the shaft being rotatably mounted at its front end in a bearing 72 (FIG. 13) carried by a bearing support frame 73 and at its rear end in a bearing 74 mounted in a rear support frame 76. Most suitably, the front part of the shaft which is identified by the reference numeral 40A is a tapered tubular unit constructed of aluminum alloy while the rear portion, identified as portion 40B, is formed as a hollow steel cylinder pinned to the front portion. For support, this rear portion 40B is carried near its front end by a center bearing 79 while, at its rear end, it is bolted to a hub shaft member 81 (FIG. 14) which, in turn, is rotatably mounted in rear bearing 74. The bearings both at the front and rear of shaft 40 may be formed in any conventional manner with appropriate rollers, locknuts, thrust collars and other appropriate adjuncts such as suitable lubrication fittings and grease seals.

Th missile-booster combinations are supported on spiders 41, although each of these spiders differs from the other in manners which will be described. As may be noted in FIG. 13, the missile section of each missile-booster combination is supported by missile front and rear spiders 41A and 41B, each of these spiders being formed of a circular metal sleeve 82 from which circumferentially-spaced spider arms 83 project outwardly in radial directions. Each of these arms, in turn, has a spider shoe 84 pinned and bolted to it, and the arms also are formed with grooves 86 adapted to engage the missile in the manner to be described. The primary difference between front and rear missile spiders 41A and 41B, apart from the diametrical difference of their sleeve portions, is the fact that spider arms 83 of rear spider 41B are drilled to receive their shoes in either of two positions, this modification being adapted to permit the supporting of different types or sizes of missiles.

To support the missiles on front and rear spiders 41A and 41B, special front and rear ring-shaped supports 90 are installed on the missiles, each of these supports being formed of a flexible strap 89 secured at one end to a semicircular cradle 91 and adapted at its other end to be latched to the opposite side of the cradle. Also, cradle 91 mounts special lugs adapted to engage or mate with grooves 86 of the spider shoes. As would be expected, these front and rear supports must be installed on the missiles before the missiles are stowed in the magazine and the installation is accomplished by fitting semi-circular cradle 91 of the missile around its lower portion and then wrapping and binding the flexible band around its upper portion.

The booster portion of the missile-booster combination has its front end supported by a booster spider 93 and its rear end engaged and supported by special rear supports 94 (FIG. 18) mounted in appropriate circumferentially-spaced disposition on a booster support ring 96 carried in a manner to be described by rear support frame 74.

Booster spider 93 is formed in a manner somewhat similar to the missile spiders in that it has a central sleeve 95 secured to the front portion of shaft 40B and projecting radially from the sleeve are integral spider arms 97. However, in contrast with the missile spiders, the end portions of the booster spiders mount rollers 98 (FIG. 19) which ride in an arcuate track 99 provided on the interior surface of magazine shaft center support 79. Considering the roller mounting of these spiders more in detail, it is seen that each arm mounts a roller bracket 101, formed of side plates 102 between which are mounted a pair of roller pins 103 to carry rollers 98. Proper tracking alignment of the roller engagement is maintained by other inner side plates 104 closely fitting the side edges of the track in the manner illustrated.

Booster spider arms 97 support the booster by providing an arcuate seat 106 between its adjacent spider arms 97 and, as will be appreciated, there are seven such seats, one for each of the boosters. Further, each booster is supported at its front end by a booster lug guide 107 of which there are seven, and each of these guides is specially formed to receive the booster lugs.

The rear portion of the booster is, as has been stated, supported by rear support members 94 (FIG. 18) mounted on a rear support ring 96. One of these support members is illustrated in FIG. 20 and, as there seen, it is adapted to receive the rear portion of the booster which, as may be known, is formed with a conical recess 105. Accordingly, booster support members 94 each are formed with a conical booster support shoe 111, mounted on a bracket 112 secured to ring 96 by screws 113. Shoe 111 is spring mounted on the bracket to absorb or cushion shock which otherwise might occur when the missile boosters are placed in the magazine. More specifically, the conical shoe is pinned to the bracket and to a collar member 115 by pins 116, the pins permitting a certain amount of play or lost motion of the shoe. The lost motion, in turn, is cushioned by springs 117 mounted between screws 113 and the collar.

In addition to the support provided by the magazine spiders and by rear support members 94, the booster also is locked in position by a special booster latch and release mechanism 120 particularly illustrated in FIGS. 13 and 21. The obvious function of this latch and release mechanism is to securely hold the missile-booster combination so as to prevent any accidental slippage of it within the magazine. The support for booster latch 120 is provided by a pair of adapter rings 121 and 122 mounted on the magazine shaft, inner ring 121 being pinned to the shaft slightly forward of rear support ring 96 and outer ring 122 pinned and bolted to the inner ring. The latch mechanism, in turn, is formed with a latch frame 123 bolted to and supported by these rings.

The operative portion of latch mechanism 120 includes a pivoted latch arm or keeper member 124 which, as particularly illustrated in FIG. 21, is swingably mounted on a latch-frame-supported pivot pin 126, and, to hold it in its normal unlatched position, a leaf spring 127 is provided. The arrangement is such that, when a missile-booster is placed in the magazine, its lug forces latch member 124 in a clockwise direction, the member thereby engaging the missile and the engagement then being secured in a manner to be described by a U-shaped locking slide 128 (FIG. 22). As may be noted, latch frame 123 has forwardly-extending lip portions forming a slot 130 for receiving and guiding the booster lug in its initial engagement with the swingable latch member.

U-shaped locking slide 128 is, as shown, formed with a base or web portion 132 and with laterally-spaced legs 133 which are coupled to the front end of a push rod 134 by means of a pin 136.

As will be apparent, latch 124 normally lies in a space or slot provided between laterally-spaced legs 133 of the slide, this position being shown in phantom outline in FIG. 21 where it may be noted that the latch abuts a stop member or pin 135 that limits any further counter-clockwise movement of the latch. However, during the loading of the missile-booster into the magazine, the latch is swung in a clockwise direction out of the slot or space between these legs and simultaneously push rod 134 and its slide 128 are pulled rearwardly to bring web-portion 132 of the slide into its illustrated latch-retaining position. Release of the latch is achieved by forcing rod 134 in the reverse or left-hand (FIG. 21) direction to move web-portion 132 from beneath the latch and permit the latch to swing in a counter-clockwise direction back to its phantom outline position.

To move push rod 134 into its lug-retaining position, a spring 137 is compressed between a rod flange 138 and a stationary collar 139, the collar being pinned to a spring sleeve or casing 141 carried by the stationary latch frame. Consequently, when the booster lug is forced into the slot provided in the latch frame, the latch is forced upwardly, or in a clockwise direction from its phantom outline position. U-shaped slide 128 initially must be moved out of the way to permit this swinging movement and this is allowed by further compression of spring 137. Next, after the latch has swung clear of the slide, spring 137 presses push rod 134 and its slide to the right (FIG. 21) to position the web of the slide beneath the latch.

The drive mechanism for accomplishing the latch release is provided by a latch release cylinder 140 which has a fluid-driven piston 145 aligned with the right end of push rod 134 and adapted to be extended to force the push rod to the left and to thereby positively force slide 128 away from its locking engagement beneath the latch. The push rod is slidably supported in previously identified booster rear support ring 96 and also in a bushing mounted in a ring-gear support member 142 that will be discussed subsequently.

Other elements supported on the right-hand end of push rod 134 are a missile ready cam 143 which is provided with a cam lock mechanism having a knob 144 that can be raised to permit the ready cam to be rotated into and locked in either of two positions which are referred to as "ready" and "no good." In the "ready" position the cam actuates interlock and position-indicating switches, the significance of which will be considered later. It can, however, be noted that the push rod also mounts another bell-shaped cam 146 that is engaged by a roller 147 of a switch arm 148, this arm therefore being raised or lowered by the reciprocal movements of push rod 134. The raising or lowering actuates an interlock switch which, in turn, controls the magazine loading operation to the extent of preventing the placement of a missile-booster in the magazine unless latch 124 of booster-latch mechanism 120 is in unlatched position.

MAGAZINE INDEXING MECHANISM AND CONTROL

The drive for rotatably indexing the magazine is provided by a motor 149 which, as shown in FIG. 23, is mounted on the base plate of rear bearing support frame 76, this motor having a drive shaft 151 flexibly coupled to a worm gear 152 (FIG. 26) carried in a gear box 153. The gear box also encases a worm wheel 154 having a driver shaft 155 terminating in a pinion 156 which, in turn, drives a large ring gear 157 mounted on previously mentioned ring gear support 142. The drive of motor 149 is imparted directly to ring gear 157 which is fixedly secured to magazine shaft 40, the result being that the shaft and its missile-booster carrying spiders are rotatably indexed in response to the motor drive. Ring gear support 142 is a steel disc and it is pinned and bolted to previously mentioned booster support ring 96, so that ring 96 and its supported missiles are rotated with ring gear support 142.

Magazine drive motor 149, which is shown in section in FIGS. 27, 28, is a conventional hydraulic B-end motor that has been modified to some extent to meet the requirements of the present hydraulic system.

Generally considered, the motor includes a plurality of pistons 158 mounted in cylinders 159 to which hydraulic pressure is supplied. The pistons, in turn, rotatably drive a ring 161, the drive being imparted by connecting rods 162, which as seen, have their ends formed into ball-shaped portions mounted in sockets provided both in the pistons and in the driven ring. Proper application of hydraulic pressure to the pistons rotates the ring in the conventional manner to impart a rotation to motor drive shaft 151.

The motor also mounts a blocking valve 167 (FIG. 27) the function of which is more obvious in FIGS. 29 and 30. Thus, as shown in FIG. 29, blocking valve 167 is reciprocable within a cylindrical bore provided in the motor casing either to admit high pressure directly to pistons 158 of the motor or to cut off this pressure in the manner shown in FIG. 30. The blocking valve is movable into or out of pressure-admitting position by hydraulic pressure applied to its lower end, this lower end being formed with an enlarged diameter providing a blocking valve piston member 168 reciprocable within a cylinder also provided by the motor casing.

The principal modifications of the conventional B-end motor are found in blocking valve 167 and also in an otherwise conventional integral relief valve 169. As may be noted in FIG. 27, relief valve 169 has valve closing spacers 171 installed on its valve stem 172 and a block 173 (FIG. 28) is mounted on the relief valve body. The modification to blocking valve 167 lies principally in its conventional latch which is replaced with latch-adjusting shims 176 that limit the action of the blocking valve.

Associated with B-end motor 149 also are a number of hydraulic valves and switches, the cumulative purpose of which is to cooperatively control the rotatable indexing of the magazine shaft and its missile-boosters. Generally considered, the control provided includes such features as that of permitting any desired missile-booster to be selectively indexed into its loading position, as well as that of latching the magazine against further rotation when the selected missile-booster is in its so-called loading position. To accomplish this latter purpose, the rotational speed of the magazine shaft is materially reduced immediately prior to its arrival at loading position; this reduced speed primarily minimizing the possibility of an over-ride beyond the desired position, although, as will later become apparent, provision also is made for such over-ride as may occur. The indexing control further is so arranged that the magazine shaft will continue to rotate until the selected missile arrives at loading position and, in addition, the control is capable of automatically continuing operation if the particular missile-booster arriving at loading position is one which, for some reason, is "no good." In this particular regard, a previously-identified missile ready cam 143, is provided for each missile-booster combination and this cam can be set either in a "ready" or a "no good" position. Such being the general arrangement of the indexing control, the details of the various valves permitting the accomplishment of these purposes now can be considered.

A magazine indexing control valve 180 is illustrated in FIGS. 32 and 33 and this valve is employed primarily to control the stopping of the magazine as well as its proper positioning for latching. In other words, this valve is the one which reduces the speeds of rotation of the magazine shaft so as to prevent an over-ride beyond its loading position and to thereby permit the securing of the magazine in this position by means of a suitable latch to be described.

Indexing control valve 180 is formed of two units, the first unit being a seven-speed valve 181 (FIG. 32) and the second a forty-two-speed valve 182 (FIG. 33), although these two valves are mounted in a single casing 183 and both are controllably driven by a common shaft 184 which, it is important to note, is directly coupled to drive shaft 151 of B-end motor 149. Consequently, any drive of the motor also drives common shaft 184 of this indexing control valve so as to effect certain results.

Referring to FIG. 32, seven-speed valve 181 is driven by a worm 186 mounted on valve drive shaft 184 and meshed with a seven-speed helical gear 187 which, in turn, is keyed to a valve spindle 188 so that the rotation of the worm rotatably drives the spindle at a speed determined by the gear ratio. The seven-speed valve also includes a cylindrical piston member 189 and a valve member 191, both of these members being mounted in a cylindrical housing 192.

Also, as is apparent in FIGS. 33 and 29, both piston 189 and valve 191 are stationary members provided with constantly coinciding fluid passageways 193 and 194 into which pressurized fluid constantly is applied. These passageways, in turn, communicate with a kidney-shaped passageway 196 (FIG. 34) formed in the meeting face of rotating spindle 188, and, as seen, passageway 196 extends circumferentially almost the whole way around the spindle face. Further, passageway 196 is formed with a radially-directed portion 196a terminating at the spindle face center so as to receive at this point the pressurized fluid from passageways 193 and 194.

To complete the pressure circuit through the spindle, valve 191 also has a second passageway or bore 197 radially spaced from its axis to the same extent that kidney-shaped passageway 196 is spaced from the spindle axis. The result is that second passageway 197 normally communicates with the kidney-shaped passageway to port pressurized fluid through the seven-speed valve.

However, as will be appreciated, when spindle 188 is rotated a sufficient amount to break the mated communication between its passageway 196 and second passageway 197, the pressurized flow through the seven-speed valves is blocked. When so blocked, fluid trapped in the seven-speed valve must be relieved and such release is accomplished by providing a second spindle outlet passageway 198 adapted, as seen in FIG. 30, to align with a valve casing port 199 during a portion of the interval in which the pressurized flow through the spindle is blocked.

As may have been surmised, the purpose of the entire arrangement is to block flow through the seven-speed valve once during each 360° revolution of the valve spindle 188. Further, since the valve spindle is driven by common shaft 184, and since this shaft is directly coupled to the B-end motor which drives the magazine shaft, the gear ratios can be and are so set as to produce seven revolutions of valve spindle 188 for each single rotation of the magazine. Also, there being seven missile-boosters carried by the magazine and therefore seven "load" positions for the magazine, a condition can be established in which the pressurized flow through seven-speed valve spindle is blocked as each magazine-booster approaches its "load" position. The ultimate purpose of this blocking is to transfer indexing control to forty-two-speed valve 182, although the particular manner in which this transfer is achieved will be reserved for later description.

Forty-two-speed valve 182 (FIG. 33) is similar to seven-speed valve 181 in that it has an identical piston 189a as well as a valve member 191a both of which are stationarily mounted in a housing 200 and both of which are provided with constantly coinciding passageways 201 and 202. Further, as may be noted in FIG. 33, this valve also has a rotating spindle 203 that is keyed to a forty-two-speed helical gear 206 which, in turn, is driven by a 140-speed helical gear 207 (FIG. 32) pinned to and rotated by common shaft 184. The operation of the forty-two-speed valve also is somewhat similar to that of the seven-speed valve in that passage of fluid through it is related to the rotated position of the magazine shaft.

In addition to passageways 201 and 202, it may be noted (FIG. 35) that forty-two-speed valve member 191a also has a pair of longitudinal passageways 208 and 209 both of which have radial-extending portions to port fluid through the valve casing and into particular hydraulic lines to be described. Further, spindle 203 has a pair of diametrically-opposed kidney-shaped passageways 211 and 212 (FIG. 35), and it is pertinent to note that these passages are tapered at their outer ends for the purpose of reducing flow pressure passing through these outer ends into other hydraulic lines.

Spindle passageways 211 and 212, however, have one very important difference in that it is to be noted that passageway 211 has a radial extending branch 213 terminating in the axial center of spindle 203 in communicating alignment with valve passageways 201 and 202. In operation, pressure is fed into passageways 201 and 202 and, when kidney-shaped spindle passageway 211 is communicated with this pressure, the flow proceeds through the passageway and out of the valve casing through valve passageway 209. During this period of operation, passageways 208 and 212 complete a circuit through the valve to tank.

However, when spindle rotation disrupts the communication between pressure line 202, kidney-shaped passage 211 and valve passage 209, flow obviously ceases, and, of course, this disruption occurs when solid portions 214 lying between the adjacent ends of the kidney-shaped passages lie over valve passages 208 and 209.

Also, as previously touched upon, both kidney-shaped passages are formed with gradually tapering end portions which, during rotation, are capable of gradually reducing the pressure being fed into the valve passages. This gradual reduction of pressure ultimately results, in a manner to be described, in a slowing-down of magazine shaft rotation. Also, as will be described, the passageway arrangement permits the magazine to be reversed in the event the magazine momentum carries it beyond the selected load position.

Another important feature of both valves is the fact that the operation of both valves can be adjusted so as to assure proper indexing of the magazine shaft. Such adjustment is permitted in each valve by extending pistons 189 and 189a outwardly through their respective housings and mounting a hexagonal nut 216 on each of these outwardly extending ends.

The remaining elements of the magazine indexing control best can be explained by reference to the flow diagrams of FIGS. 29, 30, and 31, it being noted that structural details of these other components are there illustrated and will be explained. As seen in these flow diagrams, the pressure line is illustrated as a solid black line while the tank line is cross-hatched and any lines containing blocked fluid are stippled. The high pressure is derived from a loader power drive which will be explained and it enters the flow diagrams at point A. As seen in FIG. 29, the valves are operatively positioned to continue high pressure flow to the pistons of B-end motor 149 which, as has been stated, is directly coupled by ring gear 157 to the magazine shaft so that, in this position, the magazine is being rotatably driven. FIG. 30 illustrates the position which the various control elements assume at the so-called load position of the magazine and, as will become more apparent, application of pressure to the B-end motor pistons then is blocked so that the magazine rotation is stopped.

The admission of high pressure fluid to the pistons of B-end motor is directly controlled by a magazine indexing detent valve 221 which, in turn, is formed of a conventional solenoid-operated pilot valve 222 and a hydraulic cylinder 223, the latter mounting a piston-controlled detent 224 adapted to engage a solenoid hand control 226 to prevent de-energization of the solenoid in the event of any power failure. Most suitably, pilot valve 222, as well as hydraulic cylinder 223, are mounted on a subplate which in turn may be supported by magazine rear support 76.

Also, as shown, solenoid pilot valve 222 includes a solenoid 225 adapted to rotatably drive a central fluid-directing rotor 227 which has passageways 228 and 229 arranged to align with similar passageways 231 and 232 in the rotor casing. Functionally considered, energization of the solenoid causes the rotor to rotate in one direction to direct fluid flow in the manner illustrated in FIG. 29, while rotation in the opposite direction reverses the alignment of the passageways so as to produce the flow illustrated in FIGS. 30 and 31. The energization of the solenoid is controlled by a suitable electric switch and the valve arrangement is conventional in other respects in that the solenoid is spring-returned to normal or off position when de-energized. The function of solenoid hand control 226 is to prevent the return of the solenoid to its off position, and detent 224 is so engaged with the hand control that in its extended position it prevents the solenoid's return.

Detent 224 is reciprocable within a bore provided in hydraulic cylinder 223 and in this bore is mounted a piston spring 233 compressed between the end wall of the bore and a piston member 234 formed at the upper end of the detent. To reciprocate the piston and the detent of which it is a part, hydraulic cylinder 223 is provided with ports 235, 236, port 235 being at the top of the cylinder so as to direct pressure downwardly on the piston and extend the detent into engagement with solenoid hand control 226. Conversely, port 236 is below and at the side of the piston so as to direct pressure upwardly from beneath the piston and cause the piston to rise and the detent to be retracted from its engagement. Of course, when the detent is so retracted, the solenoid is capable of returning to off position. The detent normally is held in its extended position since the pressure on the top of the piston acts on a greater surface area than that on its underside.

The application of fluid pressure to piston 234 is under the control of seven-speed valve 181 to the extent that, when fluid flow through this valve is blocked, pressure no longer is applied to the top of piston 234 and the piston therefore can retract so as to permit the de-energization of the solenoid of pilot valve 222.

Further, the blocking of pressure through seven-speed valve 181 affects a magazine indexing pressure switch 241 and a magazine switch pressure snubber 242. Magazine pressure switch 241 is a conventional Bourdon pressure switch which generally includes a micro switch adapted to be opened and closed by a spring loaded arm 244. As is typical of these valves, the arm is moved in one direction by its spring and in the opposite direction by the pressure-controlled Bourdon tube. For present purposes, the switch is arranged to open when pressure in the tube drops below 100 p.s.i. and this switch is electrically coupled with the solenoid of pilot valve 222 so that this solenoid is de-energized when the switch opens or, in other words, when the pressure drops below 100 p.s.i. Furthermore, the pressure within the tube drops below 100 p.s.i. each time the seven-speed valve blocks flow through itself so that de-energization of the solenoid is, in effect, controlled by the position of the seven-speed valve which position in turn is related to the indexing position of the magazine shaft.

Magazine switch pressure snubber 242 is installed in the hydraulic line leading to Bourdon tube pressure switch 241 for the purpose of protecting this switch against damage due to surges of pressure.

As has been explained, the seven-speed valve blocks flow through itself seven times for each 360° revolution of the magazine shaft and the arrangement is such that the flow is blocked just as each of the seven missile-booster combinations is approaching its so-called "loading position." The end result of the blocking of flow through the seven-speed valve is to permit indexing control or, in other words, magazine drive to be taken over entirely by the forty-two-speed valve. However, before describing the precise manner in which this is accomplished, other elements should be understood and also the hydraulic circuit shown in the flow diagram of FIG. 29 should be clarified.

As can be appreciated in FIG. 29, rotation of the magazine commences upon the energization of solenoid 225 of detent valve 221, this energization positioning its pilot valve so as to port pressurized fluid through a line 246 to piston member 168 of B-end motor blocking valve 167. As a result, the blocking valve is forced to an unblocked position permitting direct application of fluid pressure to the B-end motor pistons through line 247. Exhaust from the cylinders of B-end motor pistons is connected in the usual manner to tank, although it first passes through a magazine drive low control valve 248 which is a conventional spring-loaded and adjustable valve used to regulate flow and control the maximum speed of magazine rotation.

Pressurized fluid also is conducted through lines 249 and 251 to both the seven-speed and the forty-two speed valves, and, as may be noted, a short branch line 252 carries pressure to the underside of detent piston 234. Normally, during magazine rotation, pressure passes through seven-speed valve in the manner already described, and this pressure is applied through lines 253 and 254 both to indexing pressure switch 241 and to the top of detent piston 234. Due to a differential in surface area, this pressure on the top of piston 234 normally holds the piston down and extends its detent into engagement with solenoid hand control 226.

When seven-speed valve blocks flow through itself, pressure no longer is applied to the top of detent piston 234, the result being that the piston is forced upwardly to free the solenoid hand control and to permit solenoid 225 to become de-energized. Actual de-energization of solenoid 225 is controlled primarily by pressure switch 241, which, when the seven-speed valve is blocked, opens due to the resulting drop in pressure below 100 p.s.i. or any other limit for which it has been pre-set. On the other hand, as will become clear in subsequent description, solenoid 225 de-energizes only when other conditions are satisfied. For example, in a loading operation, solenoid 225 de-energizes only if a "ready" missile is approaching "load" position and, as has been described earlier, this "ready" condition is prepared by turning "ready" cam 143 (FIG. 21) to its "ready" position.

When solenoid 225 is de-energized, pilot valve 222 rotates to establish the flow illustrated in FIG. 30. The first result to be noted is that the reversed flow through pilot valve 222 conducts pressurized fluid to the top of B-end motor, blocking-valve piston 168 so as to move blocking valve 167 into a pressure blocking position. Direct pump pressure through line 247 then is cut-off and the B-end motor is put under the control of forty-two-speed valve 182 in the manner now to be described.

Before considering the forty-two-speed control, several other conditions should be noted. Thus, as seen in FIG. 29, pressure flowing through forty-two-speed valve 182 normally is applied through a line 256 to a so-called magazine load position valve 257, and, further, this load valve is communicated with the B-end motor pistons through a line 258. As also is apparent in FIG. 29, another pressure line 259 normally conducts fluid into magazine load position valve 257, this pressurized fluid first passing a needle valve and then being applied to a valve slide 261 for moving this slide to the left to establish the illustrated flow in which, as seen, flow of pressure fluid to or from the B-end motor is blocked by the slide. Further, valve slide 261 is spring returned to its right (FIG. 29) so that any blocking of pressure in line 259 will cause this slide to return to the position illustrated in FIG. 30.

Such being the arrangement, it now should be understandable that, when the seven-speed valve is blocked, pilot valve 222 is capable of reversing its flow so as to block the direct application of pressure to the B-end motor pistons and thus cause these pistons to be driven solely by the pressurized fluid flowing through forty-two-speed valve. However, before the forty-two-speed valve assumes motor control, load valve slide 261 must return to its right-hand position so as to permit pressure from a line 262 to pass directly through the valve and through line 258 for driving the motor pistons. This return of the valve slide is permitted upon the reversal of pilot valve 222, since this reversal cuts off the application of pressure to the valve slide and allows the spring return action.

Transfer of control occurs as the magazine is approaching a "load" position, and the control of the forty-two-speed valve is such that, as the magazine comes up to this load position, its rotational speed reduces and finally it is stopped precisely at the desired point. The reduction in speed is due to the gradual reduction of pressure in line 258 and this gradual reduction of pressure resulting from the tapering shape of forty-two-speed spindle passageway 211.

The flow conditions illustrated in FIG. 31 finally are established when flow through the forty-two-speed valve is blocked. Upon this occurrence, flow through lines 258 and 263 is blocked and, since the B-end motor blocking valve also is blocking the direct pressure source, the motor stops and the magazine rotation is halted. This magazine will remain stopped until solenoid 225 again is energized to unblock blocking valve 167.

As previously has been indicated, possibility of the momentum of the magazine causing an over-ride of the selected load position is accounted for by the indexing control arrangement. In other words, even though the speed of the magazine rotation is materially reduced as the selected missile-booster approaches load position, it is conceivable that the momentum will produce an over-ride and the present arrangement is such that, upon such an over-ride, the B-end motor rotation is reversed to return the magazine to the desired position.

The manner in which the reversal is accomplished can best be appreciated by noting the flow arrangements of FIG. 30, as well as the passageway arrangement of the forty-two-speed valve shown in FIG. 35. Thus, when the flow through forty-two-speed valve is the only pressure applied to B-end motor pistons, the motor is driven in its normal clockwise direction, although the motor's rotational speed is being reduced because of the tapered passageways in the forty-two-speed valve spindle 203. Next, as already explained, when flow is blocked through forty-two-speed valve, the motor normally stops. However, if the momentum of the magazine causes an over-ride, spindle 203 of forty-two-speed valve also will continue its rotational movement because its drive shaft 184 is directly coupled to the motor drive shaft which in turn is geared to the magazine shaft. This continued rotation of forty-two-speed valve spindle results in the alignment of its kidney-shaped passageway 212 with valve passageway 209 and also in the alignment of the other kidney-shaped passageway 211 with the other valve passageway 208. Such an alignment then causes the pressure flow in forty-two-speed valve lines 201 and 202 to be applied into line 262, and this pressure is capable of flowing through magazine load position valve 257 and into another hydraulic line 265 which as seen, admits the pressure to the lower pistons (FIG. 30) rather than the upper pistons. Also, the upper pistons then have their cylinders communicated with tank through line 258, magazine load position valve 257, line 256, forty-two-speed valve 182 and a line 264. The net result is that the B-end motor is driven in a reverse or counterclockwise direction and the same reverse rotational drive is imparted to the magazine as well as to valve spindle 203 of the forty-two-speed valve. The magazine then is capable of returning to its desired load position.

Once the magazine has been stopped at its load position, a magazine latch cylinder 266 is operable to extend its latch 267 into a latching bore 268 provided in magazine shaft ring gear support ring 142 (FIG. 25). The operation of magazine latch cylinder 266 is controlled by a solenoid operated pilot valve 269 which, in a manner similar to previously-described pilot valves, is formed of a pair of diametrically opposed solenoids, each of which are capable of rotatably driving a pilot valve rotor 271. This valve rotor, in turn, is provided with appropriate passageways diagrammatically illustrated in FIGS. 29-31, and the arrangement of these passageways is such that, normally pressure entering hydraulic cylinder 266 forces its latching piston 267 into its left-hand, unextended position. However, when the magazine rotation ceases, one of the solenoids is energized to rotate pilot valve stem 271 and produce the flow conditions illustrated in FIG. 31. As there seen, the pressure flow is admitted to the rear of latch or piston 267 so as to cause this piston to extend outwardly into engagement with its latching bore in the ring gear support. Of course, when rotation of the magazine is to be resumed, the opposite solenoid first must be energized to retract the latch.

It also has been noted that the missile-booster combinations are provided with lugs which, in turn, are engaged by particular latches 124 (FIG. 21), these latches in effect being rotatably carried by the magazine ring gear support ring (FIG. 25). Consequently, when a missile-booster combination has been indexed into load position, it is necessary to release its latch 124 so as to permit loader beam 18 to remove the missile from the magazine. Each latch 124 is released by a previously described booster to magazine latch release cylinder (FIG. 21) which, as may be noted in FIGS. 29 and 31, is controlled by another solenoid operated pilot valve 272. Normally, piston 145 of latch release cylinder 140 is held in the withdrawn position illustrated in FIG. 29 by pressure applied through line 273. However, when one of the solenoids of pilot valve 272 is energized, the valve rotor of the pilot valve is rotated into the position illustrated in FIG. 31 so as to apply the pressure to the rear of piston 145 to cause the piston to extend. When the piston extends outwardly, it causes the release of the missile latch by forcing latch slide 134 (FIG. 21) in a left-hand direction. Of course, when the opposite solenoid of pilot valve 272 is energized, pressure again is applied to retract piston 145 and return latch 124 to its normal position.

In net effect then it will be appreciated that the indexing of the magazine is very precisely controlled not only to assure a gradual deceleration as a missile approaches load position, but also to guard against and counteract any override so that the magazine stops at the exact desired rotational disposition where it can be latched securely. It further should be apparent that the "ready" cam can be set so as to maintain the supply of electric current to solenoid 225 and thus prevent stopping by permitting the continuation of the 7-speed drive control. Of further advantage, the latching of the magazine in its desired load position automatically occurs by switch-controlled solenoid action when the magazine rotation has been effectively stopped. At this stopped position, it is desired to permit the loader arm to pick up the missile booster and this operation also is permitted by an automatic switch-controlled and solenoid-energized release of the booster latch in the manner just described.

LOADER BEAM, LOADER BEAM DRIVE, AND ASSOCIATED COMPONENTS

Loader beams 18 are aluminum alloy structures adapted to transfer missiles from the magazine to the launcher arm. This descriptive section will attempt to consider all pertinent details relative to these beams, although because the two beams of the apparatus are substantially twins only one need be identified.

Referring particularly to FIGS. 36 and 42, it may be noted that beam 18 is supported at its forward end by previously identified loader arm 19, this arm having a journal received in a beam bearing structure 402. It also will be recalled that beam 18 is swingable in a fore and aft direction over its magazine and, for this purpose, loader arm 19 is swingably driven in a manner to be considered later.

Rearwardly along the beam, additional support is provided by a pair of specially formed guides 20, these guides having inwardly facing tracks 403 into which laterally-projecting beam shafts 36 extend. Each shaft has its end portion provided with a roller 36A so that, as the beam is swung by the loader arm, the shafts ride along guide tracks 403 which, accordingly, control the movement or position of the rearward portion of the beam.

Beam guides 20 are formed of two hinged-together parts, these parts being a forward, horizontal section 406 rigidly secured to the overhead and a rearward inclined or canted section 407 which is swingably carried by a triangular supporting bracket 408 so as to permit this section to be raised to make room for the passage of a traversing hoist used in the loading of the magazine.

More specifically, it can be noted in FIG. 37 that front section 406 of the guide is coupled to the rear section by a hinge 409, and, also, that swinging bracket 408 has its upper edge formed to loosely receive a supporting rod 411 the ends of which are journaled in bearing brackets secured to the overhead.

To swingably raise or lower supporting bracket 408, a crank-rotated screw 412 has its lower end rotatably mounted in a flanged portion of inclined guide section 407, while the upper extent of the screw is threadably received in a crosshead or lug 413 rotatably mounted in bearings provided at the lower extremity of bracket 408. Rotating screw 412 therefore is capable of threadably advancing through the crosshead to cause hinged guide section 407 to swing upwardly in an arcuate path the radius of which is defined by supporting bracket 408. As would be expected, the normal position for guide section 407 is its fully lowered position and most suitably a locking pin 414 is employed to securely maintain this position.

In other operative positions of loader beam 18, its front and rear ends are supported or steadied in precise dispositions assuring proper alignment of missile-carrying beam rail tracks 34 with other elements. Thus, when the loader beam has been lowered to the magazine (FIG. 8), its rear end is steadied in a precise disposition by a rear centering support 416 (FIGS. 8 and 38). The support is provided primarily by a centering pin 417 receivable in a bore 415 (FIG. 36) provided in the rear end wall of the beam. When the beam is engaged by pin 417, it is precisely located with its rail 34 directly over and in alignment with a lug of the booster which subsequently is moved onto the rail to permit the missile-booster to be carried by the beam.

Incidental to this rear centering support, it also may be noted that a desirable safety feature is provided in the form of a guard rail 418 which is movable, but which must be in its illustrated guard position before the electrical circuit initiating the power drive of the loader beam can be completed. Preferably, movement of the guard rail into guard position, closes a snap switch (not shown) which is in the power circuit. Of course, movement away from this guard position opens this circuit.

A loader beam front centering support is provided to support the front end of the beam in its wing and fin assembly position (FIG. 9) as well as its stowed position (FIG. 7). As shown in either of these figures, the support is provided by previously-mentioned blast door lug 32a which is recessed to receive conical plug 32 mounted on the extreme front end of the beam.

In its FIG. 11 position, the beam is supported and positioned by a launcher-loader beam latch mechanism 420 which will be considered in detail later. For the present it will suffice to say that this latch has a conical recess to receive conical plug 32 to precisely center the beam so that its rails 34 are aligned with previously-identified launcher arm rails 5 (FIG. 5). Such precise alignment of these rails is an essential prerequisite for the subsequent transfer of the missile from the beam onto the launcher.

*Loader beam buffers*

With regard to the front centering support for the beam, it is to be noted that, because the beam is traveling through a relatively long arc, and also because of the substantial forward momentum of the beam, there is a danger of misalignment of beam end plug 32, as well as substantial shock when this front plug 32 contacts the launcher arm. To avoid such an occurrence, it has been found desirable to form the beam itself of two separate sections which consist of a main rearward section 422 (FIG. 39) and a front beam extension section 423. Generally, the arrangement is one in which beam extension 423 is swingably carried by rear section 422 and a cushioned piston interconnects the rear with the front section to maintain the front section in an erect position. Any shock occurring when the beam strikes its front end supporting members is transmitted through this beam extension to the buffers where it is safely absorbed.

More particularly, the swingable suspension of extension section 423 is provided by a yoke 427 secured to rear beam section 422 and a rod 428 carried by the yoke and having its ends journaled in the side walls of front extension 423.

The piston interconnection of the front and rear sections is pressured by special buffers 424 and a buffer accumulator 426. The members best can be understood by reference to the hydraulic flow diagram of FIG. 41 and the structure of FIGS. 39 and 40. As seen in FIG. 39, each buffer has a buffer bracket 429 rigidly secured to the top surface of front beam extension 423 and, secured to this bracket by means of a clamp 431 is a cylinder portion 432 of the buffer. Within cylinder 432 is a piston 433 which has an enlargement 434 both sides of which are communicated with pressurized fluid in the manner shown in FIG. 41. Also, to inter-communicate the pressure on both sides of piston portion 434, the intake passages are interconnected by another passageway 436 in which is mounted an adjustable needle valve 437 which enables the establishment of proper buffer resistance.

Within cylinder 432 also is mounted a spring 438 which bears at one end against a collar 439 secured to the piston and at the other end to the inner end wall of the cylinder.

At its right hand end, piston 433 projects outwardly through the cylinder and its outward projection is secured by means of a ball clamp 441 to a bracket 442 (FIG. 39) mounted on rear or main beam section 422. The bracket-secured end of the piston is formed into a ball and this clamping arrangement is employed to permit a pivotal movement made necessary because of the swinging suspension of front beam extension section 423.

Pressure is applied to buffer piston 433 through accumulator 426 (FIG. 41) which, in turn, is supplied by a high pressure line 443. The pressure entering accumulator passes a ball check valve 444 and is applied to an accumulator piston 446 that is spring pressed in opposition to the piston fluid pressure by a casing-mounted spring 447. As will be appreciated, check valve 444 prevents release of pressure back into the system and, because of the action of spring 447, the accumulator is able to maintain a constant high pressure on the buffer pistons.

In effect, the buffers hold beam front extension 423 in an erect position because buffer pistons 433 interconnect the rear and front beam sections. When the front extension is subjected to any shock, buffer cylinder 432 is pressed rearwardly but its motion is cushioned by the fluid pressure behind its piston. This pressurized fluid behind the buffer piston must move through interconnecting passageway 436 so as to permit the cylinder to move relative to its piston. The cushioning action not only reduces shock, but, in conjunction with the swingable suspension of the beam extension, it permits the beam front plug 32 to seat smoothly in its centering recesses.

*Loader beam drive*

It has been noted that the loader beam drive is provided by a loader arm 19 which carries the loader beam on a beam-supporting journal 448. The loader arm, in turn, is pivotally mounted in a conventional manner on a horizontal shaft 451 the ends of which are carried in bearing brackets 452a and 452b. As seen in FIG. 43, left-hand bearing bracket 452a is rigidly secured to the top of a loader arm support 453, and, as is to be particularly noted, arm shaft 451 projects outwardly through this left-hand bracket to provide a free-end portion on which is mounted a cam plate 454 that is part of an arm drive deceleration unit to be described. Right-hand bracket 452b is carried by previously-identified front support 72 which also supports the front end of magazine shaft 40.

To both support and drive loader arm 19, the arm is engaged by a fluid-driven piston 456 the lower end of which is pivotally mounted on a rod 458 supported by cleats 459 which, in turn, are bolted to the deck. To secure arm 19 to piston 456, the piston mounts on its upper end portion a block or head 461 through which a loader arm-supported shaft 462 extends. Shaft 462 pivotally supports the end of the piston, the result being that, as the piston is reciprocated, both the piston and its cylinder can pivotally maintain their requisite alignment. The reciprocation of the drive piston, of course, causes the loader arm to swing about its shaft 451 so as to carry the loader beam through the arc necessary to transfer missiles between the magazine and the launcher.

The hydraulic drive of piston 456 is illustrated in the flow diagrams of FIGS. 44 and 45 and in these same drawings, the previously-mentioned drive deceleration unit also can most easily be understood.

Referring to FIG. 44, fluid pressure from the power supply is supplied to the piston through main pressure like 463 and the pressure is pumped to tank through main tank line 464. However, to control the direction of movement, as well as its speed, the flow first is directed through a number of valves which may be located in appropriate housings at convenient locations depending upon the operational control desired.

In FIG. 44, the fluid pressure in line 463 is supplied through a branch line 466 to a directional valve 467 and also through other lines to solenoid-operated pilot valves 471 and 472. Both of these pilot valves are similar in construction in that each has a pair of solenoids adapted upon energization to rotate a central valve spool to port the fluid in different directions as shown in the differently-rotated dispositions of FIGS. 44 and 45. However, pilot valve 472 is the only one used to alternate the direction of flow; valve 471 being solely a blocking valve which, when rotated into its alternate position (not shown), acts only to block the flow through the directional valve. However, as will become apparent, when flow is so blocked the drive of the loader arm ceases and the loader arm stops. This stopping of the arm therefore is under the control of the blocking valve solenoid which in turn may be energized by the closing of an appropriate switch when the loader arm reaches a particular position such as the fully lowered position of FIG. 8 or the other positions of FIGS. 7 and 11. To achieve this blocking action fluid ports through blocking pilot valve 471 and to the right-hand side of a blocking spool 473 which is a part of directional valve 467. Spool 473 then is moved to the left into a position that will block any flow through directional valve 467.

Solenoid-operated pilot valve 472 also has a ported rotary-type spool which in the rotated position shown in FIG. 44 sends the fluid to the left side of a fluid-directing spool 474 of directional valve 467 to move this spool to the right. Pressure fluid in branch line 466 then flows through the directional valve and on into the bottom end of main drive cylinder 457.

In proceeding from directional valve 467 to cylinder 457, the pressure is led into and through a pair of metering valves 475 and 476, valve 475 being a needle type valve which is adjustable for regulating flow while valve 476 is a loader beam drive metering valve that is directly controlled by previously mentioned cam plate 454, which it will be recalled is carried on the end of the loader arm shaft. Cam plate 454 has three cam surfaces 475 (FIG. 44) disposed to engage a cam follower 477 mounted on a plunger 478 which, as seen, is an extension of a spring-returned valve piston 479 reciprocable within the body of this metering valve. As will be apparent, cam surfaces 475 press piston 479 to the left to gradually reduce fluid flow through both the pressure and the tank ports of the valve, and, of course, the reduced pressure on piston 456 decelerates the loader arm and the loader beam carried by it. The deceleration unit is so operated that the loader beam rate of travel is reduced as it reaches any of its critical positions such as its missile "pick-up" position at the magazine, its wing and fin assembly position, and its beam to launcher missile transfer position.

The function of needle-type valve 475 becomes more apparent when taken in conjunction with the operation of drive metering valve 476. Thus, when piston 479 of the metering valve is cam-pressed to the left, the needle valve still permits a small flow of pressurized fluid to pass on to main cylinder 457 so as to relieve any residual pressures.

In a general manner, it now should be apparent that the rotated position of the loader effects the operation of drive metering valve 476 which, in turn, slows down the arm and the loader beam. Upon reaching its critical position the arm and beam then are stopped by the operation of blocking pilot valve 471. Since blocking valve 471 is electrically actuated the stopping of the arm drive can be accomplished automatically in response to the closing of a switch.

It also is possible to control the loader arm drive entirely by hand and, for this purpose, a hand control valve 481 as well as shut-off valves 482 are provided. When shut-off valves 482 are opened (not shown), control of the beam drive can be accomplished by swingably moving control lever 483 of the hand control valve between positions A, B and C. This movement of control lever presses a valve piston 484 to the right or left either permitting flow through the valve or blocking it. As seen, this hand control can be used as a by-pass for directional valve 467 and blocking pilot valve 471.

When piston 484 is in A position the pressure flow is as shown by the solid, or filled, passageways of FIG. 44 and main drive piston 456 is forced upwardly. In the C position, the flow is from main pressure line 463 into the hand control valve and through the valve into line 486 which then becomes a pressure line leading to drive metering valve 476 and on to the upper end of main drive piston 456 to force this piston downwardly. The tank line for this C position is line 487 which is shown as a pressure line in FIG. 44 but which obviously becomes a tank line due to the position of piston 484. Consequently, in A position the loader arm swings upwardly; in C position it swings downwardly; and in B position the pressure flow is blocked and the arm stops. The hand control may be used as desired although it is provided primarily as a precaution against power loss.

It also may be noted in FIG. 44 that the pressure entering and leaving main cylinder 457 is passed through flow control valves 489, the function of which is to control the quantity of fluid entering and leaving the cylinder. For this purpose, each of these valves 489 has a spring-biased piston 491 backed so that, upon pressure surges, the piston is capable of compressing a compensating amount. Main drive cylinder 457 also mounts check valves 493 and needle valves 494, these being conventional elements for cushioning the seating of piston 456 and for regulating the rate of piston travel.

FIG. 45 should need no additional explanation since it simply demonstrates the reversal of flow through directional valve 467 such as is necessary to lower drive piston 456 and depress the loader arm. It, however, may be noted that FIG. 45, as well as FIG. 44, includes at the bottom of the diagram a bypass solenoid valve 495. Its function is to allow pressure flow to bypass cylinder 457 and its operation is solenoid-controlled in a manner that is similar to the other solenoid operated rotary valves already discussed.

*Loader beam latching mechanisms*

It has been noted in the last section that the loader beam is automatically stopped at certain critical points in its arcuate travel, these points being its missile pick-up position at the magazine, its wing-and-fin assembly position, and its missile transfer or loading position at the launcher. Also, after a missile has been placed in the launcher, the beam is returnable to a stowed position which, as has been indicated, is the same as the wing-and-fin assembly position.

In certain of these positions it is highly desirable to securely latch the magazine so as to avoid any accidental movement such, for example, as might occur upon sudden movements of the ship or in the event of faulty hydraulic operation or defective electrical actuation. Suitable latches therefore are provided at both elevated positions of the beam or, in other words, at both the wing-and-fin assembly position (stowed position), and at the beam to launcher missile transfer position.

*Loader beam latch*

At the wing-and-fin assembly position (FIG. 9) as well as the stowed position (FIG. 7), the beam is secured by a mechanically-locked hydraulic latch 501, the structure of which is shown in FIGS. 39, 46 and the hydraulic operation in FIG. 47.

Referring to FIGS. 39 and 46, it is seen that latch 501 has as its principal components a pair of front and rear cylinders 502a, and 502b in which are mounted pistons 503a, 503b, the free ends of which are connected to front and rear pivotal stop members 504a, 504b by appropriate pivot pins 506. These stop members 504a, 504b in turn, are pivotally hung on short stub shafts 507 which, as particularly shown in FIG. 46 are carried by a bracket 508 bolted to the overhead. In the drawing this bracket is partially cut away to better illustrate the preferred shape of the stops and their mounting. Hydraulic cylinders 502a, 502b further each have their rear portions pivotally hung in a yoke 509 which also is bolted to the overhead, or more precisely, to a dependent frame of the overhead as shown.

To appreciate the general manner in which the latch 501 functions, it will be recalled that loader beam 18 carries on its upper surface a T-shaped lug or stop 31 which, at wing-and-fin assembly position (or stowed), is caught between and securely held by latch stops 504a, 504b. As will be understood, the arrangement is such that, as the beam is being raised from the magazine to the wing-and-fin assembly position, front stop can be placed in its forward path by applying pressure to front cylinder 502a to extend its piston. Lug 31 then will strike this front stop after which pressure can be applied to rear cylinder 502b to extend its piston and cause its stop 504b to swing with engagement with and securely clamp the lug between the two stop members.

When beam movement to the launcher is to be continued, the front stop is retracted, but not the rear one. Consequently, in the return movement of the beam 18 from the launcher, rear stop 504b is in an extended position to engage the beam lug and initiate a similar clamping engagement between the two lugs. In a similar manner, when the beam is to be moved from wing-and-fin assembly position to the magazine, the rear stop is retracted leaving the front stop extended so as to be functional upon the ensuing elevation of the beam.

Another important feature of this latch is a mechanical lock provided as a precaution against power failure. Such a lock is provided by a third cylinder 511 carried by bracket 508 and mounting a piston 512 the free end of which is formed as a wedge 513. As perhaps most easily appreciated in FIG. 39, wedge 513 is so aligned that, upon its extension by piston 512, it drives in between the upper ends of stops 504a and 504b. When so disposed between these stops, it will be apparent that the stops are incapable of retracting so as to free or release beam lug 31.

Operationally considered, when the hydraulic pressure in the power system is normal, wedge cylinder 511 retains its piston and the wedge in a retracted position. However, as will be explained in more detail in the hydraulic description, when the line pressure drops below a predetermined point, pressure is applied to the wedge cylinder to extend the wedge between stops 504a and 504b. The predetermined minimum pressure, of course, is below any anticipated fluctuations and it therefore is indicative of a power failure such as must be guarded against. It is particularly important in a system of this type to guard against power failure not only because of sudden ship movements which might cause the loaded beam to move in either direction, but also because movement in either direction actuates switches that in turn energize solenoids so as to continue the movement and perhaps cause serious damage. For example, movement of stop 504a in either direction actuates a switch 505 which is an interlock switch in the circuit controlling the loader arm drive. As seen, switch 505 is actuated by a cam 513 that is mounted on stop-supporting shaft 507 so that rotation of this shaft actuates the switch. It is to be noted in FIG. 46 that only one of these switches 505 is fully shown; the other switch for stop 504b having been eliminated to show other parts.

The hydraulic drive for latch cylinders 502a, 502b and for wedge-lock cylinder 511 is illustrated in the flow diagram of FIG. 47. As there seen, pressurized fluid is supplied through a main pressure line 514, while the main line to tank is provided by a passageway 516. To reverse the application of pressure in cylinders 502a and 502b a pair of directional valves 517 and 518 are employed, valve 517 controlling front stop cylinder 502a and valve 518 controlling the rear stop cylinder.

Each of these directional valves mounts an identical spool 519 and 521 reciprocable longitudinally within its bore to either port pressure into a line 522 or 523, valve 517 being shown in the position for porting pressure into line 522 while valve 518 is shown porting the pressure into line 523. As also will be apparent, the spools of both directional valves communicate the unpressured side of latch or stop pistons 503a and 503b with tank. It further should be noted at this point that the illustrated position (FIG. 47) of latches 504a and 504b represent a normal operative position in which the loader beam is being returned or retracted from the launcher. Thus, when being so retracted, rear stop 504b is extended into the path of beam lug 31, while stop 504a has been swung upwardly to permit lug 31 to come into contact with the rear stop. In the normal sequence of events, stop 405a has been swung upwardly during a preceding latching operation to free the beam lug and permit the beam to move on to the launcher.

Directional valves 517 and 518 are controlled by solenoid-operated pilot valves 524 and 526, both of these valves being essentially identical in that they both mount a rotary piston 527, 529 the ends of each of which are drivably-engaged by a pair of solenoids. Energization of one of the solenoids, such as solenoid 531 of pilot 524, rotates the pilot spool into the illustrated position so as to port pressure to the right hand side of directional valve spool 519. Spool 519 then moves to the left and pressurized fluid entering the directional valve through branch line 532 then passes into line 522 to cause latch stop member 504a to retract.

In a comparable manner, energization of the other solenoid of pilot valve 524 (identified as solenoid 533) rotates its spool in a reverse manner to move directional valve spool 521 to the right and port pressure from a branch line 532a into line 523 to extend the front latch stop into operative latching position. It is to be noted that this latch-extending hydraulic circuit is illustrated for rear stop member 504b. Similarly, with the exception of the pilot spool disposition, the reverse action of rear stop member 504b is that illustrated for front stop 504a. It is believed that these reverse actions will be obvious in the flow diagram and that no further description is here needed.

Lock cylinder 511 also has its pressure supply controlled by a directional valve 536 which also mounts a reciprocating spool 537, although this spool is pressure driven only to the right (FIG. 47) and its return movement is produced by a spring 538. Further, movements of the spool of directional valve 536 are controlled by a pilot valve 539 that has a rotary piston 541 driven by a normally-energized solenoid 542.

When solenoid 542 is energized, pressure in main line 514 is ported through the pilot spool to the left side of directional valve spool 537. Spool 537 moves to the right with the result that pressure in a main line branch 543 ports through it to the interior surface area of lock piston 512 to maintain this piston in a retracted position with its piston-carried wedge inoperative. De-energization of solenoid 542 rotates pilot spool 541 into a blocking position in which no fluid passes through the pilot valve. Consequently, no fluid pressure is applied to the left end of directional spool 537 so that spring 538 moves the spool to the left. When so moved the directional valve ports pressure to the outer or rear side of lock piston 512 to extend this piston and force its wedge portion into locking position between latch stops 504a and 504b. With the foregoing explanation, the path of pressure as well as tank flow for both the retracted and extended piston positions should be easily followed in the flow diagram.

It has been noted earlier that the locking wedge is primarily a safeguard against pressure failure. To achieve this result, solenoid 542 of pilot 539 is capable of being de-energized upon the opening of a pressure switch 543 which, as seen, is a conventional Bourdon-type pressure switch similar to the pressure switch of the magazine drive fluid circuit. Switch 543 is communicated directly with main pressure line 514 and the switch is so set that any drop in pressure below 1000 p.s.i. causes the switch to open and solenoid 542 to be de-energized. De-energization of the solenoid results in a blocking of pilot valve flow so that, as explained, the locking wedge then extends. Such a lock is a safeguard against pressure failure since the wedge cannot be retracted until the pressure is rebuilt and, as long as the wedge remains extended, the beam is tightly secured.

*Loader beam to launcher latch*

In the operative position illustrated in FIG. 11, the loader beam has been extended through blast doors 21 and its front conical lug 32 has ben received and centered in a launcher arm recess 544 (FIG. 48). When so centered, loader beam rails 34 align with launcher arm rails 5 and the missile-booster combination then can be moved onto the launcher rails by rammer car 35 the details of which are yet to be described. It will be appreciated that, at such a critical moment, it is for this purpose that previously-mentioned latch 420 is employed.

This latch 420 includes as its principal components a latch-actuating cylinder 546 pivotally supported in a bearing bracket 547 and mounting a reciprocating piston 548 that is shown in its fully extended position. Linked to the free end of the piston by a bell-crank 549 and link arms 551 and 552 is a latch arm 553 or keeper that is shaped to engage in a notched recess 554 provided at the front end of the loader beam lug 31. Keeper 553 is directly connected by a shaft 556 carried in the side walls of launcher recess 544 so that the pivotal movement of link arm 552 rotates shaft 544 and, in turn, rotates the latch into or out of engagement with the loader beam.

More specifically, it may be noted in FIG. 48 that the fully retracted position of latch piston 548 is indicated in dotted lines and, as will be apparent, retraction of the piston to this dotted line position will straighten out the latch arm connecting linkage so that link arm 552 will pivot or swing in a counterclockwise direction to retract or release the latch. In a reverse manner, extension of the piston upon application of fluid pressure will rotate the latch in a clockwise direction into the illustrated engaged position.

It also is to be noted that bell crank 549 has a forward extension rotatably engaging a shaft 557 on which is mounted a pair of radially-projecting tripping arms 558, 559 adapted, when rotated by the bell crank, to depress or raise an arm 561 of a switch 562. This switch is an interlock switch in the loader arm drive circuit and, when closed, it permits the blocking of pressurized fluid to the loader arm's main cylinder so as to arrest the loader arm and loader beam movement. When latch piston 548 is extended to effect a latched condition, tripping arm 558 raises switch arm 561 to close the switch.

Another switch of considerable importance is spring pressed switch 563 which has a plunger 564 extending into launcher socket 544 through its rear wall. This switch is actuated when the forward extremity of the loader beam engages and depresses its plunger 564. When actuated, this switch permits application of pressure to latch cylinder 547 to extend the latch piston and cause the latch to engage the seated loader beam. The beam remains latched until positively relieved by a solenoid energization which reverses the direction of the pressure application and causes the latch cylinder to retract. As is typical of the entire launcher, such energization cannot be effected until other conditions, such as the retraction of the rammer car, have been satisfied.

*Blast door operating mechanism*

Previously-noted blast doors 21 are located in the front wall of the deck house and they serve the purpose of protecting the deck house components both from the weather and from the heat and pressure resulting when a missile is launched.

Structurally, these doors (FIG. 49) include a pair of like members identified as an outboard blast door 581 and an inboard door 582; outboard door 581 being swingably hung on U-shaped hinge plates 583, 584 and inboard door being similarly swung on plates 586, 587. However, only inboard door 582 is positively driven and it, in turn, has its lower hinge plate 587 connected by a tie-rod 588 to lower hinge plate 584 of the outboard door so that the opening and closing movements of the inboard door impart the same movements to the outboard door.

To open and close the doors, a door-operating cylinder 589 is mounted for pivotal movement about the longitudinal axis of a pivot pin 591 which, as seen, is carried by a yoke 592 secured to the deck house. The cylinder mounts a reciprocable piston 593 having its outwardly-projecting free end operatively coupled to upper hinge plate 586 of the inboard door. Hydraulic reciprocation of piston 593 swingably moves hinge plate 586 to open the inboard door and this action is translated to outboard door 581 through tie-rod 588. It is to be noted that hinge plate 586 carries an upstanding pin 594 and, disposed in the path of travel of this pin is a switch arm 596 of an interlock switch 597. This switch is closed when the blast doors are open to permit other occurrences to be described later.

Another feature of the blast doors is the latching action provided by upper and lower cylinders 598a, 598b which mount pistons, the ends of which rigidly carry door-locking pins 601. It is to be noted, however, that only the pin for the lower latching cylinder appears in the drawing. As seen, upper and lower cylinders 598a, 598b are carried by latch brackets 602 which are bolted to deck house frame members provided near the upper and lower edges of the doors, and, also mounted on these brackets are interlock switches 603, one function of which is to permit the opening of the blast doors only when the doors are unlatched. Consequently, both of these switches close upon the unlatching of the doors.

Piston-carried latching pins 601 achieve their door-locking function by being extended into aligned openings provided in bracket flanges 606 and 607. Of course, the openings in these plates are aligned only when the doors are closed, and it further will be quite apparent that the doors are securely latched when the latching pins are extended through the flanges.

To better understand the operation of these blast-door components, reference can be made to FIG. 50 which is a flow diagram for blast-door operating cylinders 589 and to FIG. 51 which also is a flow diagram illustrating the operation of latch cylinders 598a and 598b. In both flow diagrams the pressure lines are indicated in the usual manner by open or unhatched passageways, while the tank lines are hatched.

Referring first to FIG. 50, door-operating cylinder 589 has its pressure supply controlled by a directional valve 609 that has a spool 611 driven in one direction or another by a pilot valve 612. Pilot 612, in turn, has a rotary piston 613 coupled at one of its ends to a solenoid 614 and at the other to a solenoid 616. Pressure is directed to rotary pilot piston 613 through a line 617 and, depending upon which solenoid is energized the spool applies the pressure either to the right or left hand ends of directional valve spool 611. As shown in FIG. 50, solenoid 614 is energized and, accordingly, the pilot pressure has moved the directional spool to the right with the result that pressure from a main line 618 flows through the directional valve and into operating cylinder 589 through a line 619. The cylinder piston then is extended to cause the doors to open.

When the other solenoid (solenoid 616) is energized the flow through the pilot valve spool is reversed or crisscrossed in the manner already described in many similarly-constructed valves and its pressure moves directional spool to the left. Main line pressure then is applied to cylinder 589 through line 621 to retract its piston and close the doors. Also, of considerable importance, main pressure line 618 includes as a safety precaution a check and needle valve 622. Normally, because the needle of this valve is closed and the ball check valve allows one way passage, pressure on piston 593 can be maintained even though a hydraulic failure may occur. The needle valve is used to permit a manual release of this trapped pressure when so desired.

The hydraulic control of the blast door latches can be in all essential respects substantially identical with the hydraulic control of the door opening cylinder which has just been described. As seen in FIG. 51 it has an identical directional valve 624, as well as an identical pilot valve 626 operated by solenoids 627 and 628. Further, its main pressure line also has a check and needle valve 629 in the event of power failure. The principal difference is, of course, that there are two-latch cylinders 598a and 598b so that the pressure lines connecting these cylinders to the directional valve must branch so as to communicate the pressure with both cylinders.

Operatively considered, FIG. 51 illustrates the condition in which solenoid 627 is energized and the pressure retracts the latch pistons and their locking pins 601. Energization of solenoid 628 criss-crosses the flow through pilot valve 627 and causes the latch locking pins to extend into door-locking engagement. This reversed or crisscross hydraulic flow should be apparent from the flow diagram when considered in conjunction with the door cylinder flow already described.

RAMMER CAR AND RELATED COMPONENTS

Having considered the structure of the loader beam, as well as the manner in which it is swingably driven and the manner in which it is securely latched at selected positions, it remains to consider the rammer car itself along with its drive and its latches which ensure against unintended movements. As has been noted, rammer car 35 (FIG. 52) is mounted for reciprocal movement along loader beam rail 34 and its general function is to pick up the missile at the magazine and move the missile longitudinally along the beam and finally onto the rail of the launcher arm. The rammer car also is functional in a reverse manner in any launcher unloading operation.

The general arrangement of the rammer car proper is best shown in FIGS. 52 and 53 where it may be noted that the car is formed of front and rear units 701 and 702 interconnected by a tubular extension 703. These units each have a short rack section 704 and 706 adapted to mesh with a drive chain 707 which, in the manner to be described, extends substantially the full length of the loader beam. As also will become clearer, one distinct advantage in providing spaced and separately driven front and rear units is to permit the front section to be driven completely off the loader beam rails and onto the launcher beam rails so as to position a missile-booster carried by the front section on the launcher arm.

The rammer car drive of which chain 707 is a part, is shown in FIGS. 52 and 55 and, as there seen, it is provided by a B-end motor 708 coupled by a drive shaft 709 to the gearing of a gear box 711 which, in turn, drives a sprocket 712 about which chain 707 extends. More specifically, it will be noted in FIG. 57 that the drive shaft is coupled to a worm 713 that is drivably meshed with a worm wheel 714 splined on a worm wheel shaft 716 which carries drive sprocket 712.

Sprocket 712 provides part of a path around which drive chain 707 travels, the remainder of this path being formed of a fixed sprocket 717 (FIG. 55), an adjustable sprocket 718 and another fixed sprocket 719 carried at the front end of the loader beam. As will be evident, travel of the chain around this path moves the rammer car to which it is meshed along beam rail 34, the direction of movement being in accordance with the clockwise or counterclockwise direction of the chain travel.

Since the purpose in driving the rammer car in its fore and aft direction is to carry a missile booster combination to or from the launcher arm, it, of course, is necessary that the missile booster be engaged by the rammer car and also that, for exercising operations, this engagement be of such a nature as to permit the rammer car to retract the missile from the launcher. This engagement primarily is effected by rammer car front unit 701 which, as seen in FIG. 56, engages an outer rear lug 721 formed on the booster. Another important booster lug is known as its outer front lug 722 which, it will be seen, rides on loader beam rail 34.

Considering more in detail the engagement of booster lugs 721 and 722, it first should be noted that, as seen in FIG. 56, the various parts are in the relative positions which they will have when the loader beam has been fully lowered to the magazine for the purpose of picking up a missile, and it is particularly important to note that in this position front lug 722 of the booster projects upwardly through a notched portion 723 provided in beam rail 34. Also, rammer car 35 has been fully retracted so that its front end is slightly behind rear lug 721. The first action then is to drive the rammer car forward for the purpose of engaging it with rear lug 721 and also moving front lug 722 onto the beam rail.

For the purpose of engaging rear lug 721, front unit 701 of the rammer car is formed with hook assemblies which can be considered in some detail. Thus, as is shown in FIG. 54, front unit 701 is formed of upper and lower halves, the lower half consisting essentially of a pair of spring-loaded hooks 724, while the upper half is formed of a pair of hook spreaders 726, which are linked to the hooks of the lower half in such a manner that opening or closing of the spreaders causes the hooks to open and close. Other structural components of front unit 701 of the rammer car are hook release levers 727 projecting laterally outwardly at each side of the front unit, as well as an actuator 728 which is carried slightly to the rear of the release levers. Also to support the rammer car in its movement along beam rail 34, both front and rear units 701 and 702 are formed with guides 729 and 731 which, in the manner shown, have inwardly turned flanges adapted to engage rail 34. Guides 729 of front unit 701 carry lower hooks 724 as well as front rack 704. Also, as may be noted in FIG. 54, spreaders 726 are slidable within the guide structure and the relative movement necessary for this slidable travel is permitted by a notched-out portion formed in front rack 704.

Such being the structural arrangement of the rammer car, its operation now can be considered. Referring again to FIG. 56, the initial forward movement of the rammer car causes spring-loaded hooks 724 to engage rear lug 721 and thereby pick up the rear portion of the missile booster. Continued forward movement of rammer car first moves front lug 722 of the booster onto the beam rail and, subsequently, after other operations are performed, carries the missile booster combination forwardly to one of the launcher arms 4. Such other operations include stopping the rammer car at the previously-described wing and fin assembly position and, in addition, other functions, such as the opening of the blast doors, must take place in an orderly sequence. However, assuming such actions to have occurred, the rammer car carries the missile onto the launcher arm and, in so doing, front unit 701 leaves beam rail 34 and moves onto aligned launcher arm rail 5. In fact, the principal purpose in providing a front unit 701 spaced forwardly of rear unit 702 is to permit this front unit to move onto the launcher arm rails a sufficient distance to place the missile in a position where it can be engaged by a launcher arm spade (not shown).

When front unit 701 has moved a set distance onto the launcher arm, it is necessary to release the engagement of hooks 724 with booster rear lug 721 so that this lug, in turn, can be engaged by the launcher arm spade. This release can be accomplished in various manners, although, as presently contemplated, it is achieved by the provision of a special lug (not shown) on the launcher arm, this lug acting to engage and spread spreaders 726 of the reciprocable upper half of the rammer car front unit. When spreaders 726 are opened by this lug, the linkage between these spreaders and hook 724 causes the hooks also to open and release the booster lug. With the hooks so spread, the rammer car then can be driven forwardly a short distance and, during this travel, the spreaders remain stationary while the hooks carry the missile lug. The purpose in this final forward movement is to carry the freed lug into a position at which it can be engaged by the launcher arm spade which then takes over the control of the missile booster until firing. This phase of the transferring engagement of the missile to the launcher arm is not illustrated because, as stated, it can be accomplished in various ways and, further, it is not a part of the present inventive concept.

Another feature that can be considered at this point is the function of actuator 728. Generally, this actuator controls a switch 732 (FIG. 58) this switch, in turn, determining whether the missile booster combination will be transferred to the launcher arm or returned by the loader arm to the magazine. When switch 732 is open, the rammer car retracts with the missile and, when closed, the missile remains on the launcher arm. Actuator 728 is so arranged as to engage and turn a switch actuating lever 733 for closing the switch and, thereby permitting the release of the missile and capture by the launcher arm spade.

When a missile booster combination is to be returned from the launcher arm to the magazine, it, of course, also will be necessary to release hooks 724. For this purpose, a pair of yoke-like release arms 734 (FIG. 53) are carried by the loader beam. These arms are hydraulically operated in a manner shown in FIG. 59 and to be described in some detail. In a general manner, however, they act by pressing inwardly on rammer car hook release levers 727 to cause the hooks to open. This action is intended to occur after the swingable loader beam has placed the missile in the magazine and missile has been latched therein. Accordingly, release arms 734 are carried at an appropriate position on the loader beam, and, of course, when their action is required rammer car 35 must be driven rearwardly to align its hook release levers with the release arms. After release the rammer car can be driven even further to the rear to the position shown in FIG. 56. In this position the missile has been released and locked in the magazine.

The structure and hydraulic operation of release arms 734 best can be appreciated with reference to the hydraulic flow diagram of FIG. 59. As there seen, release arms 734 are coupled by a yoke linkage 736 to an outwardly extending end of an hydraulically actuated piston 737. Piston 737, in turn, is reciprocated by hydraulic pressure applied under the control of a solenoid actuated valve 738. When the solenoid is actuated in such a manner as to cause flow of pressure to the bottom of piston 737, yoke 736 is raised to cause release arms 734 to press inwardly. Conversely, when pressure is cut off, a spring 739 mounted in the piston housing, forces the piston downwardly to spread the release arms a sufficient distance to clear the rammer car and permit its passage therebetween.

FIG. 59 also illustrates another latching operation which is used to secure the rammer car in a fixed position when the loader beam has brought the missile to its wing and fin assembly position. As will be recalled, it is necessary to stop the movement of both the beam and the rammer car at this position so as to permit the assembly or disassembly of the wings and fins. The particular latching mechanism utilized for this purpose includes a rammer car front latch 741 (FIG. 52) and a rammer car rear latch 742, and, as may be noted, these units are mounted in a mutually facing spaced-apart position at the rear of loader beam 18. More specifically, the mutually facing front and rear latches are disposed in position to engage rear rack 706 of the rammer car rear unit when the rammer car has been moved forwardly a certain amount dictated by the relative location of the wing and fin assembly position.

Referring to FIG. 59, front and rear latches 741 and 742 are formed of pivotal front and rear stop members 743 and 744 each of which are pivotally hung on supporting brackets 746 and 747. Also, front and rear stop members 743 and 744 each have an upwardly extending arm engaged on one side by a spring-pressed plunger 748 and on the other side by a piston 749. Each of these pistons, in turn, is under the control of a solenoid actuated valve 751 and the hydraulic action is such that, when valve pressure is applied to pistons 749, the stop member is pivotally raised to clear rear rack 706. When no pressure is applied to extend piston, springs 748 return the stops to their normal positions which lie in the path of travel of rear rack 706 to securely block the travel of the rack.

Functionally, when the rammer car and its rack 706 is moving forwardly (right to left) to bring it into its FIG. 59 position, its rear rack rides (or, as seen in FIG. 59, has ridden) under rear stop 744 because the rack forced this stop upwardly in a pivotable movement resisted only by the resilient force of spring 748. However, if front stop 743 is disposed in its normal lowered position, rack can travel only to the extent of this stop. Of course, when the rear rack of the rammer car strikes the front stop, rear stop 744 can return to its lowered position to engage the rear of the rack and prevent movement in either direction. When the wing and fin assembly operation has been completed, front stop 743 is hydraulically swung upwardly to clear the rack and permit continued forward movement of the rammer car. The reverse operation takes place when the rammer car is returning a missile to the magazine. In this situation, movement of the rammer car is blocked by rear stop 744 which, when this disassembly of the wings and fins is accomplished then can be swung upwardly to permit for retraction of the rammer car prior to the lowering of the beam to the magazine.

As have been generally described, the forward and aft movement of the rammer car is directly controlled by B-end motor 708 which can be similar in all respects to the B-end motor used for indexing the magazine. In the conventional manner, such a motor produces a clockwise or counterclockwise movement which is imparted to its drive sprocket 712 to drive rammer car. Also, because such a B-end motor is hydraulically driven, its rate or speed can be hydraulically controlled and one of the features of present drive is a special speed control mechanism employed to decelerate the rammer car as it approaches particular locations such as the wing and fin assembly position.

The speed control mechanism, generally indicated by numeral 752, is structurally illustrated in FIGS. 59 and 60. As thereseen, the mechanism is mounted on worm wheel shaft 716 which also mounts drive sprocket 712. Basically, it includes a flange 753 rotatably secured to shaft 716 at its outermost extremity and, inwardly of flange 753, the shaft mounts speed-control cam 754, which, however, is freely or independently rotatable with respect to the drive shaft. A torsion spring 756 couples control cam 754 to the housing of the gear box and, between this cam and outer flange 753 are mounted seven tumbler cams 757 which also can rotate independently of the shaft. These tumbler cams are, in effect, lost-motion devices in that they each are provided with a pin which engages an adjacent tumbler only after the first tumbler cam has been rotated a particular amount. In addition, outer flange 753 is coupled in the same lost-motion arrangement to the first of the tumbler cams, the net result being that, as the drive shaft rotates, the outer flange first picks up its adjacent tumbler cam which then causes the other tumbler cams to successively pick up one another for eventually translating the drive shaft motion to speed control cam 754 which, as would be expected, is engaged by the pin of the last tumbler cam.

The resulting rotational movement of speed control cam 754 produces a pivotable movement in a lever 758; this lever being appropriately linked (FIG. 60) to an extension 759 of a piston 760 of a rammer drive metering valve 762. Movement of the piston, in turn, changes the position of a needle valve 761 disposed in the pressure line in the B-end motor so as to reduce hydraulic flow to the motor and cause a deceleration in the speed of the rammer car.

The operation of the speed control mechanism, as well as other features in the hydraulic drive of the rammer car can better be understood with reference to FIGS. 61 and 62. However, many of the elements used in this hydraulic drive are similar to elements employed both in the loader beam drive and the magazine indexing, so that the present description can be somewhat generalized.

Hydraulic pressure for the rammer car drive is applied through a line 763, while the tank line is identified by numeral 764. The components include a blocking pilot valve 766, a second blocking valve 767, a directional valve 768, a directional pilot valve 769, the previously identified rammer car drive needle valve 761, metering valve 762 and B-end motor 708, and a B-end motor bypass relief valve 772. The drive also incorporate a hand-controlled valve 773 which, as can be seen, is in all essential respects identical with the hand-control utilized for the loader beam drive which already has been described in detail.

FIG. 61 illustrates the positions of the components assumed when the B-end motor is rotated in an appropriate direction for producing a forward movement of the rammer car. As may be seen, pressure is directed to the left-hand side of the spool of blocking valve 767 and also through directional pilot valve 769 to the left-hand side of directional valve 768. Consequently the spools of both valves are moved to a right-hand position and pressure then flows through lines 774, 776, and 777 to needle valve 761. This pressure then passes through the needle valve and through metering valve 762 into a line 778 which applies the pressure directly to B-end motor 708. The return of pressure to tank is through the cross-hatched lines of FIG. 60 and it is believed that the path of this flow is sufficiently clear to need no verbal description.

FIG. 62 illustrates the application of pressure to the B-end motor for producing a rearward or retracting movement of the rammer car. This hydraulic flow diagram differs from that of FIG. 61 only in the disposition of the spools of its various blocking, direction and metering valves. As in other drives, such as the loader beam and the magazine indexing drives, these valves under the control of solenoids which in turn may be energized by appropriate switches to produce a desired disposition. The flow is somewhat similar although, as will be seen, it proceeds from pressure line 774 into line 781 which in turn communicates with the needle valve and the metering valve and with another line 782 that applies the pressure directly to the B-end motor. The tank circuit again should be obvious in the flow diagram.

The operation of speed control mechanism 752 is rather evident in these flow diagrams. As seen, when lost-motion actuated cam 754 is rotated, piston 759 is driven inwardly to reduce the flow of hydraulic fluid through the needle valve and this reduction in turn is translated to the B-end motor which causes a deceleration in the speed of advance of the rammer car.

A further feature which can be noted with respect to the flow diagram is the provision of B-end motor bypass release valve 772. This release valve is functional when the rammer car is latched or in any other similar situation in which continued movement of the car is not desired. As may be seen in the flow diagrams, it provides a circuit to tank through which driving pressure can bypass the motor.

The hydraulic pressure for all of the components described in the foregoing operations is supplied by a loader power drive illustrated in FIGS. 63 and 64. It is to be noted however that the drawings illustrate only one of a pair of power drives and that, in a manner consistent with the provision of twin loader beams and other components, there are left and right twin power drives one for each of the other left and right launcher components. However, a feature of these drives is that they are interconnected so that one can be substituted for the other in the event of a power failure. In the ensuing description, it will be recognized that most of the valves, as well as the power sources, are quite conventional and that, accordingly, no specific description of their structure or operation should be necessary.

Referring first to FIG. 63, the apparatus there illustrated includes a power drive tank 790 which is used in conjunction with a loader expansion tank 791 to store a supply of hydraulic coil for the operation for the missile loader. Hydraulic fluid is drawn from tank 790 by a conventional A-end pump 792 driven by an electric motor 793 which also may be conventional. Preferably, it should operate on 60 cycles, 440 volts, three-phase electric power to deliver 20 horsepower at 1160 revolutions per minute for rotating the A-end pump. The pump, most suitably, is a rotor-type of fixed delivery designed to develop a hydraulic pressure of 1400 p.s.i.

Connected to the pressure side of pump 792 is a pressure filter 794 for filtering hydraulic fluid before it enters the loader system. The filtering action may be accomplished in any suitable manner. Of special note is the fact that this element contains an integral relief valve 796 adapted to bypass hydraulic fluid past the filter element should it become clogged, and, a further feature employed in conjunction with pressure filter is the provision of a clogged filter indicator 797. As may be seen, indicator 797 consists essentially of a double diaphragm-type pressure switch mounted in a casing 798 and two spring-loaded gauge shut-off valves 799. Between the diaphragms of pressure switch 798 is mounted a microswitch (not shown) which is responsive to a pressure differential of 20 p.s.i. to close the switch and energize an indicator light for informing an operator that the filter element is clogged.

Proceeding from pressure filter 794, the hydraulic fluid is influenced by a number of different elements included among which are a relief valve 801 which is under the control of a venting valve 802, an unloading valve 803, a check valve 804, a pressure gauge 806, a bank for four accumulators 807, and the customary line-shut-off valves 808. Considering these elements a little more in detail, relief valve 801 and its venting valve 802 operate as a unit to vent pressurized fluid to the tank for the purpose of relieving starting torque on the electric motor when the power drive first is started. The relief valve is a conventional compound-type valve with an integral pilot valve, the latter being under the control of an adjusting screw which is not shown. When the valve is open, fluid passes to the tank. Venting valve 802 is another conventional type solenoid-operated blocking valve used as a control valve for the pilot of the relief valve.

Unloading valve 803 is similar to relief valve 801 and its principal function is to relieve pump pressure and pressure line build-up, this being accomplished generally by permitting increased pressure in the pressure line to unseat its pilot valve and vent sufficient fluid to the tank to maintain a constant pressure. Check valve 804 is a piston-type valve adapted to permit flow from the A-end pump to the loader components and to the accumulator, but to block flow in the opposite direction. Pressure gauge 806, as well as shut-off valves 808 are employed for their usual purposes.

One of the features of the power drive is the use of four accumulators 807 which, as may be noted, each is formed of a shell 809 within which is disposed a flexible bag 811 adapted to receive a supply of nitrogen gas through inlet 812. The area within each shell and outside of its bag 811 is a chamber for pressurized hydraulic fluid which is supplied through an inlet at its bottom. Poppet valves 813 also are mounted in the inlets to prevent the bag from projecting into its port. The obvious purpose of accumulator 807 is to equalize pressure surges which may be developed by the A-end pump.

To connect the illustrated power drive to its twin, there is a pressure line 814 in which one of the shut-off valves 808 is disposed and, of course, a tank line 815 also is necessary. As the need arises this shutoff valve can be opened.

In operation, when the electric motor is started, the A-end pump draws fluid from the tank and forces it under pressure to the pressure line filter. Most suitably, a warm-up period with a gradual pressure build-up is employed to protect the parts. For this purpose venting valve can be so connected to the motor circuit that, when the motor is turned to a "start" position, the solenoid of the valve is de-energized to permit the valve to port fluid entering relief valve 801 back to tank. Consequently, the relief valve relieves starting torque on the electric motor.

However, after a short warm-up interval, the motor switch can be placed in a "run" position in which the circuitry is such as to energize the solenoid of the venting valve to permit the pump to develop working pressure. With the pump running, fluid flows through the pressure line filter to the unloading valve and from this valve to check valve 804 at the outlet side of which the pressure is divided by a T connection so as to pass both to accumulators 807 and into the loader hydraulic system. Fluid entering the accumulators compresses the gas in the accumulator bag until gas and hydraulic pressures are equalized. Subsequent pressure surges then are compensated by compression of the bags.

FIG. 64 illustrates another phase of the loader power drive operation in which the pump is idling and hydraulic fluid is forced through the pressure filter to unloading valve 803. From the unloading valve the fluid passes to the check valve but, since the pressure developed by the pump is lower than that already built up in the accumulators and the loader hydraulic system, the check valve closes. This ports fluid directly from the unloading valve back to the tank to complete the circuit.

From the foregoing description it should be apparent that the system provided is a closely-controlled, reliable pressure source which also is capable of meeting emergency situations such as a breakdown of one or the other of the drives. As also undoubtedly has been realized, this power drive is employed to deliver the main pressure to such launcher components as the magazine indexer, the loader arm drive, as well as related systems employed in striking down or in other modes of operation.

CONTROLS AND OPERATION

As has been indicated a number of times, the present launching system is capable of several phases or modes of operation including those of loading, unloading, securing, exercising, and striking down. Loading, of course, is the process of transferring missiles from the magazine to the launcher, while unloading is the reverse process of returning the missiles to the magazine. The operation of "securing" involves the steps necessary to assure that the equipment is inoperative after loading, unloading, or exercising. The term "exercising" is applied to most training or practice operations in which no missiles are used, although any or all of the system components can be exercised. "Striking down" involves the initial placing of the missile-boosters in the magazine and, as has been mentioned, a special hoist (not a part of the present invention) may be used for this purpose.

In this summary review of the operation of the launcher, only the loading phase will be considered. The other phases, except for striking down, utilize the same components and they vary principally in control details which are not features of the invention.

Preparing for an operation, specific orders are initiated by the ships Combat Information Center (CIC) and such orders may be transmitted to control panels and other locations by telephone or through a system of switches and indicator lights which, although highly important as a means of communication, are entirely conventional and may be supplied as desired. The various control panels will be briefly identified in subsequent description.

After the initiation of a loading order by CIC, the remaining sequences of operation are for the most part under the control of a loader captain who first assures that all stations are manned and that the system is energized electrically with the loader motors started and at running speed. The loader captain then reports to CIC that the system is ready for operation and a firing cycle then is commenced. The cycle begins with loader beam 18 and rammer car 35 at their stowed operation (FIG. 7) and with blast doors 21 and magazine doors 27a and 27b closed. The loader beam then unlatches and lowers the magazine into position shown in FIG. 8. Concurrently, the missile booster, which has been indexed to load position in the magazine, unlatches and rammer car 35 then moves forward to capture booster outer rear lug 721 (FIG. 56.). The rammar car pushes the missile-booster combination free within the magazine and, in so doing, simultaneously engages booster outer-front lug 722 with rammer car rails 34 carried by the loader beam. Finally, the rammer car stops and, by means of latch mechanism 30, is secured at the rammer car wing and fin assembly position on the loader beam. As presently contemplated, such operative steps as these just mentioned for a single sequence of events, which, once started, takes place automatically.

In the next sequence of events, the loader beam raises to its wing and fin assembly position (FIG. 9) where it stops and latches. The magazine doors then automatically close and once closed, the magazine indexer moves a second "ready" missile-booster combination into load position.

The third sequence involves the wing and fin assembly which is accomplished manually with the loader beam and the rammer car latched at the position of FIG. 9.

Blast doors 21 then unlatch and open to permit loader beam 18, which first unlatches, to extend through the opening and mate with rails 5 of launcher arm 4 (FIG. 11).

Following these operations, rammer car 35 itself unlatches and is driven forwardly to push the missile-booster combination onto the launcher guide arm where the launcher spade, in the manner previously indicated, contacts the rammer car to release the booster outer rear-lug from the car. A launcher wand, which customarily is employed in operations of this type but which is not presently shown, then extends to the missile to apply warm-up power which continues until the moment of firing.

The actual tracking and firing of the target then passes to the control of CIC, although, as will be expected, other launcher actions continue so as to return the components to their normal stowed position. The first return action is that the rammer car moves away from the launcher and, after the car is clear of the launcher, the loader beam then unlatches from the launcher arm and itself retracts to wing and fin assembly position where it is latched. The rammer car, however, continues its rearward movement and stops at its fully-retracted position. The blast doors then close and latch, following which firing of the missile can take place. After firing, the loader crew observes a minimum of four-second delay to permit the area to clear of the blast, although, during this delay, the launcher can be returned to load position if another firing is to take place.

The firing cycle just described is schematically illustrated in FIG. 6 where it may be noted that, for an initial firing cycle, the total time required to load and fire is about seventy-six seconds. However, if operation of the launching system is continued, missiles may be fired individually or in two-missile salvos approximately every sixty-eight seconds.

The hydraulic and electric controls have been considered in adequate detail in foregoing descriptive sections and no attempt now will be made re-identifying these elements. As to the particular switches and interlocks employed in achieving semi-automatic and automatic operation, it should be apparent that such elements, as well as their electrical hook-up, are completely conventional and can be supplied as desired. It also is recognized that, except for previously-identified features, the details of the switches and their hook-ups may be varied almost without limit. The same consideration applies to the hydraulic circuitry, although it is to be noted that the foregoing description does identify a number of significant hydraulic features.

The electrical components of the system function in cooperation with the hydraulic components to control missile handling apparatus. In large part, as has been explained, these hydraulic valves and other similar components are solenoid-actuated and, in turn, the solenoids are energized or de-energized by switches most of which are hand-operated, but some of which are actuated by the movement of other components or by hydraulic pressure. Also, the switches are interlocked to provide close control of the operating components and, in general, a circuit must be established by one or more of the interlocked switches before an additional switch can initiate a particular operation.

The electrical system is controlled from five control panels which can be identified in FIG. 3. Power control panel 861 controls the distribution of power to all components of the apparatus, as well as warm-up power to missiles on the launcher. Loader control panels 862 and 863 are identical except that panel 862 operates the left side of the loader's twin components while the other operates the right side. Launcher control panel 864 controls the launcher arm and transmits operational orders to the loader control panel, this launcher control panel containing a dummy director which enables the operator to train and elevate the launcher. Another control panel 866, located near the front of the deckhouse, is known as a safety control panel in which means are provided for firing the missiles in emergency or of preventing remote firing control when conditions are unsafe; this panel being specially positioned so that its operator can observe the entire launching area.

These panels contain different types of controls such as hand-operated switches, circuit breakers, foot-operated switches, indicator dials, dial-type controls, and indicator lights, all of which are conveniently placed for the operator and also arranged so that the lights are easily seen to provide the information necessary for his actions. For example, in the loading a particular light advises the operator that a previous action has occurred. By use of such panels the loader captain is at all times fully aware of the condition of the loader and the particular operational sequence taking place at the time. Also, he is capable of taking immediate action as the need arises.

The complete hydraulic circuitry is illustrated in FIGS. 65, 66, and 67 which, it will be noted, are to be considered as a single drawing or view to the extent that the tank and pressure hydraulic lines of FIG. 65 couple continuously and directly to the tank and pressure lines of FIG. 66 and, in a similar manner, the tank and pressure lines of FIG. 66 couple continuously and directly to the tank and pressure lines of FIG. 67. In all of these three views, these lines are identified by numerals 870 and 871. To further assist in visualizing these three views as a single and complete circuit, it is to be noted that hydraulic lines 872 and 873 of FIG. 67 couple to similarly identified lines 872 and 873 of FIG. 66. Also, lines 874 and 876 of FIG. 66 are continued on FIG. 67, while lines 877, 878, 879 and 880 of FIG. 66 continue on FIG. 67. It is believed that, particularly in view of the directional arrows used on these lines which have just been identified, the three figures can be quite easily placed together and understood. It also is to be noted that the circuitry shown is that provided for only one of the twin loader components. The other has an identical circuit coupled to the illustrated circuit by lines 814 and 815.

The obvious purpose in employing three figures is to provide adequate space upon which all of the significant valves and other hydraulic components can be identified by numerals. If desired, it is believed that the complete hydraulic circuitry can be fully visualized by reference to these numerals of FIGS. 65, 66, and 67 particularly when the identified elements are considered in the light of previous description which has described all of the significant components in sufficient detail.

In general then it now should be apparent that, due to the many described structural, hydraulic and electrical features, the present launcher apparatus provides maximum simplicity, safety, reliability and control. Its operations all are automatic or semi-automatic to the extent that control is achieved by interdependently operated electrical components functioning in cooperation with the hydraulic system so that each is dependent upon the other for full performance. Safety is assured in a number of ways and, in particular, by the use of the interlocks which, by their very nature, demand an orderly sequence of operation. Of special importance, the structural arrangement provides an unusually compact and thoroughly dependable operating unit. Thus, the use of an arcuately-swinging loader beam coupled at its front end to its loader arm and guided rearwardly by the inclined guide tracks is a simple, strong and precisely moving mechanism for picking up missiles and transferring them to a launcher arm. The use of this swinging loader beam in conjunction with the traveling rammer car to maintain a firm and secure grip on the missile booster from the time it is picked out of the magazine until it is taken over by the launcher arm is a feature of very significant interest. Of further importance is the magazine itself and, in particular, its indexing mechanism. By use of the rotary-type magazine in conjunction with its indexer, close control of the indexing of a particular "ready" missile booster in load position is guaranteed. In addition, the concept of starting the missiles minus their wings and fins, and subsequently installing these wings and fins at a fixed and secure elevated position permits the handling and storing of a maximum number of missile boosters.

Obviously many modifications and variations of the present invention are possible in the light of the above teachings. It is therefore to be understood that within the scope of the appended claims the invention may be practiced otherwise than as specifically described.

What is claimed is:

1. Missile handling apparatus comprising a loading station, a launching station, a horizontally-disposed missile loading beam, means for swingably moving said beam between said stations for carrying a missile from one station to the other, means for maintaining said horizontal disposition of the beam during said swinging movement, a rammer car reciprocably movable along said beam for engaging a missile at said loading station and moving it onto and along said horizontal beam, and drive means for reciprocably moving said car, said rammer car drive means being an endless sprocket-driven flexible member, and said rammer car being formed of spaced rigidly-interconnected front and rear sections each of which is formed with a rack meshed with said endless sprocket-driven member.

2. The apparatus of claim 1 wherein said beam is formed with guide rails adapted to slidably receive and dependently carry a missile, and said rammer car front and rear sections each are provided with rail-engaging flanges whereby said rammer car is dependently and slidably supported by said beam rails.

3. The apparatus of claim 2 wherein said rammer car front section mounts a pair of normally-closed jaws pivotal about a vertical axis for engaging a missile and moving the missile bi-directionally along said guide rails, a second pair of jaws, and means linking said pairs whereby said first pair can be held open by said second pair for permitting release of said missile.

4. The apparatus of claim 3 wherein said beam mounts a fluid power-operated pair of yoke arms adapted to engage said second pair of rammer car jaws for operating said jaws and causing said first pair to open, said yoke arms being disposed for opening said first pair of jaws at the missile pick-up position.

5. The apparatus of claim 2 wherein said beam mounts a pair of horizontally-spaced fluid-powered latches, and said rammer car rear section carries a latch-engaging lug.

6. The apparatus of claim 5 wherein the individual latches of said pair of latches are selectively-operable for permitting rammer car movement in one direction and restraining it in the other.

References Cited by the Examiner

UNITED STATES PATENTS

| | | | |
|---|---|---|---|
| 1,806,323 | 5/1931 | Weaver et al. | 187—8.72 |
| 2,445,091 | 7/1948 | Triplett | 92—2 |
| 2,456,620 | 12/1948 | Chadwick | 89—1 |
| 2,701,552 | 2/1955 | Light | 91—45 |
| 2,789,542 | 4/1957 | Vander Kaay | 91—45 |
| 2,985,072 | 5/1961 | Carlberg et al. | 89—1.7 |
| 2,987,963 | 6/1961 | Eaton | 89—1.7 |
| 2,990,814 | 7/1961 | Strettan | 91—2 |
| 3,048,087 | 8/1962 | Campbell | 89—1.7 |
| 3,054,330 | 9/1962 | Carlberg | 89—1.7 |
| 3,113,487 | 12/1963 | Eaton | 89—1.7 |
| 3,166,975 | 1/1965 | Landstrom et al. | 89—1.7 |

BENJAMIN A. BORCHELT, *Primary Examiner.*

SAMUEL W. ENGLE, *Examiner.*